US007325288B2

(12) United States Patent
Yang et al.

(10) Patent No.: US 7,325,288 B2
(45) Date of Patent: Feb. 5, 2008

(54) METHOD FOR MANUFACTURING LIQUID TANK AND SHIP WITH LIQUID TANK

(75) Inventors: Young Myung Yang, Ansan Kyonggi-do (KR); Seong Ho Hong, Inchon (KR); Ihn Soo Yoon, Inchon (KR); Young Chul Yang, Kyonggi-do (KR); Heung Seok Seo, Kyonggi-do (KR); Ji Hun Kim, Seoul (KR); Byoung Taek Oh, Inchon (KR); Young Kyun Kim, Kyonggi-do (KR)

(73) Assignee: Korea Gas Corporation (KR)

( * ) Notice: Subject to any disclaimer, the term of this patent is extended or adjusted under 35 U.S.C. 154(b) by 0 days.

(21) Appl. No.: 11/119,268

(22) Filed: Apr. 28, 2005

(65) Prior Publication Data

US 2006/0117566 A1 Jun. 8, 2006

Related U.S. Application Data

(63) Continuation-in-part of application No. PCT/KR2005/000327, filed on Feb. 3, 2005.

(30) Foreign Application Priority Data

| | | |
|---|---|---|
| Dec. 8, 2004 | (KR) | 10-2004-0103254 |
| Dec. 8, 2004 | (KR) | 10-2004-0103255 |
| Dec. 8, 2004 | (KR) | 10-2004-0103256 |
| Dec. 8, 2004 | (KR) | 10-2004-0103257 |
| Feb. 1, 2005 | (KR) | 10-2005-0009313 |

(51) Int. Cl.
*B21D 39/00* (2006.01)
*B23P 19/04* (2006.01)

(52) U.S. Cl. .................. 29/455.1; 29/897; 220/560.07

(58) Field of Classification Search ............... 29/455.1, 29/525.01, 464, 897; 220/560.04, 560.07; 114/74 A
See application file for complete search history.

(56) References Cited

U.S. PATENT DOCUMENTS

| | | | | |
|---|---|---|---|---|
| 3,299,598 A | | 1/1967 | Alleaume | |
| 3,302,359 A | | 2/1967 | Alleaume | |
| 3,331,525 A | * | 7/1967 | Coehn | 220/560.07 |
| 3,339,003 A | * | 8/1967 | Cessna | 264/262 |
| 3,341,049 A | * | 9/1967 | Forman et al. | 220/560.07 |
| 3,399,800 A | | 9/1968 | Gilles | |

(Continued)

FOREIGN PATENT DOCUMENTS

JP 57-027600 U 2/1982

(Continued)

*Primary Examiner*—David P. Bryant
*Assistant Examiner*—Christopher M Koehler
(74) *Attorney, Agent, or Firm*—Knobbe Martens Olson & Bear LLP

(57) ABSTRACT

Disclosed is a liquid container adapted to store liquefied natural gas (LNG). The LNG storage container include a sealing wall directly contacting liquid contained in the tank and a structural wall, which is an exterior wall or inner structure integrated with the exterior wall. The container further includes a plurality of connectors mechanically connecting the sealing wall and the structural wall and an intermediate wall structure positioned between the structural wall and the interior wall. The intermediate wall structure is configured to move relative to at least one of the interior wall and the structural wall.

18 Claims, 40 Drawing Sheets

U.S. PATENT DOCUMENTS 3,403,651 A 10/1968 Gilles
3,485,409 A * 12/1969 Becker .................. 220/560.07
3,498,249 A * 3/1970 Jones ....................... 114/74 A
3,782,581 A 1/1974 Beazer
3,811,593 A * 5/1974 Bridges et al. ........ 220/560.07
3,871,319 A * 3/1975 Turner ...................... 114/74 A
3,896,961 A * 7/1975 Guilhem et al. ....... 220/560.15
4,003,174 A 1/1977 Kotcharian
4,021,982 A * 5/1977 Kotcharian .................. 52/410
4,065,019 A 12/1977 Letourneur et al.
4,105,819 A 8/1978 Kotcharian
4,155,482 A * 5/1979 Swaney ................. 220/560.15
4,378,403 A 3/1983 Kotcharian
4,747,513 A 5/1988 Betille
5,269,247 A 12/1993 Jean
5,447,112 A 9/1995 Jean
5,450,806 A 9/1995 Jean
5,501,359 A * 3/1996 Chauvin et al. ....... 220/592.26
5,586,513 A 12/1996 Jean
6,035,795 A 3/2000 Dhellemmes
6,145,690 A 11/2000 Dhellemmes
6,199,497 B1 3/2001 Dhellemmes
6,374,761 B1 4/2002 Dhellemmes
6,378,722 B1 4/2002 Dhellemmes
6,675,731 B2 1/2004 Dhellemmes
2003/0000949 A1 1/2003 Dhellemmes

FOREIGN PATENT DOCUMENTS

JP 2000-038190 2/2000
JP 2000-079987 A 2/2000
JP 2001-122386 5/2001
JP 2001-158395 6/2001
KR 2000-0011346 2/2000
KR 2000-0011347 2/2000
KR 10-2001-0050440 A 6/2001
WO WO 89/09909 10/1989

* cited by examiner

【Fig. 1】
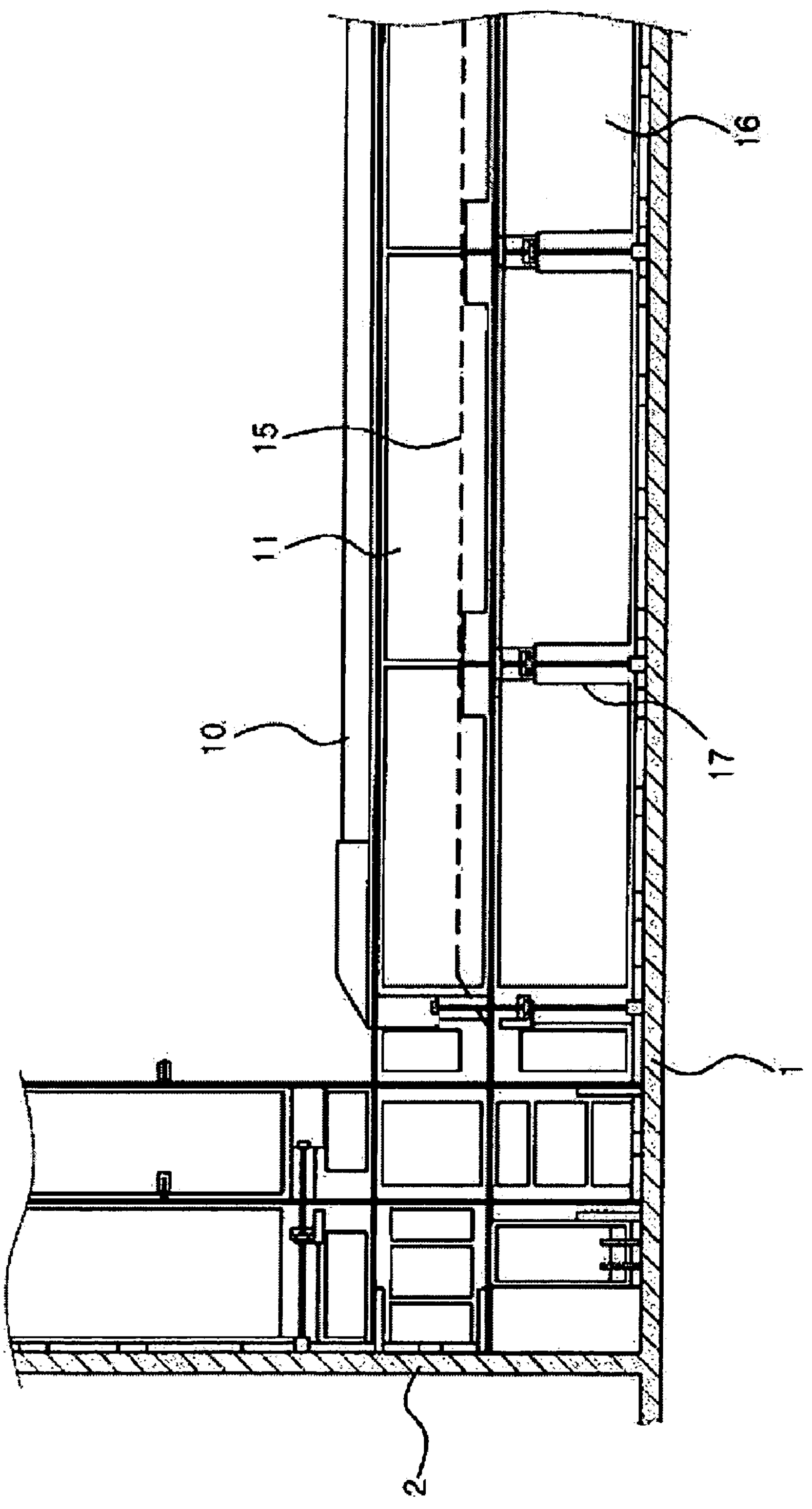
PRIOR ART

【Fig. 2】
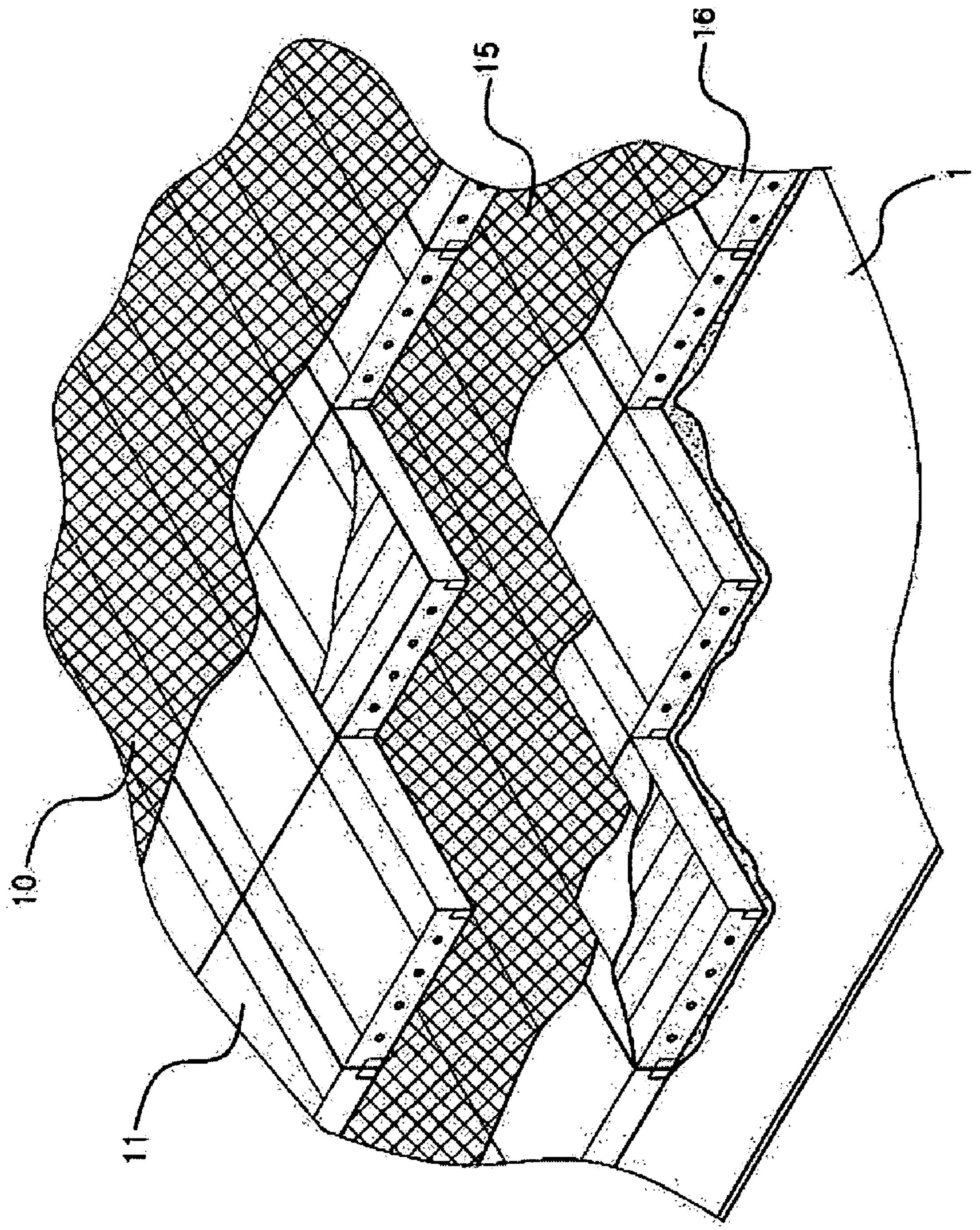
PRIOR ART

【Fig. 3】
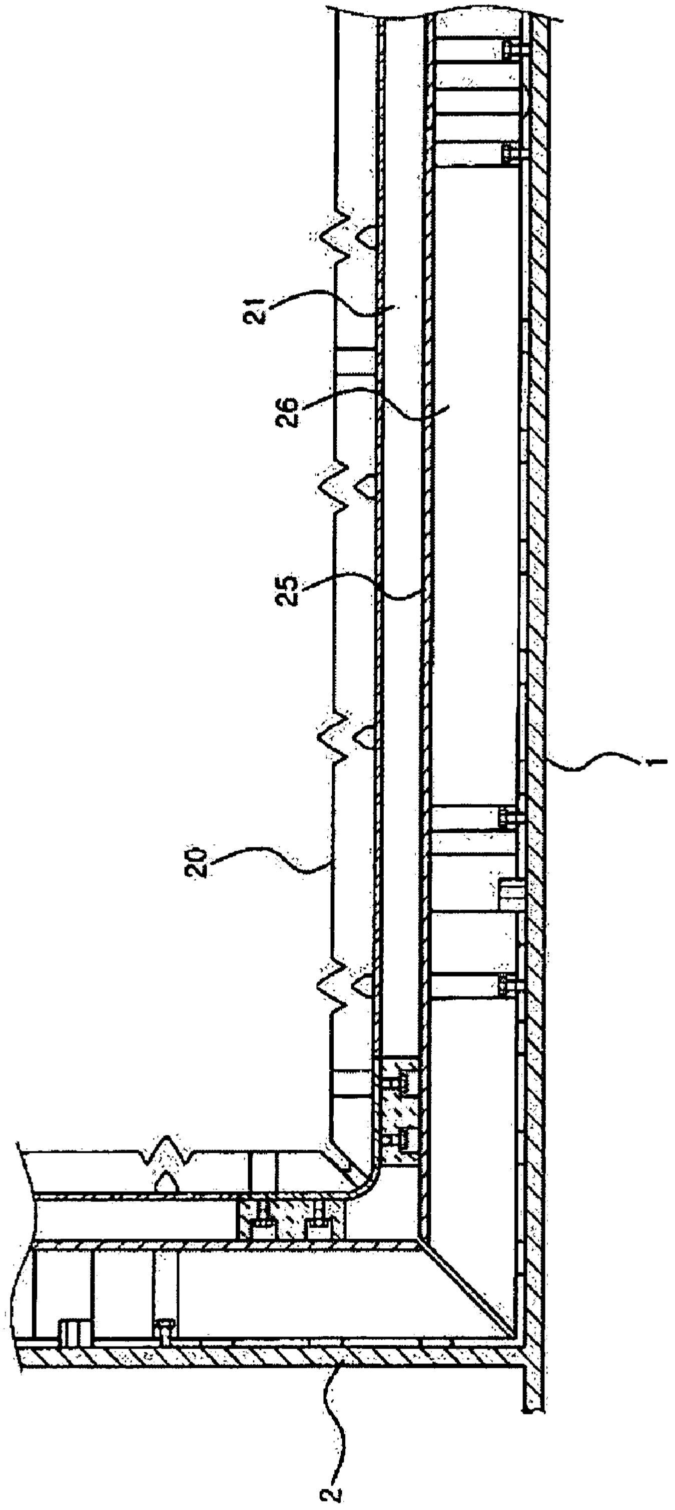
PRIOR ART

【Fig. 4】
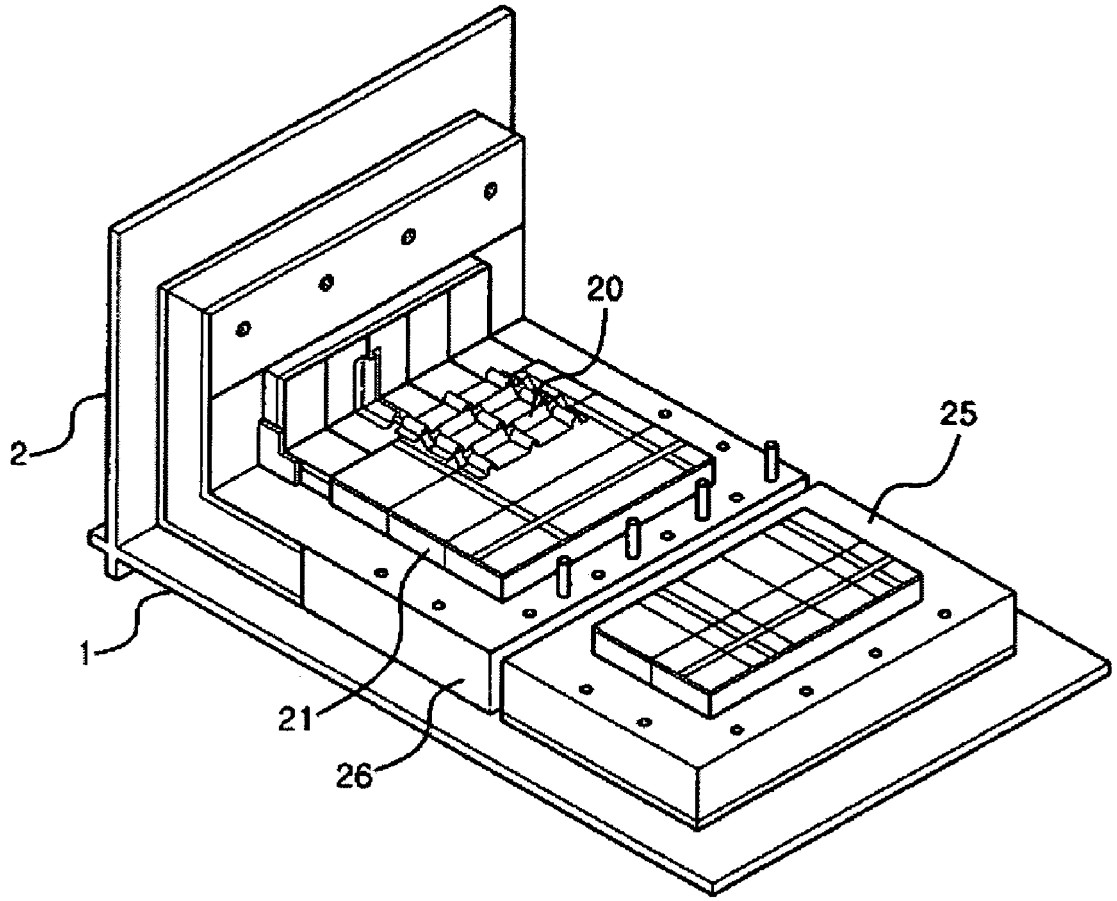
PRIOR ART

【Fig. 5】
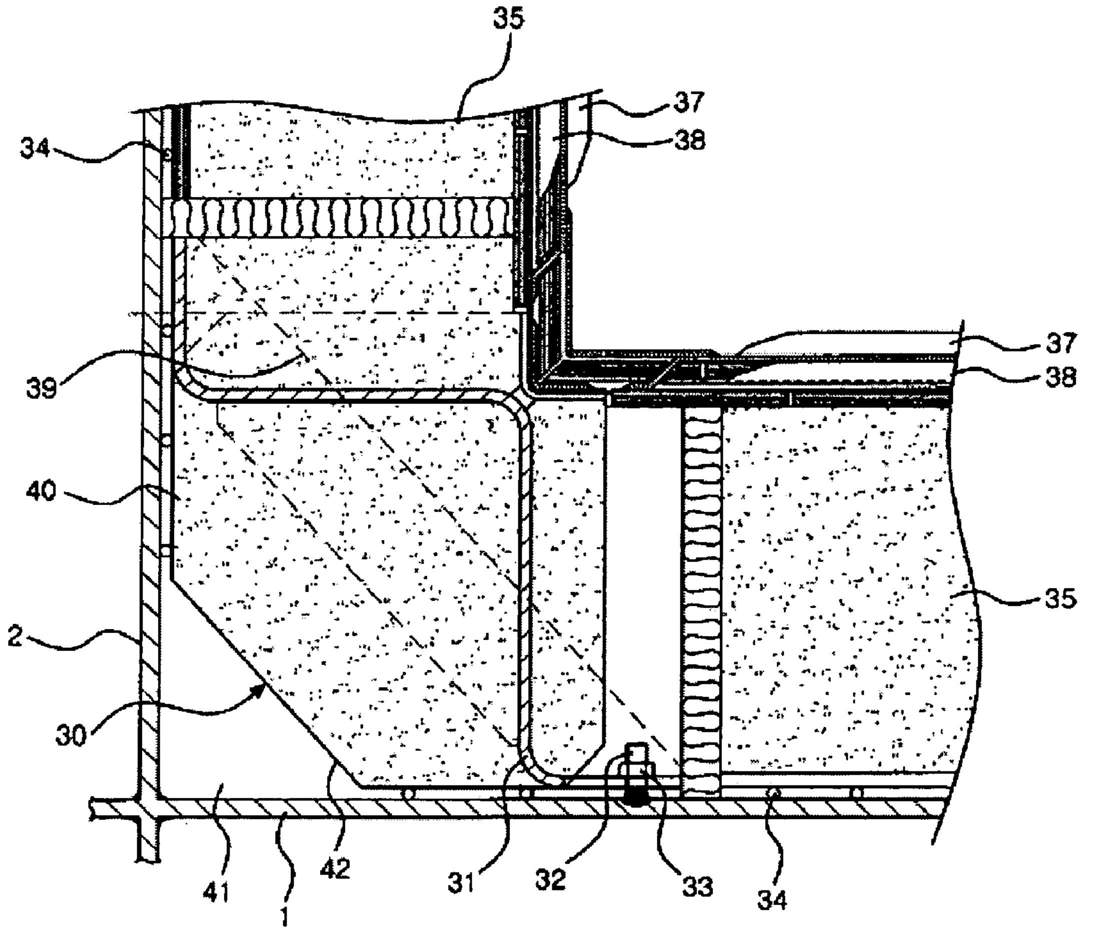
PRIOR ART

【Fig. 6】
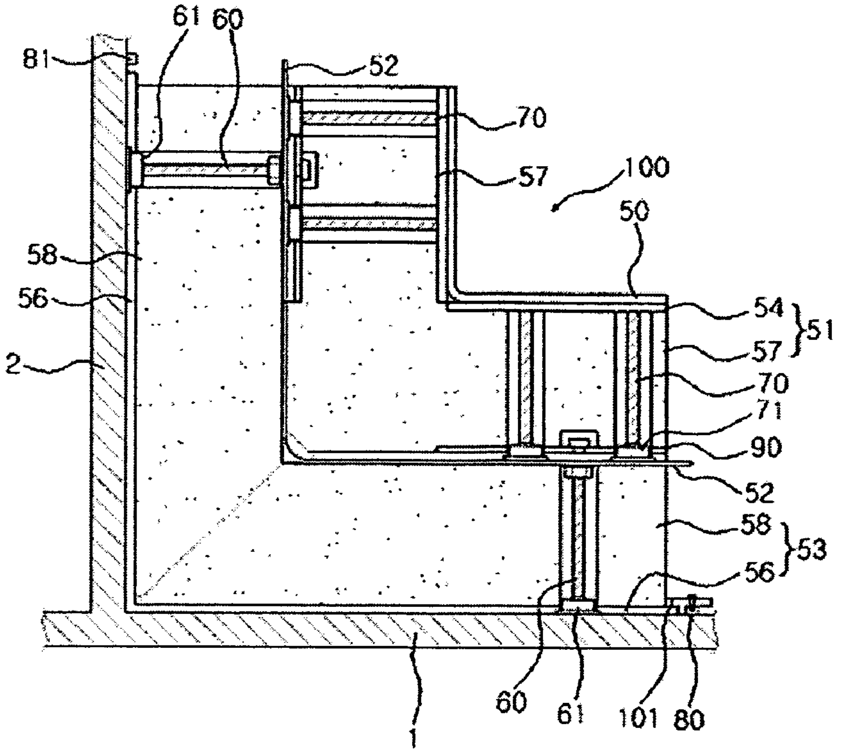
(a)
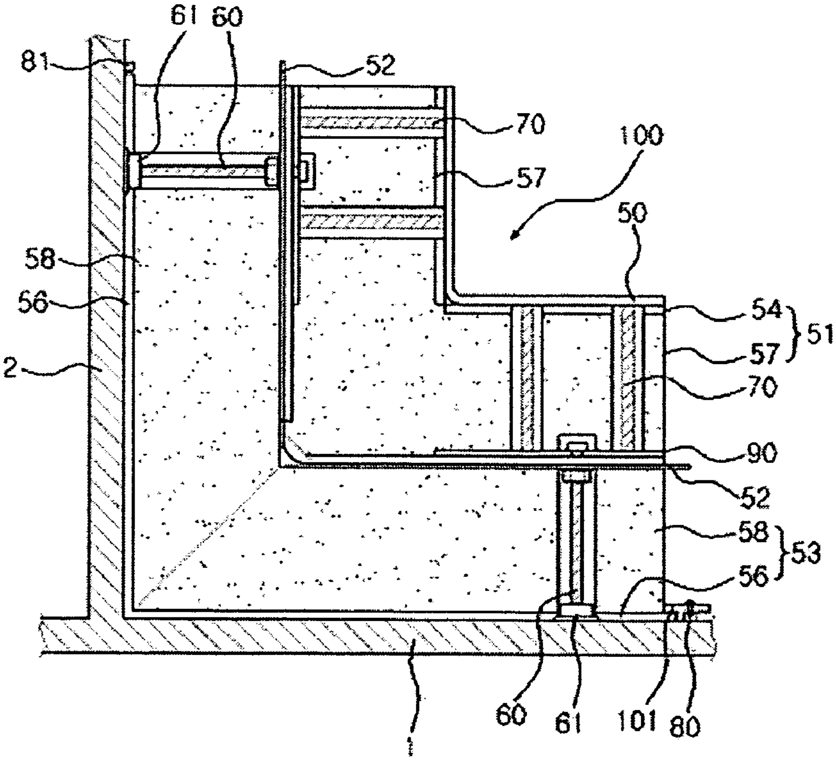
(b)

【Fig. 7】
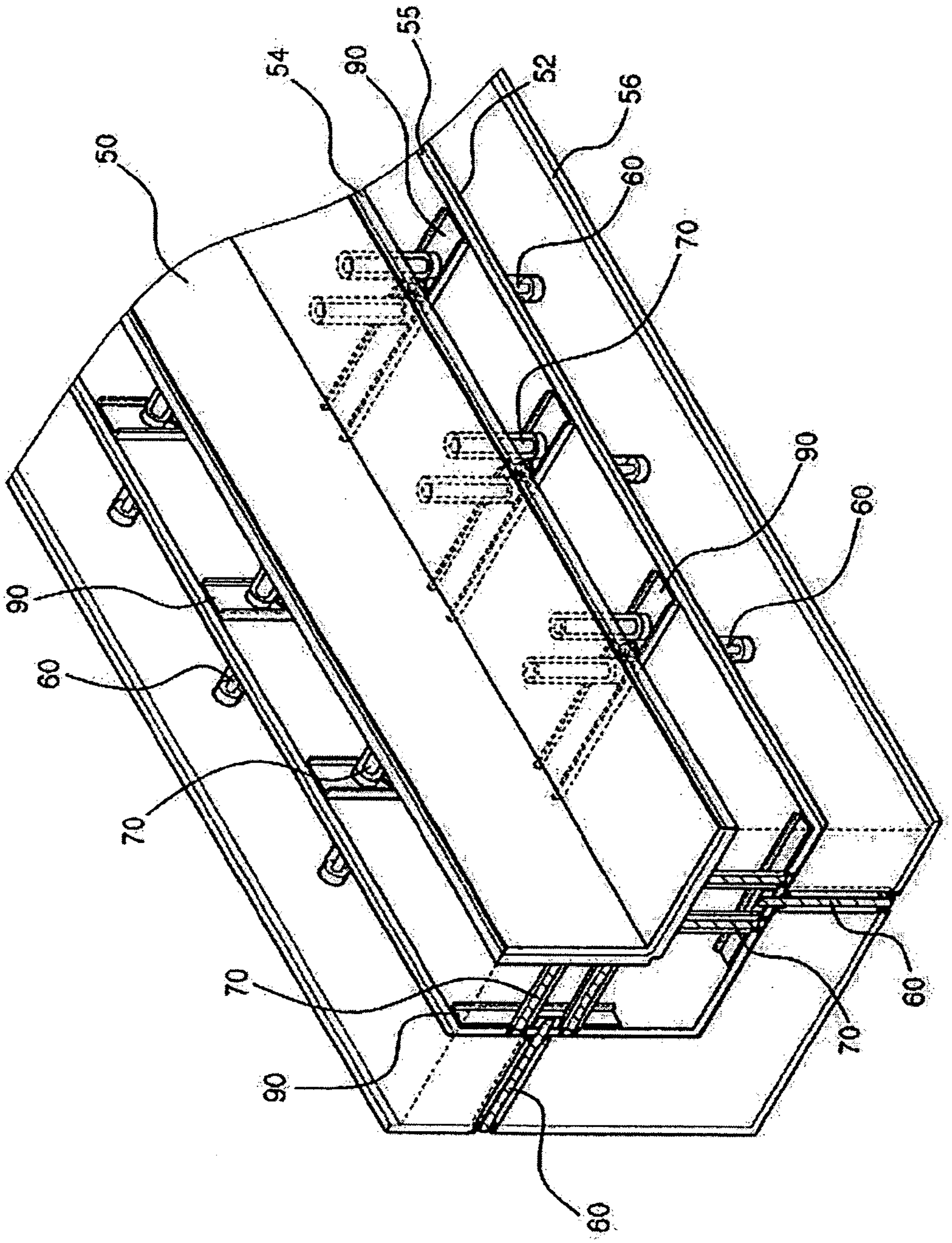

【Fig. 8】
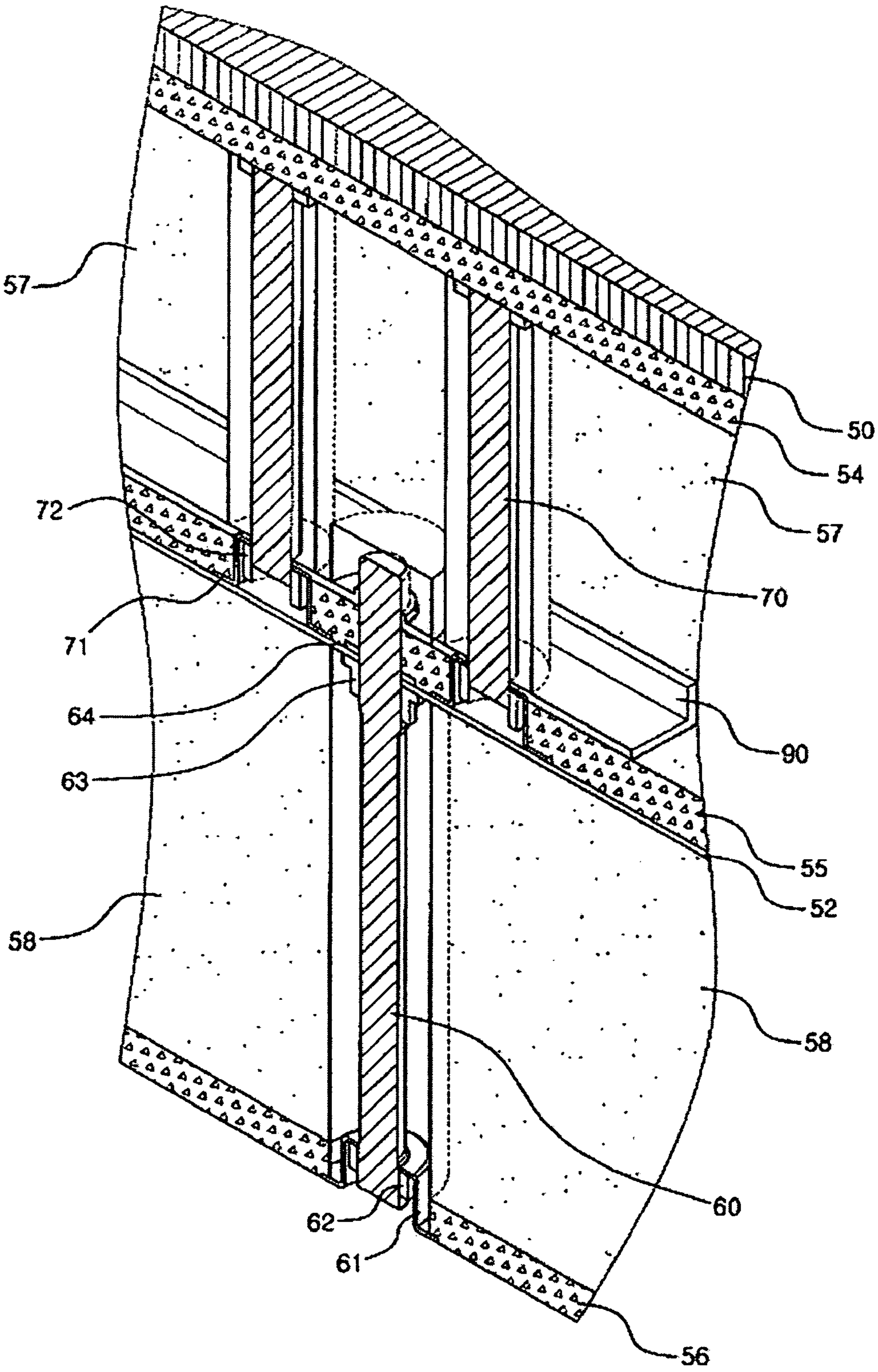

【Fig. 9】
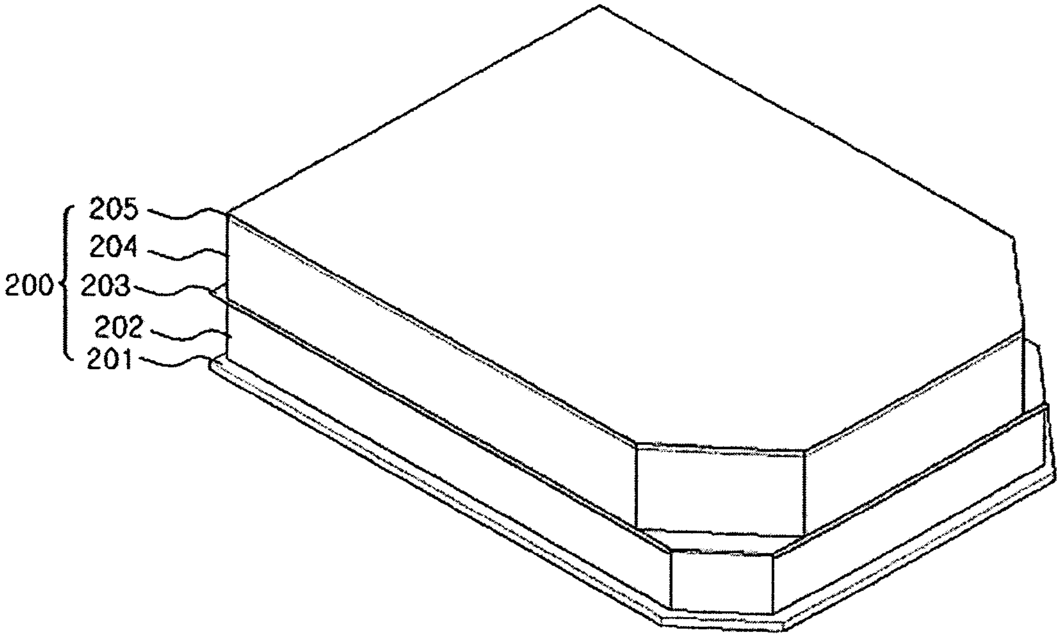

【Fig. 10】
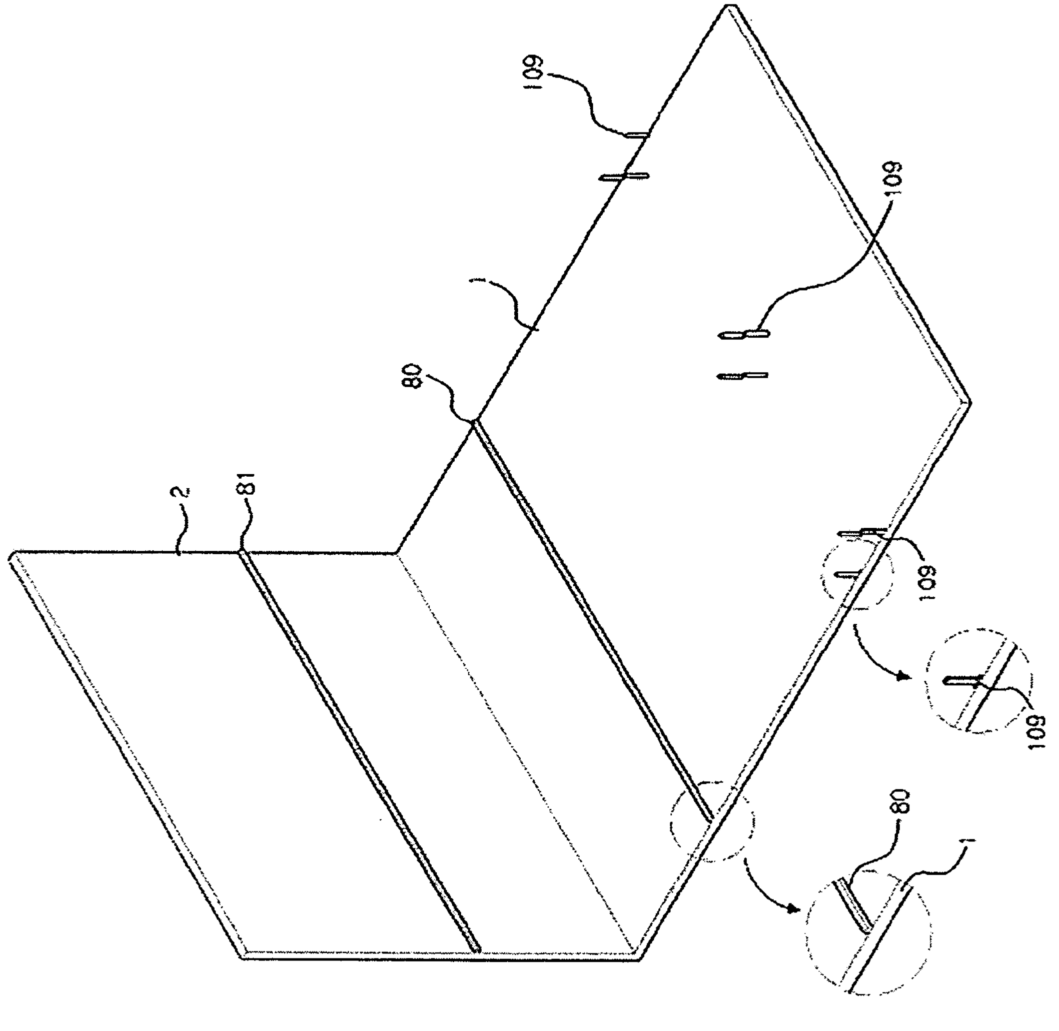

【Fig. 11】
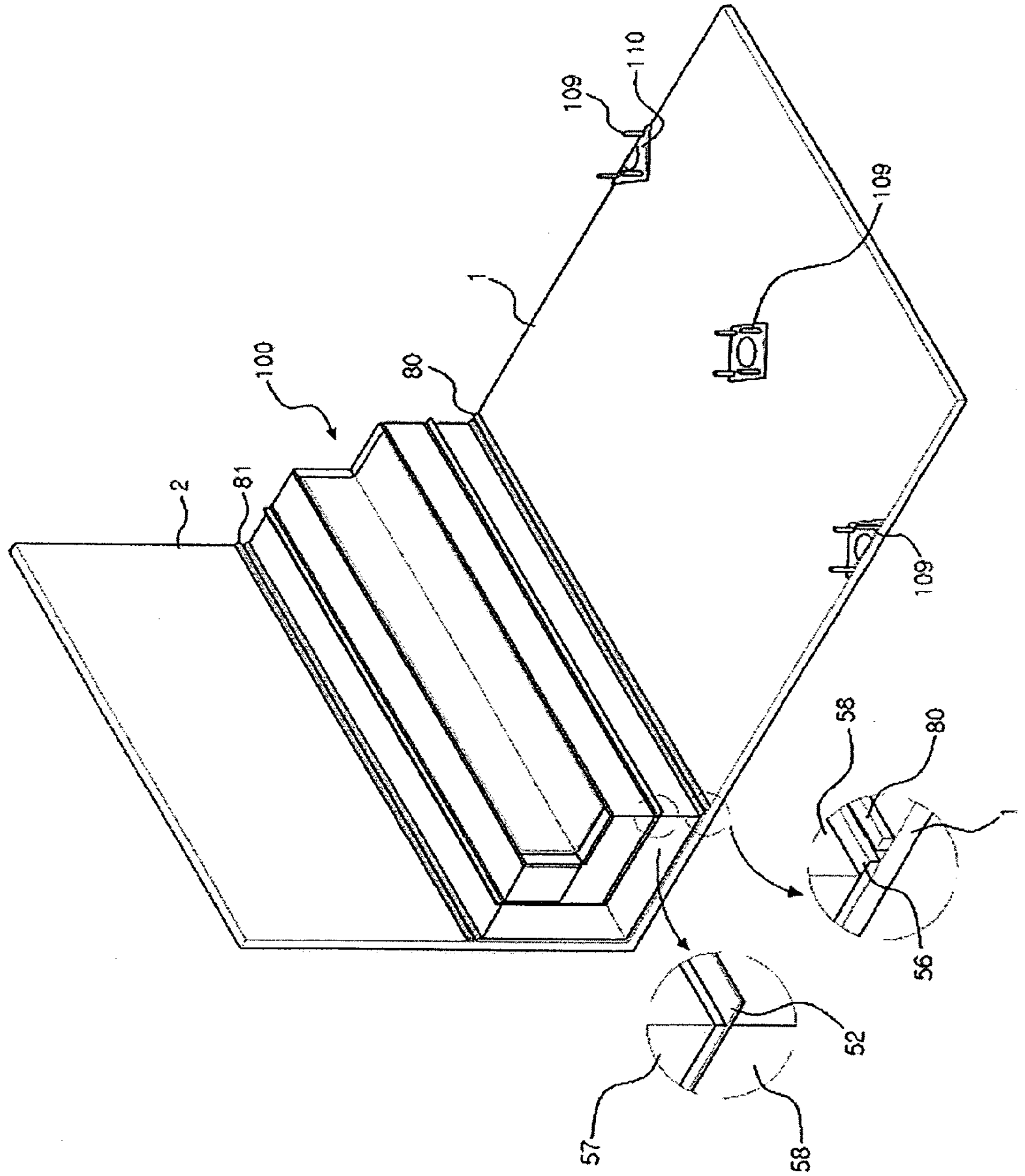

【Fig. 12】
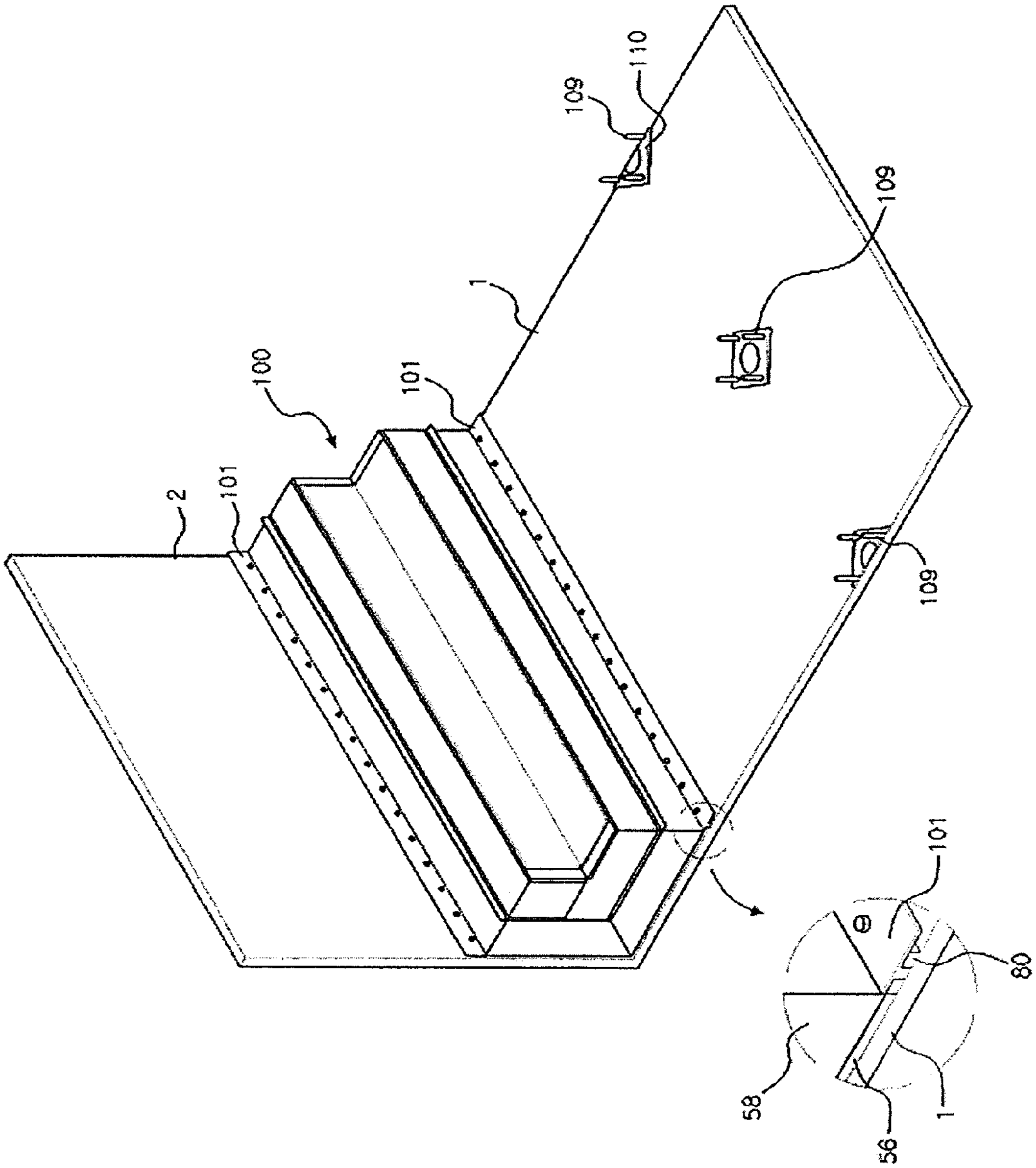

【Fig. 13】
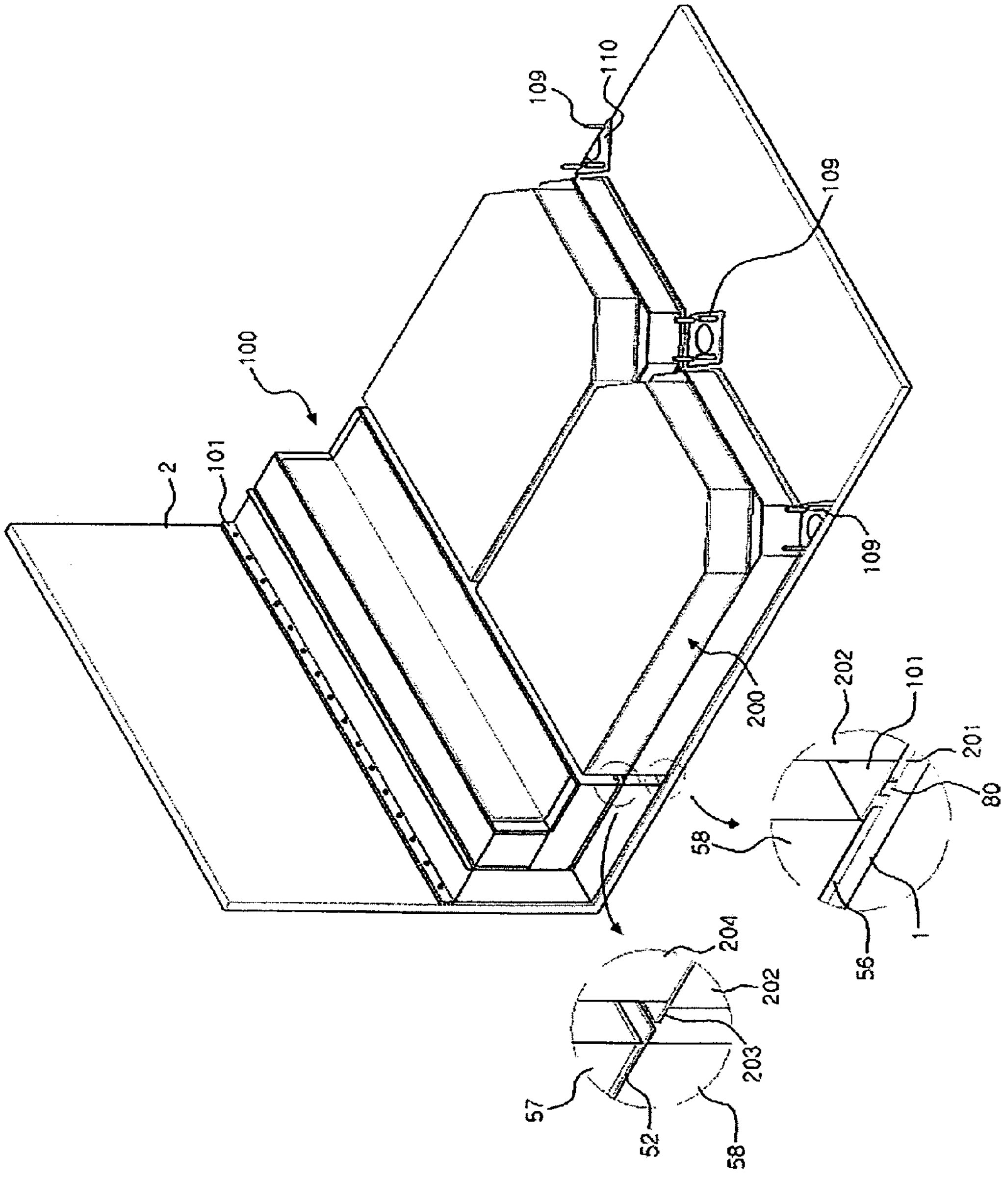

【Fig. 14】
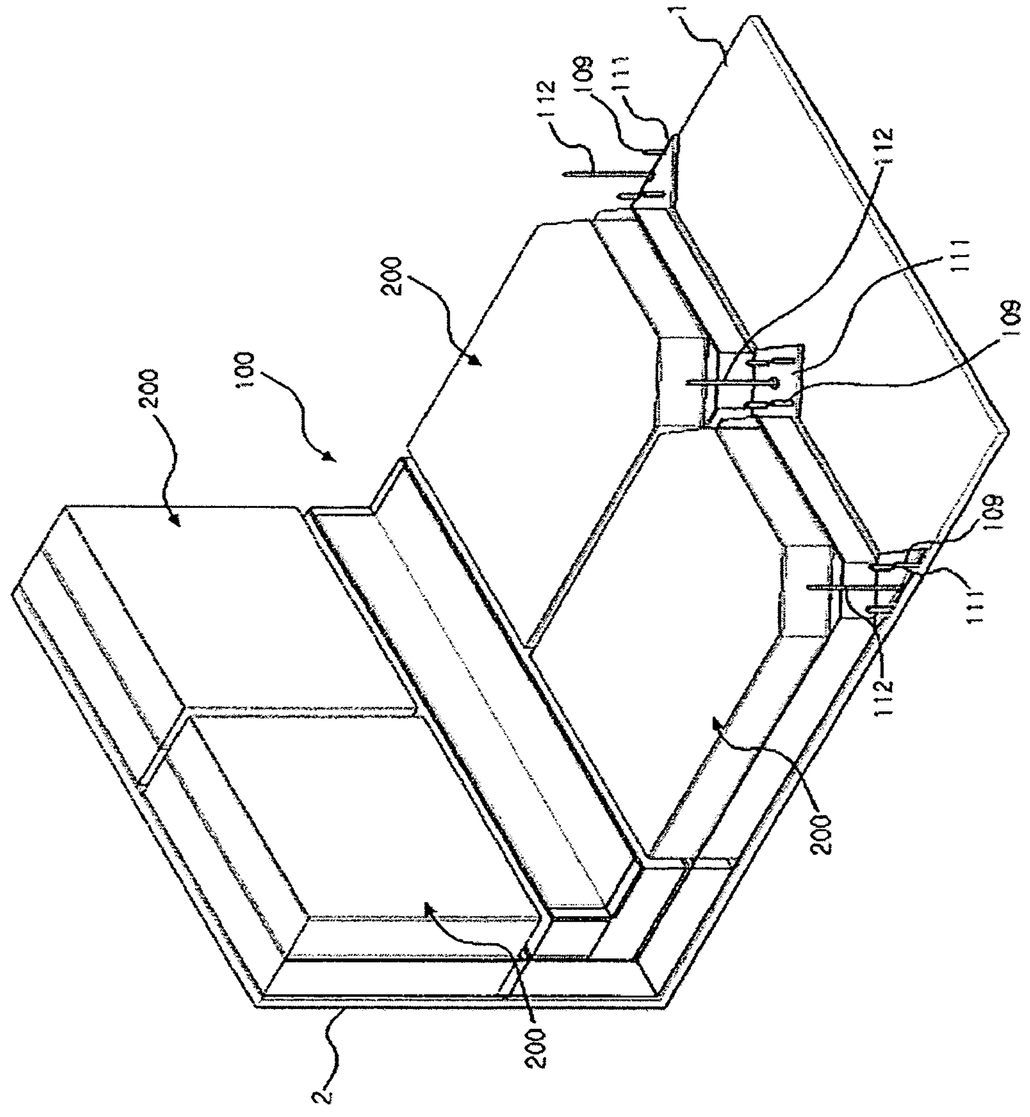

【Fig. 15】
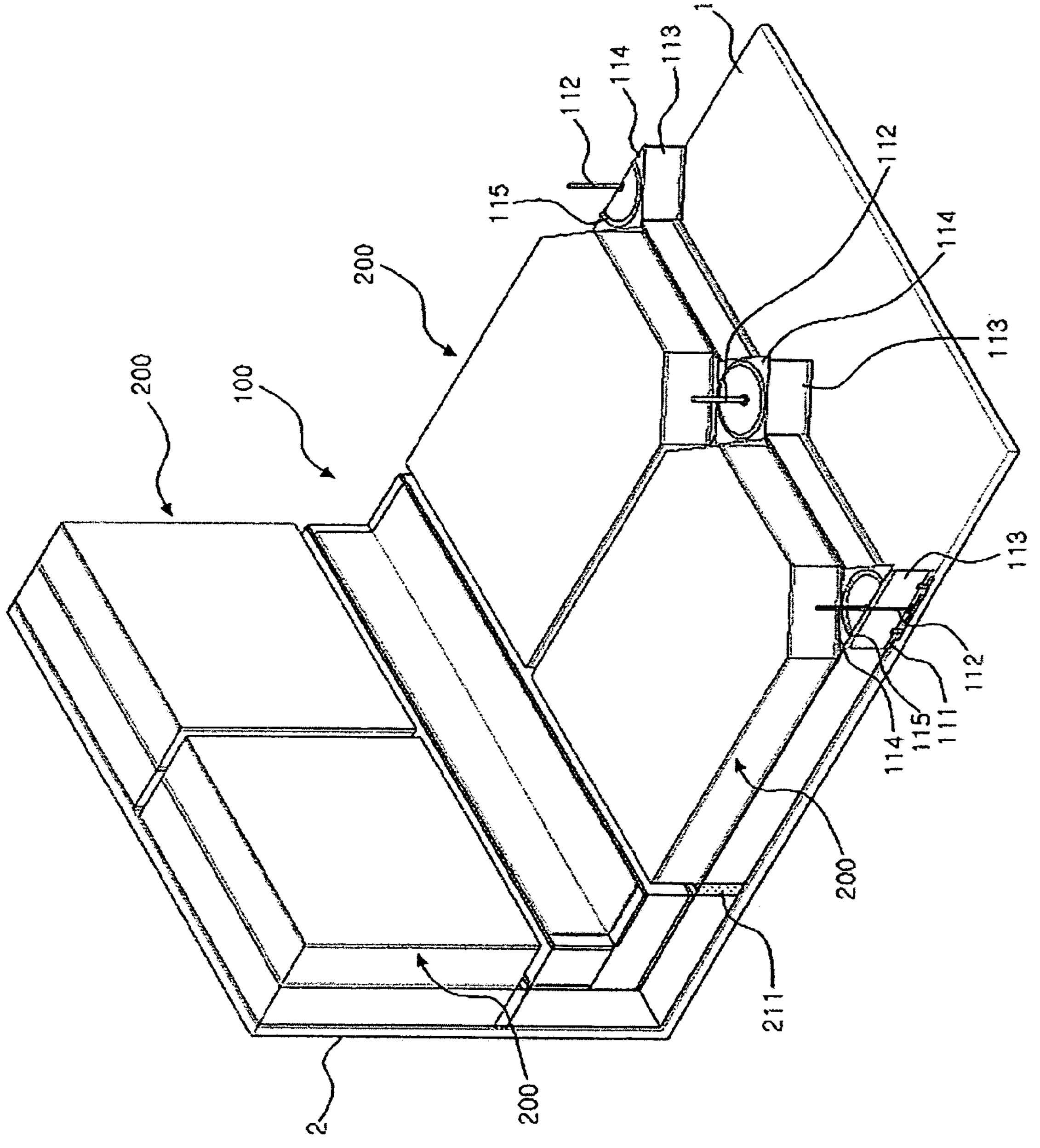

【Fig. 16】
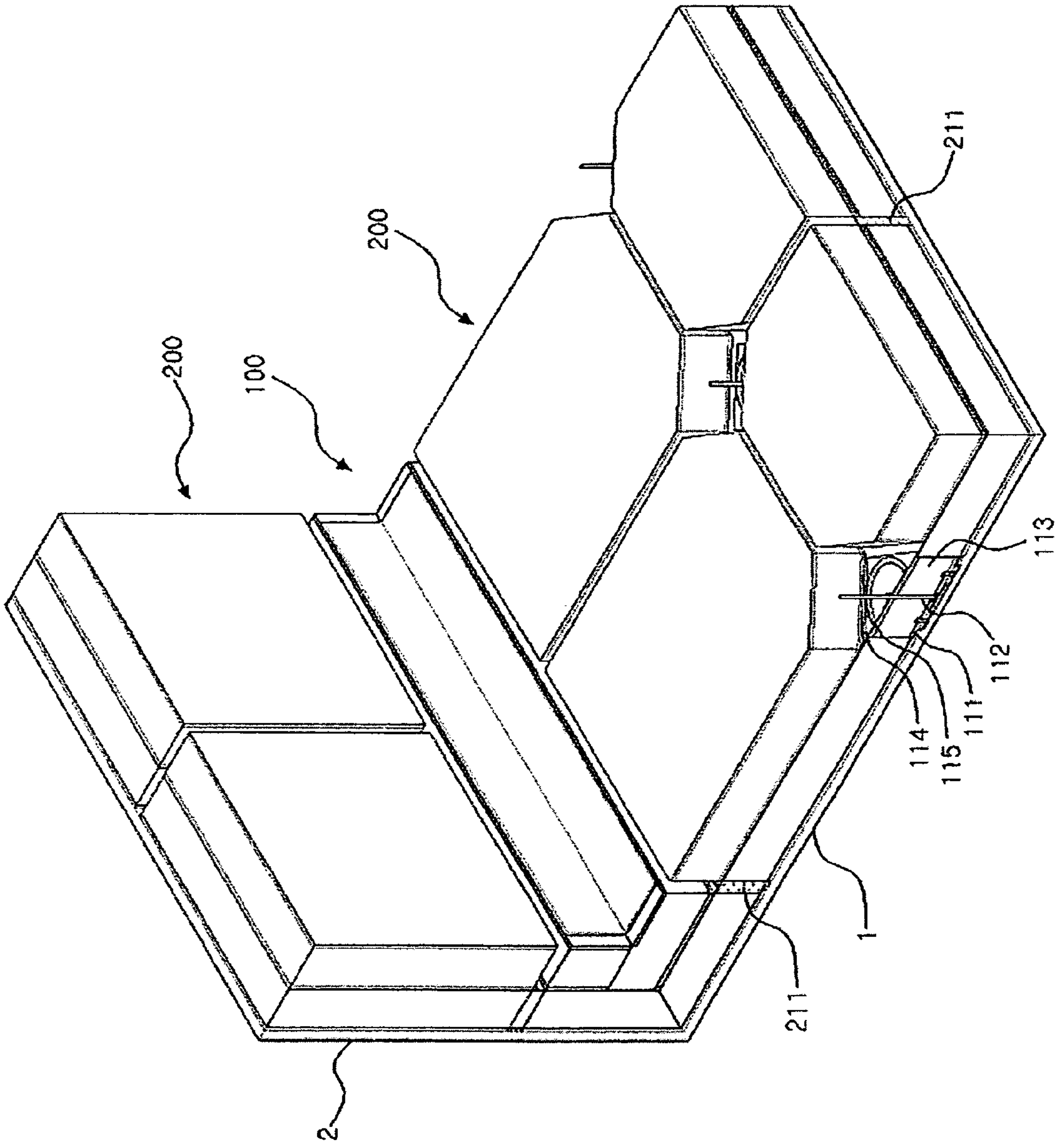

【FIG 17】
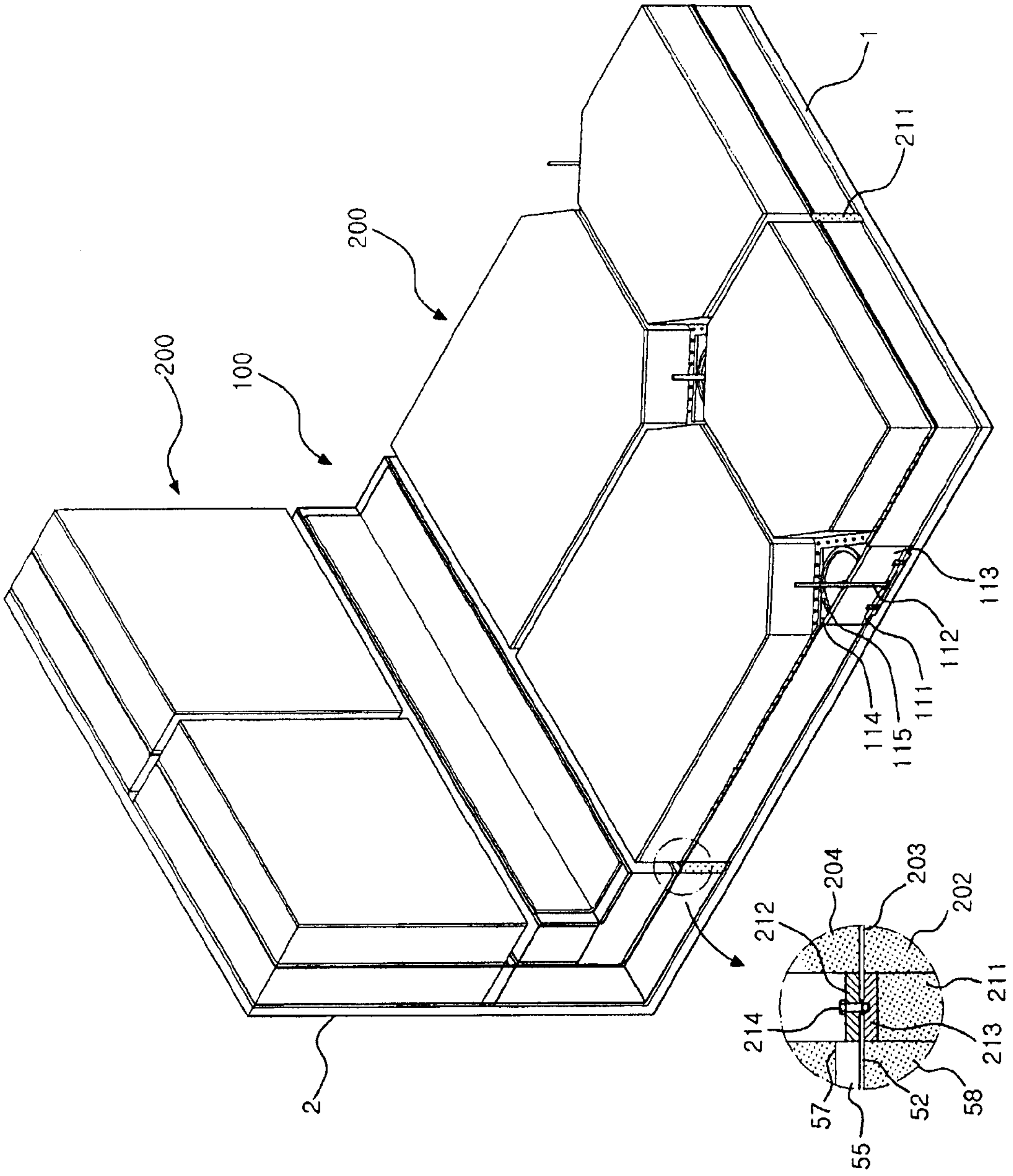

【Fig. 18】
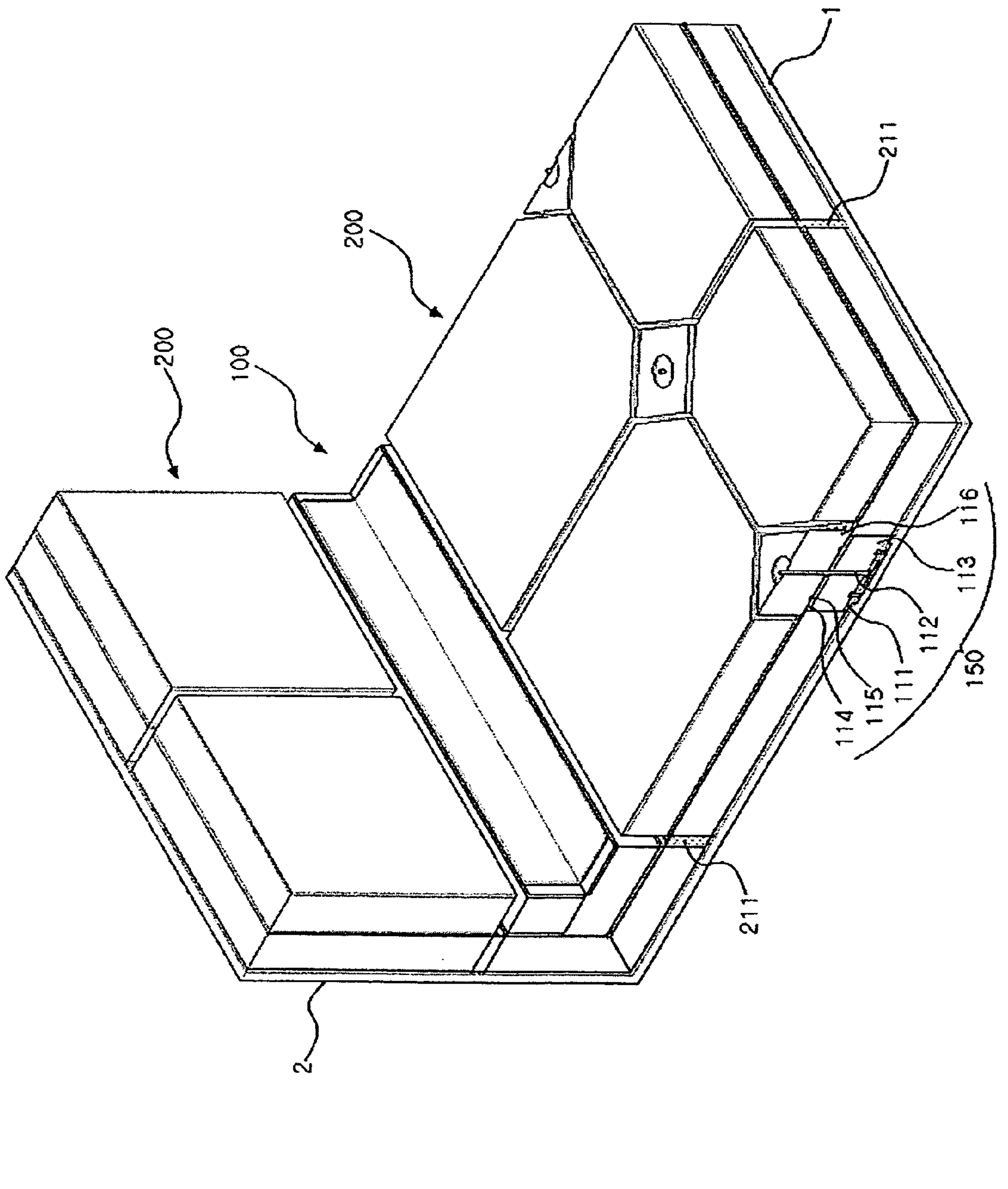

【Fig. 19】
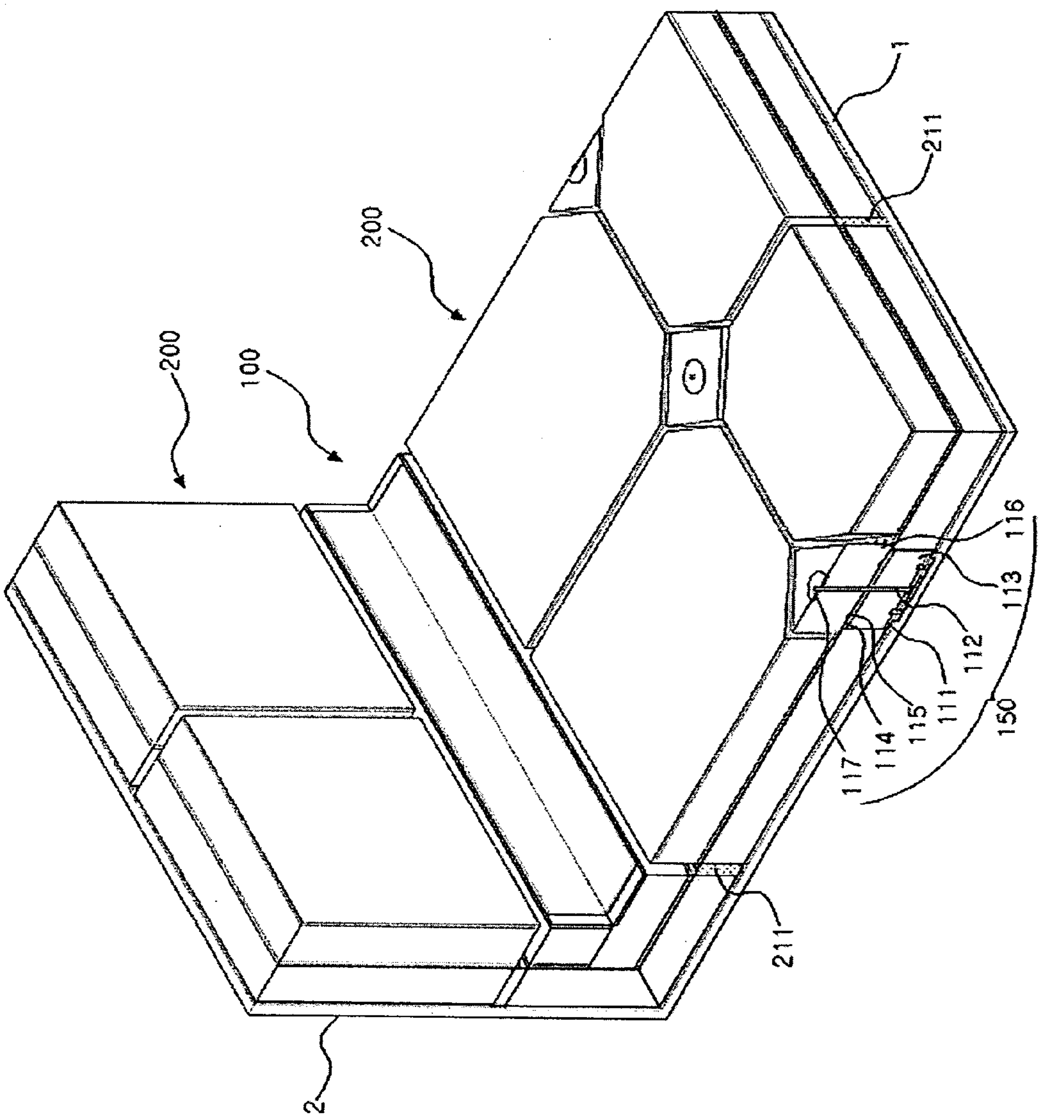

【Fig. 20】
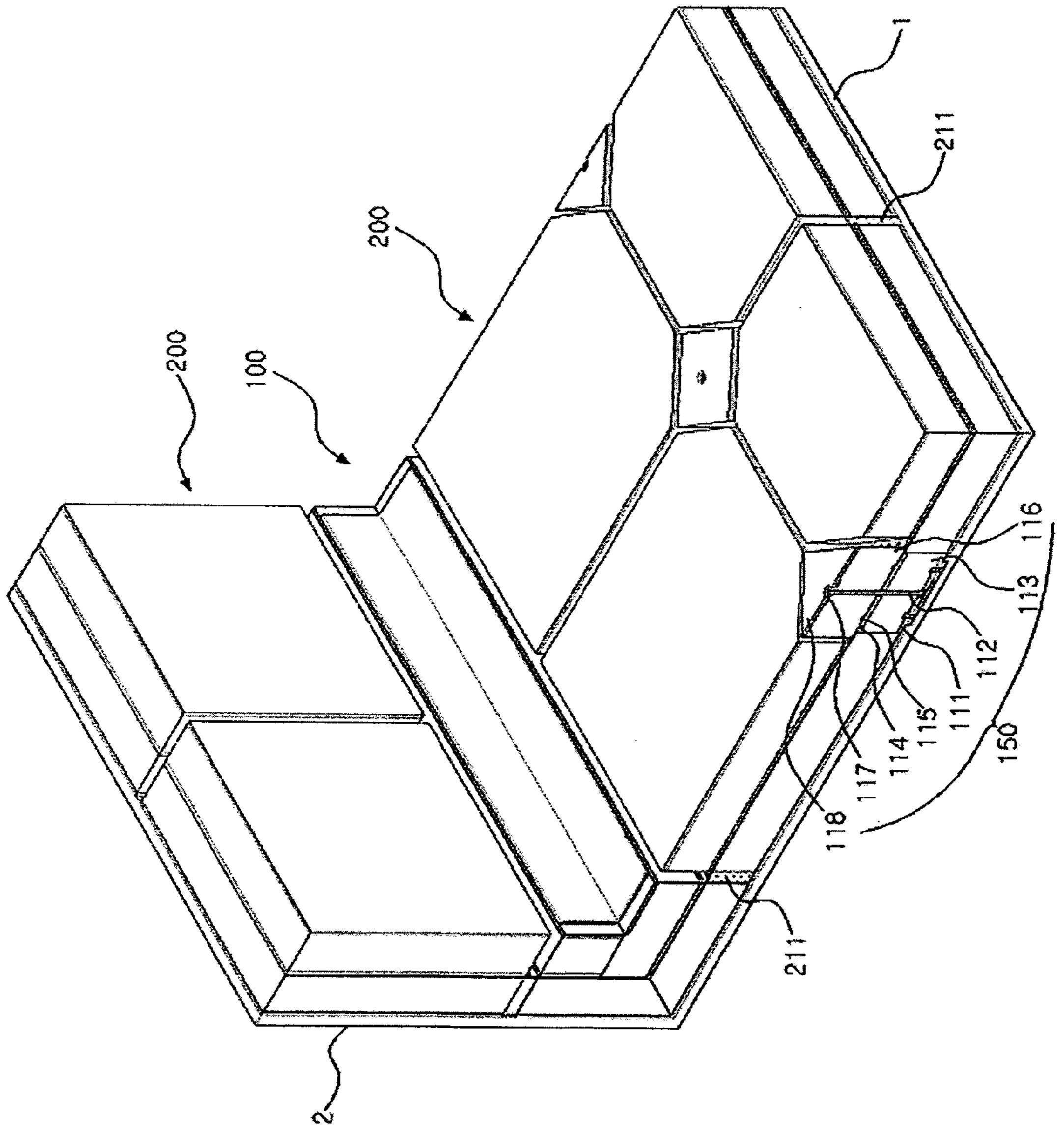

【Fig. 21】
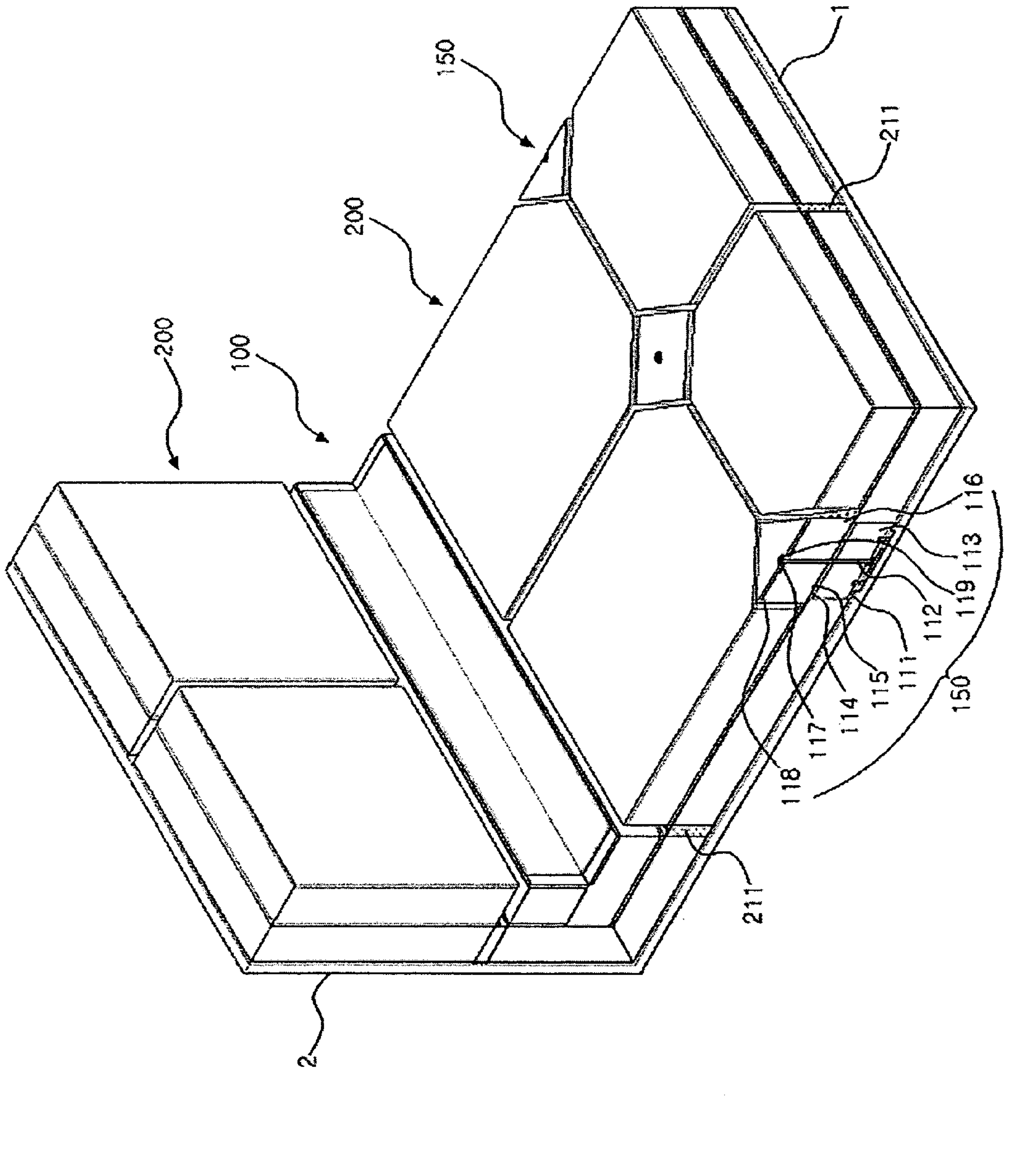

【Fig. 22】
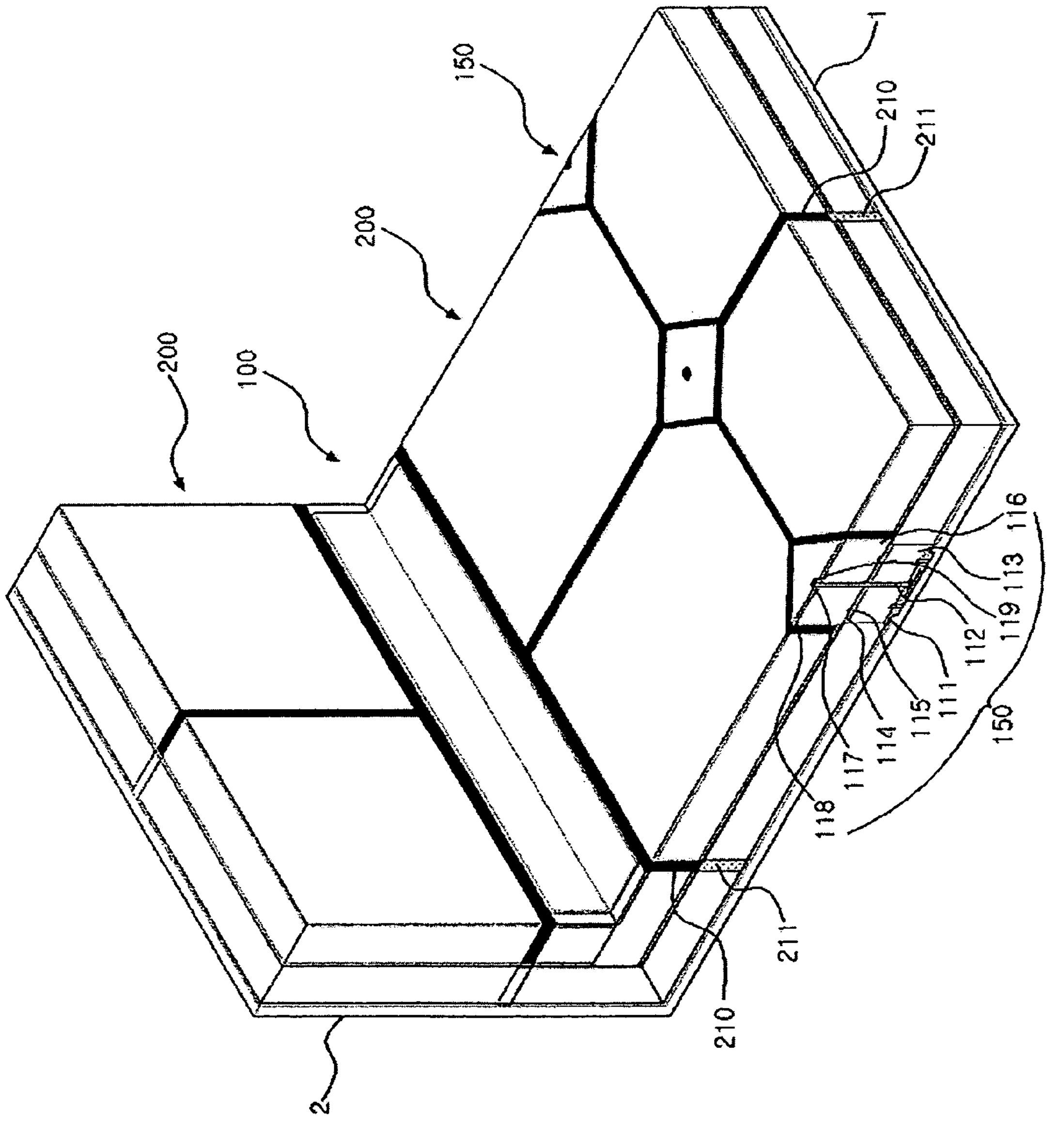

【Fig. 23】
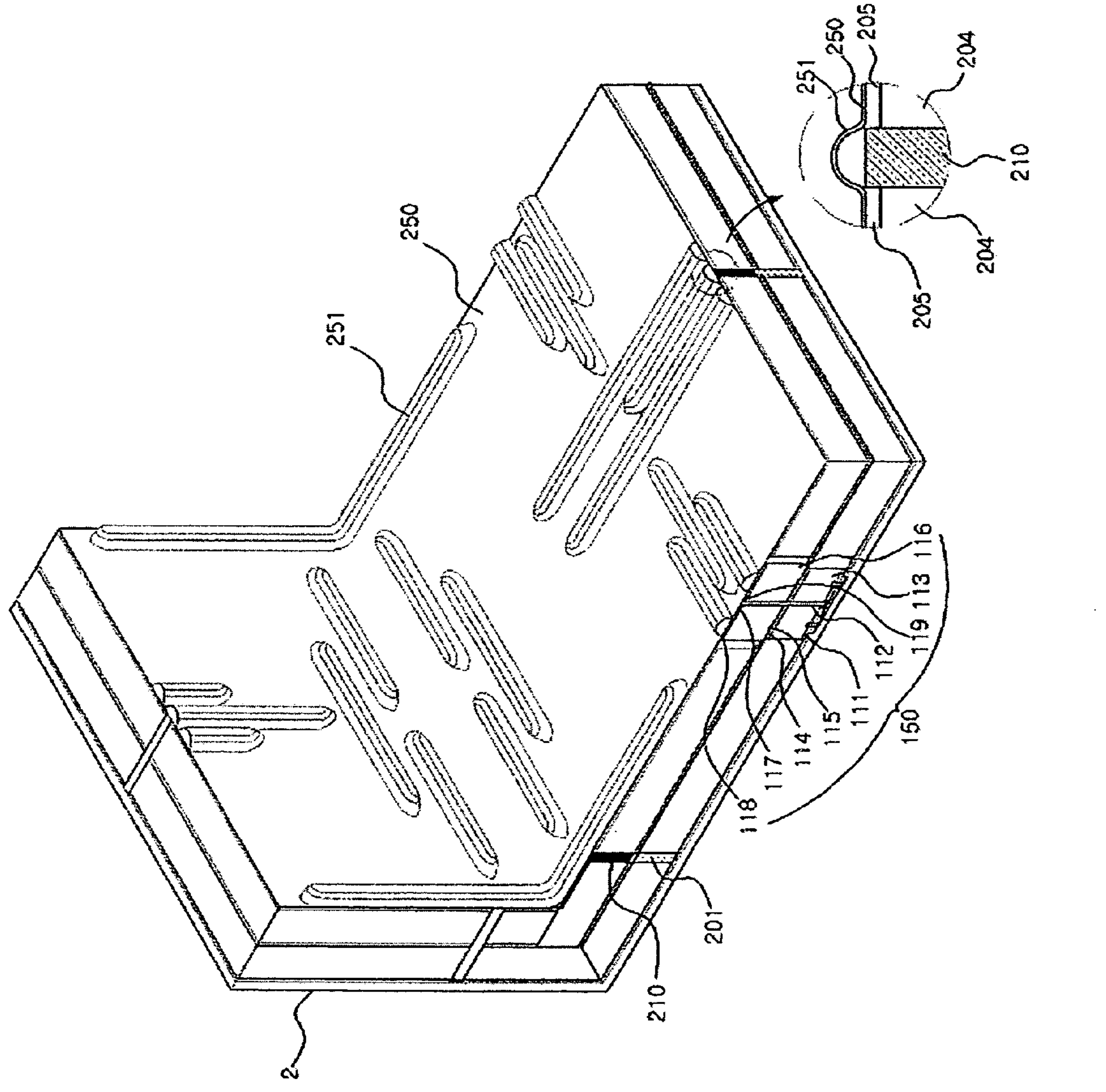

【Fig. 24】
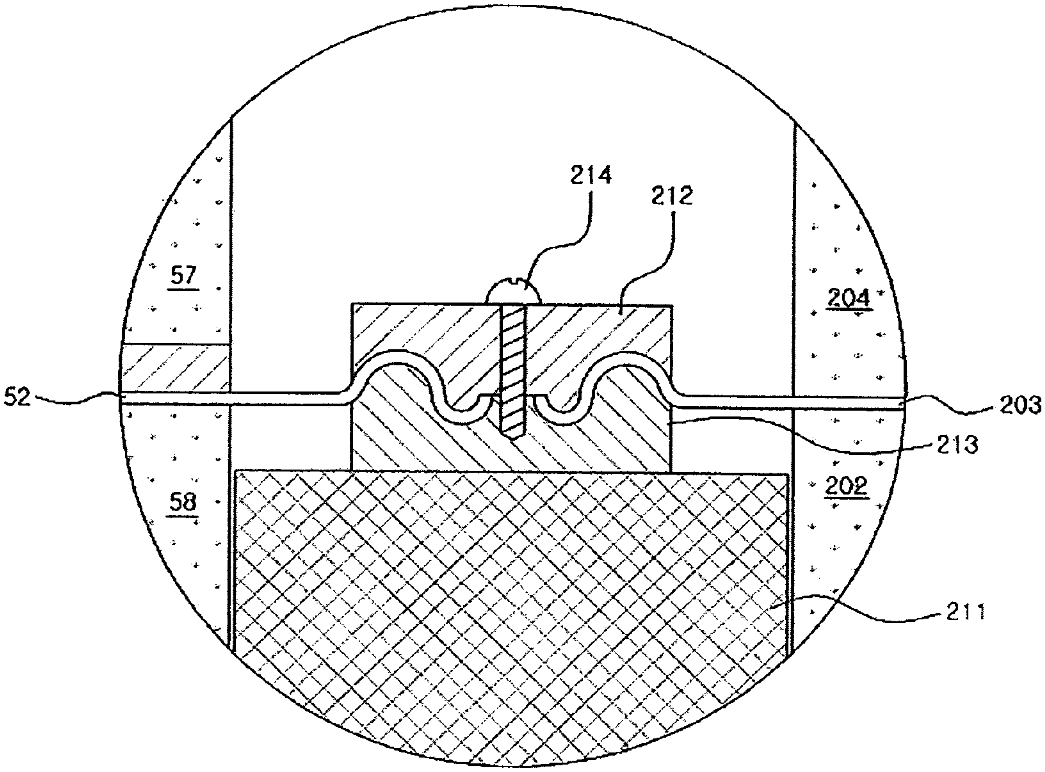

【Fig. 25】
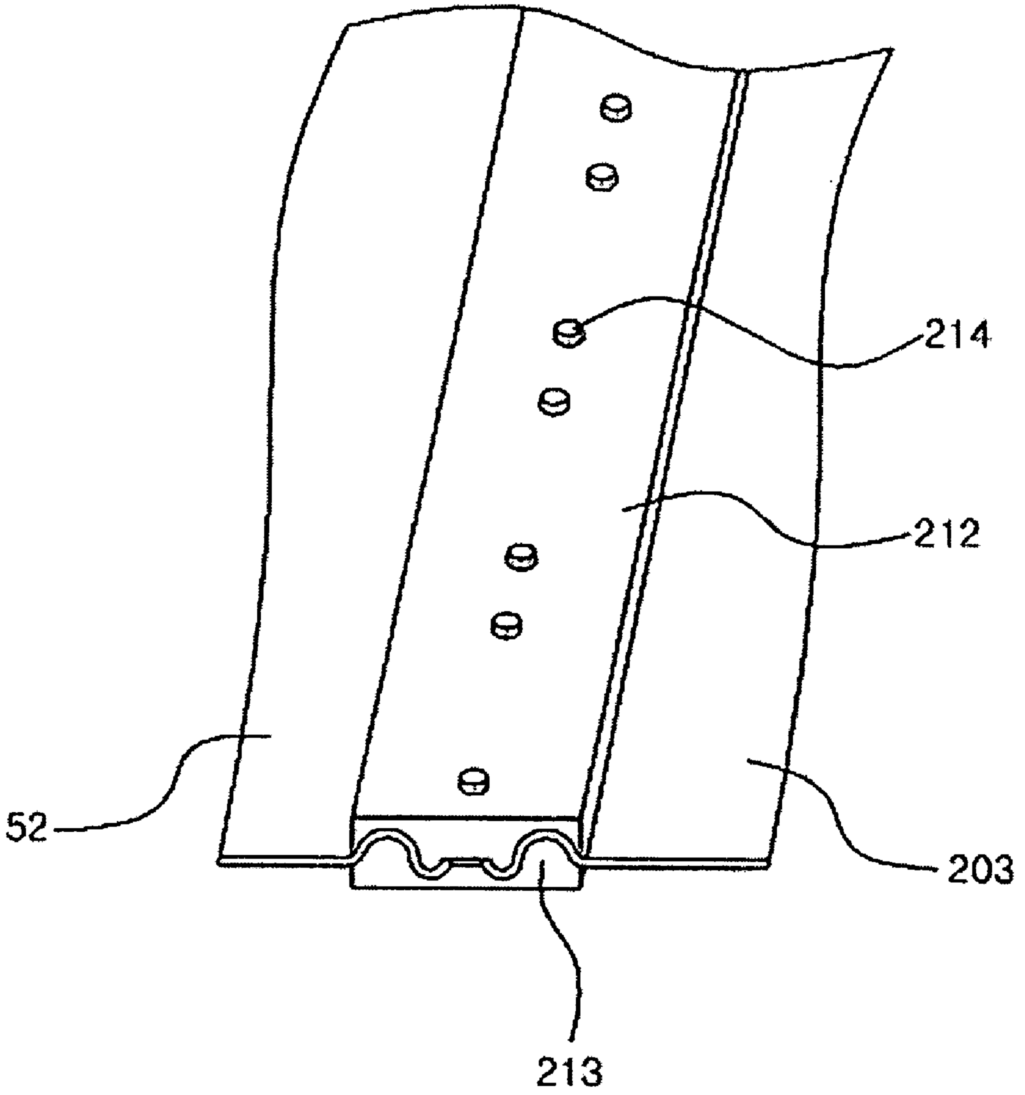

【Fig. 26】
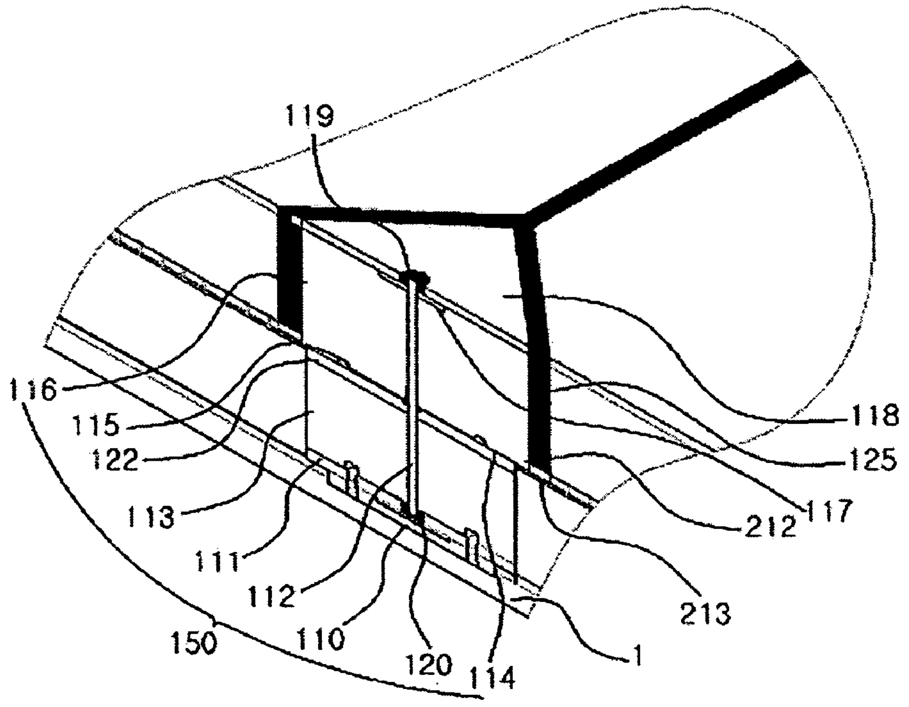
(a)
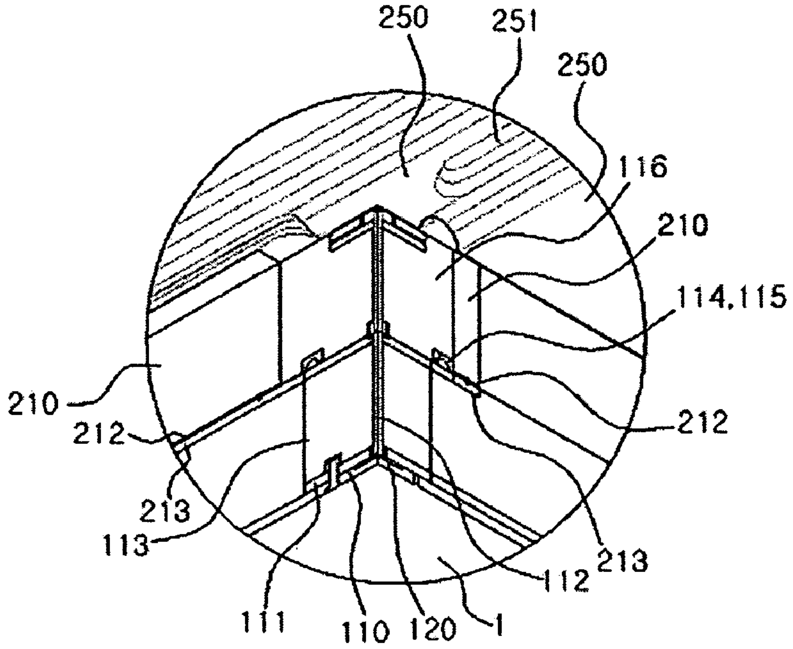
(b)

【Fig. 27】
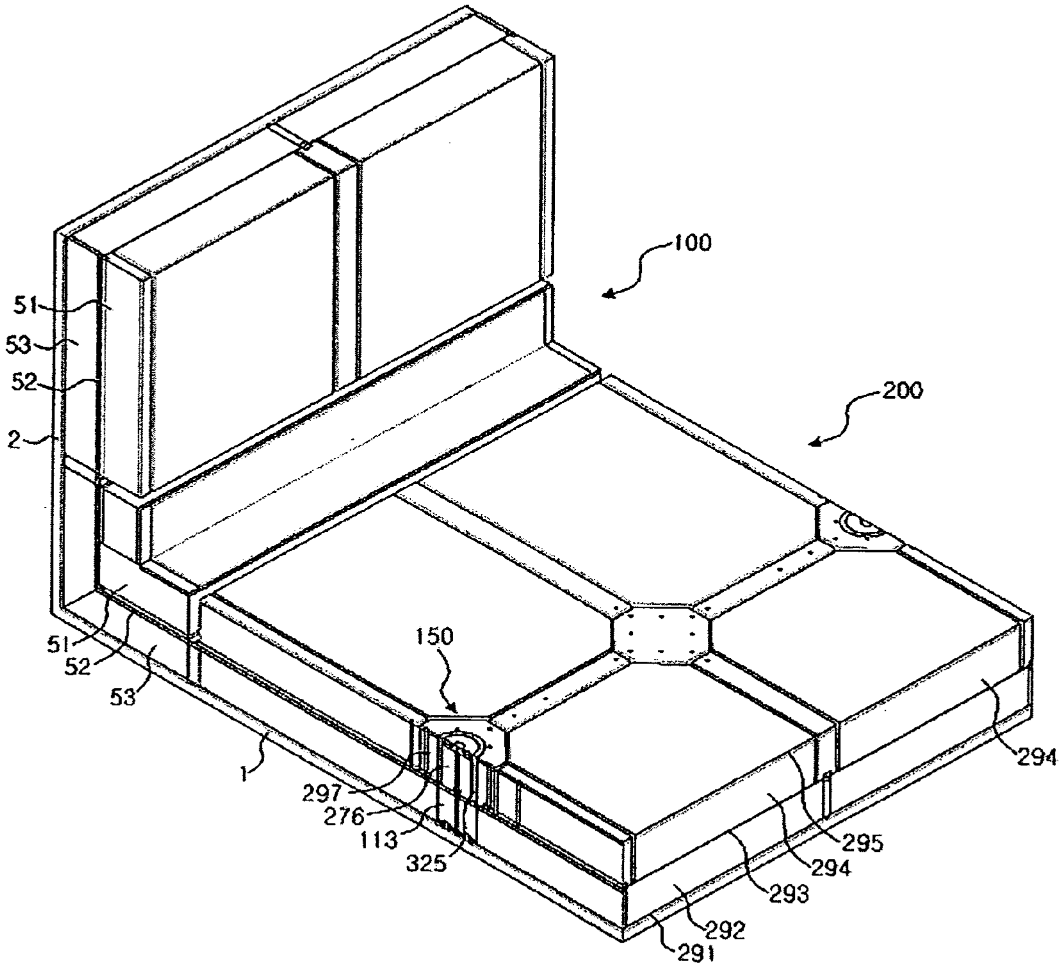

【Fig. 28】
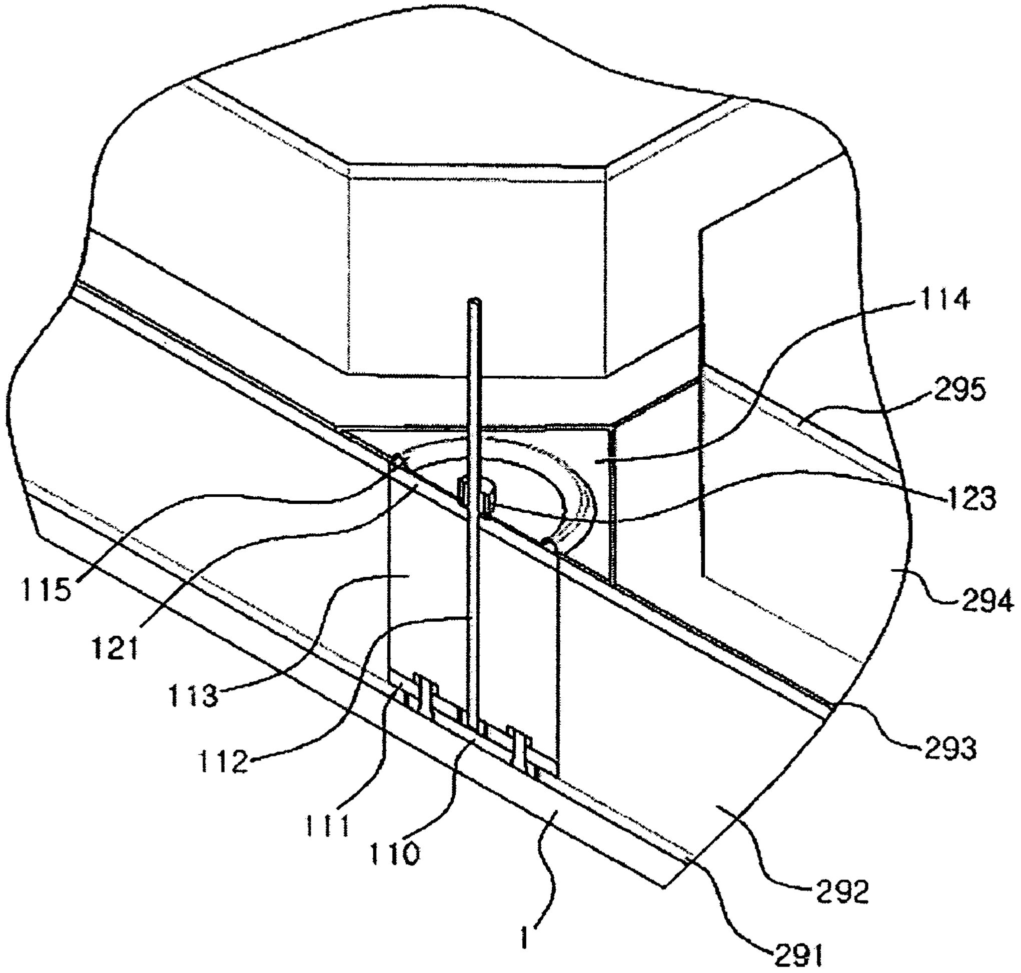

【Fig. 29】
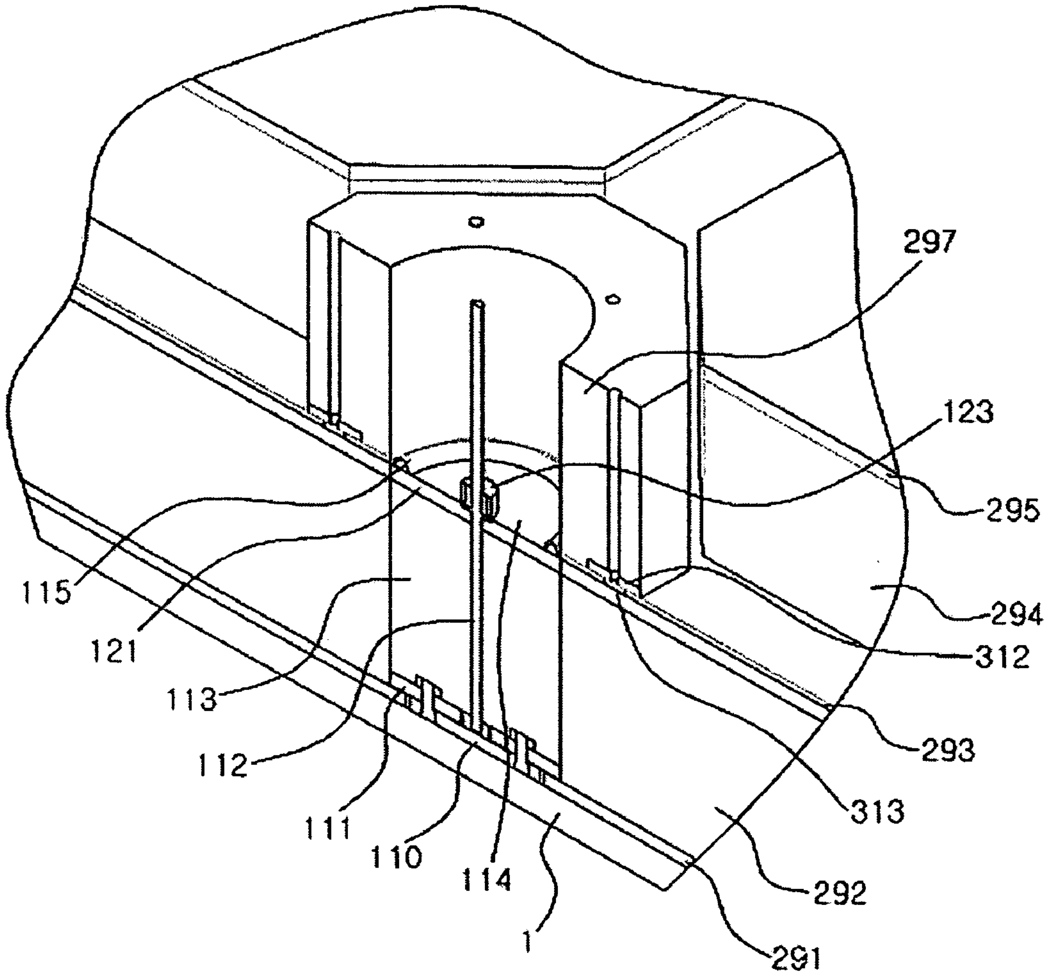

【Fig. 30】
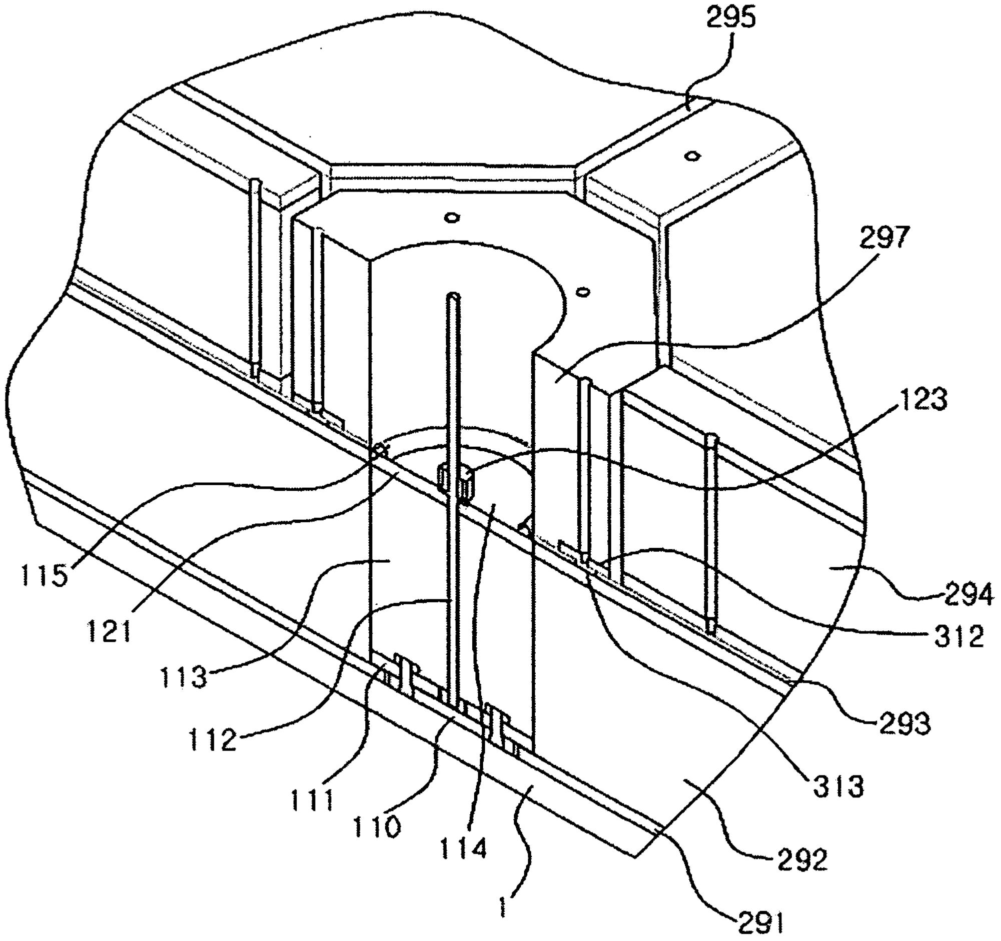

【Fig. 31】
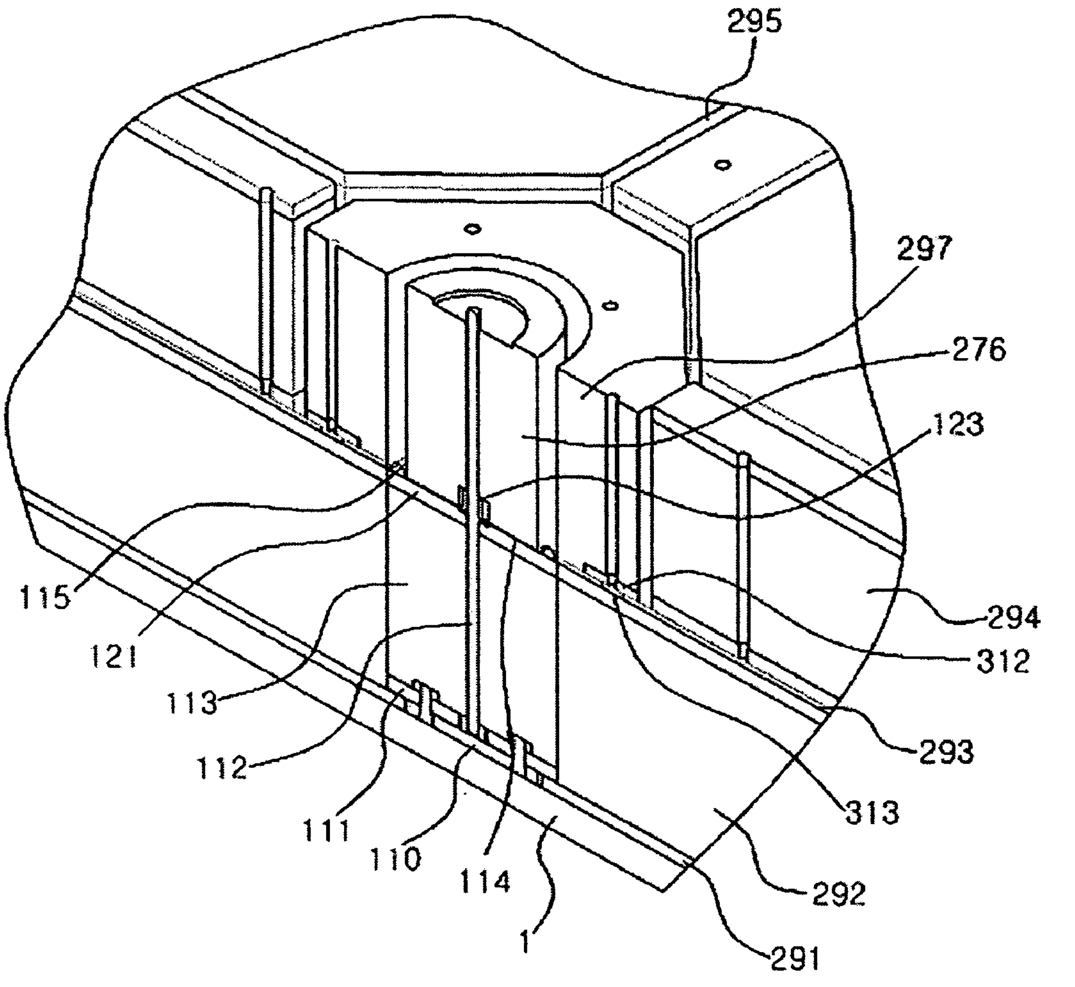

【Fig. 32】
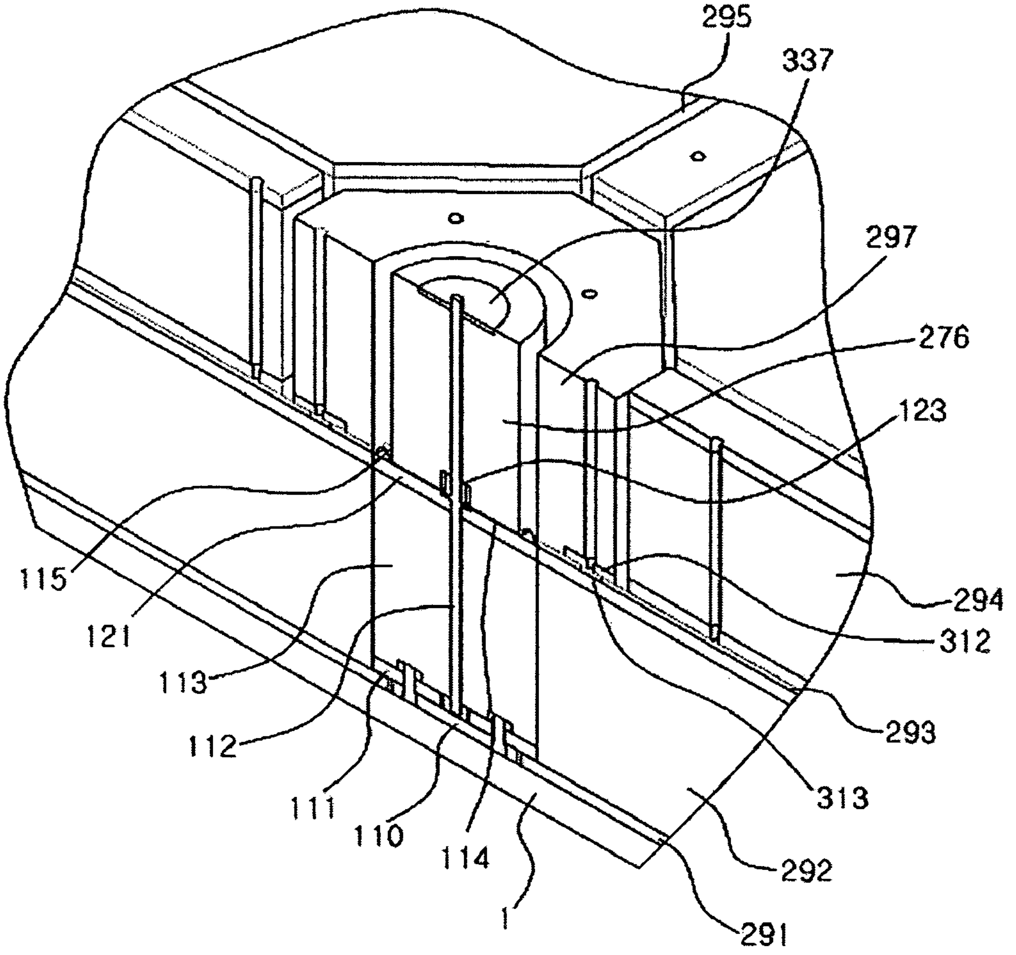

【Fig. 33】
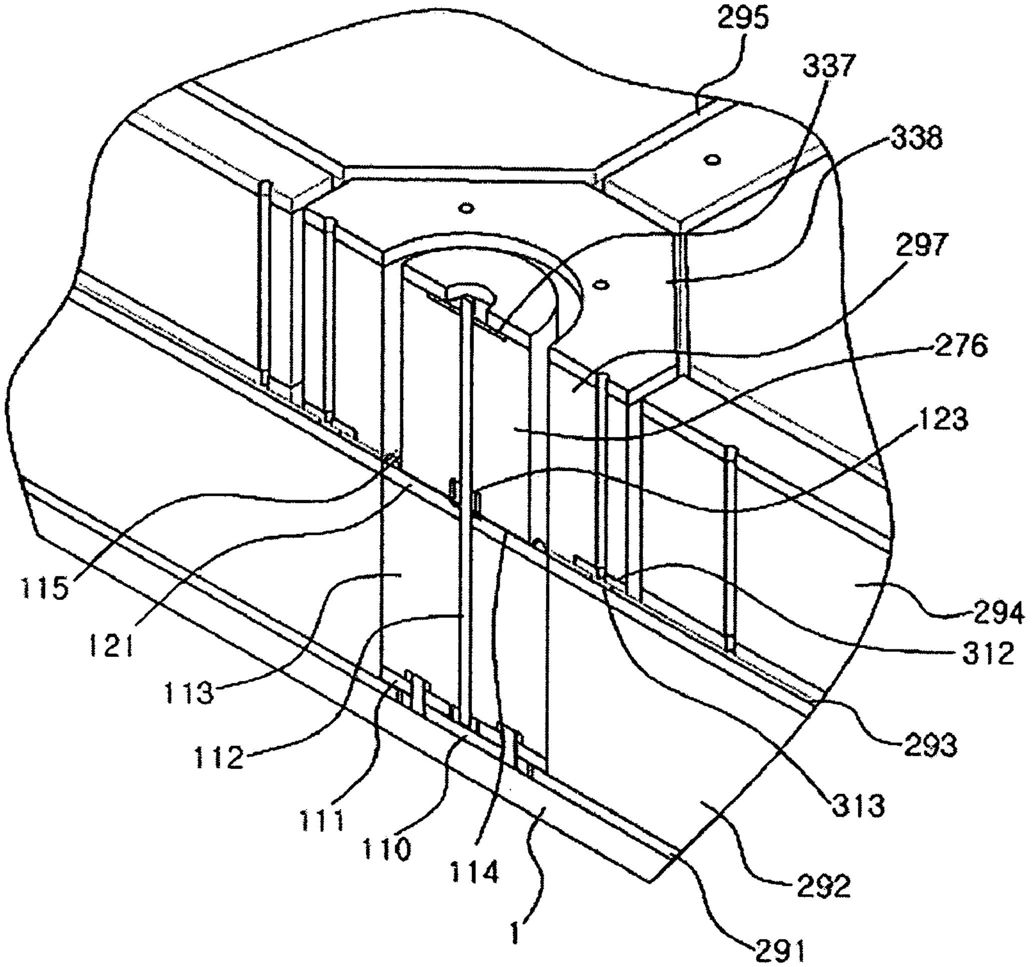

【Fig. 34】
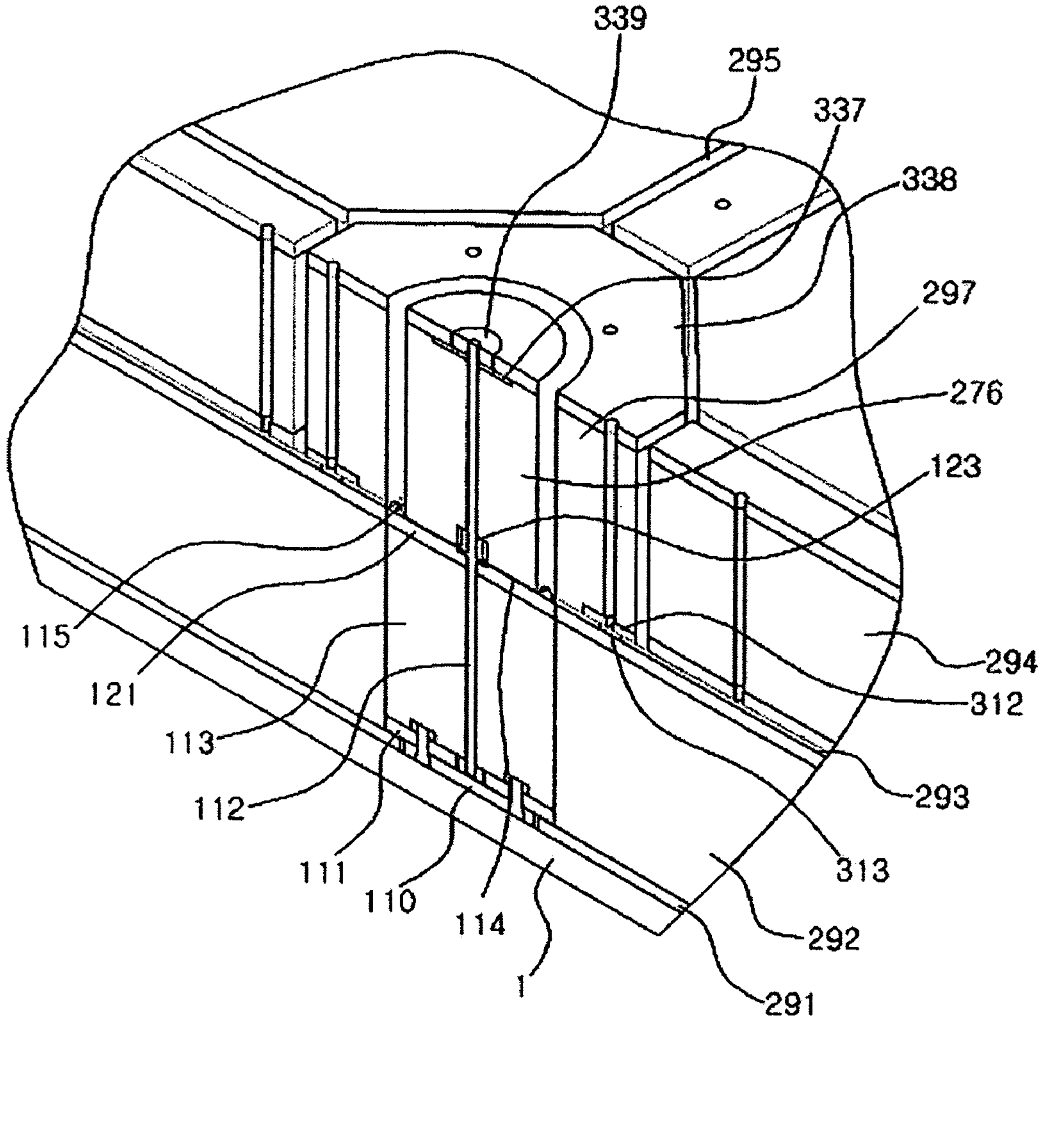

【Fig. 35】
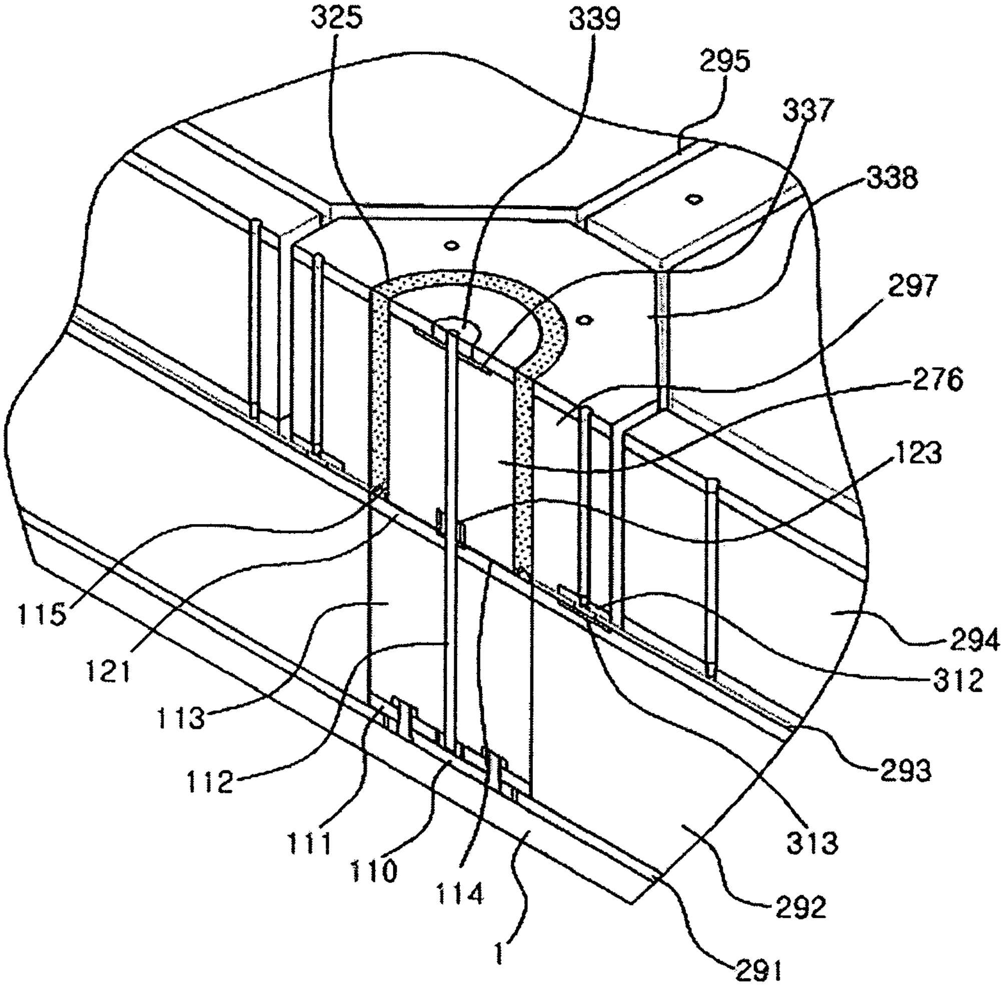

【Fig. 36】
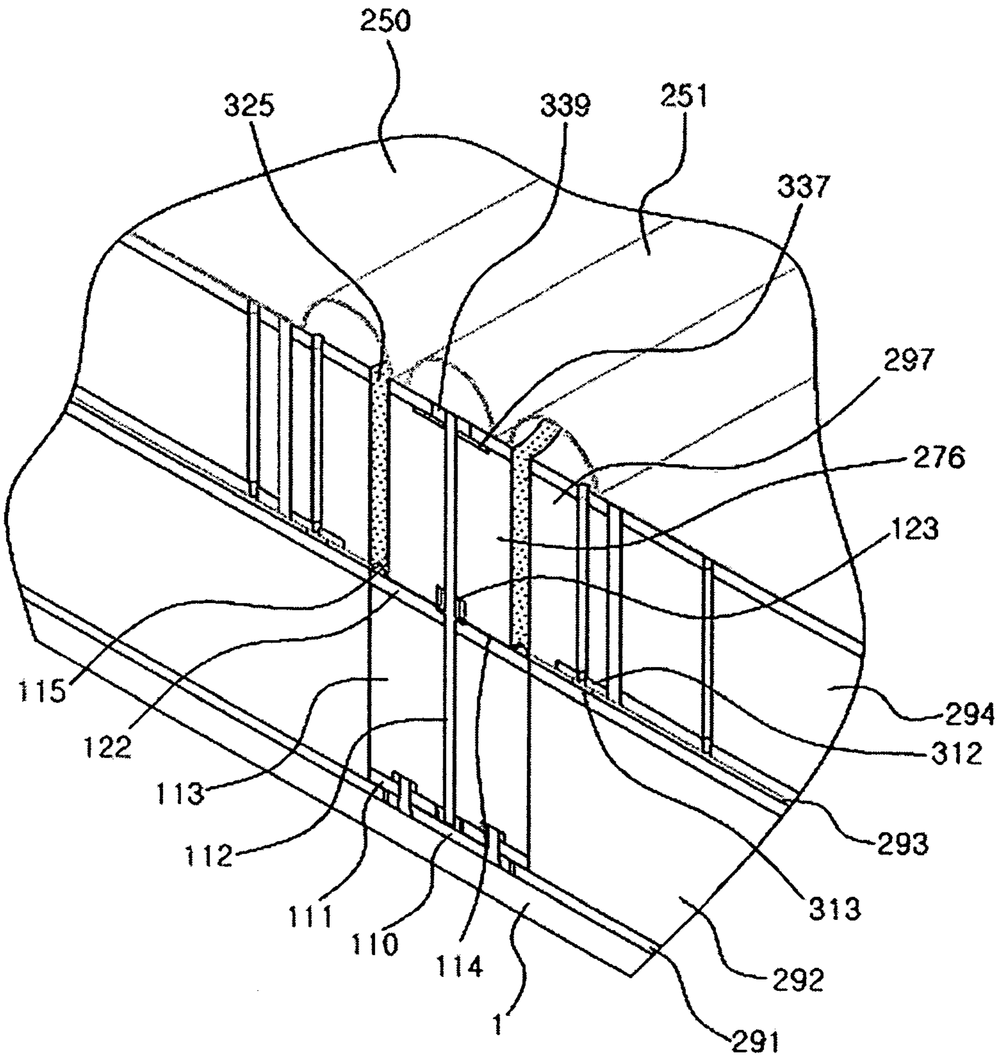

【Fig. 37】
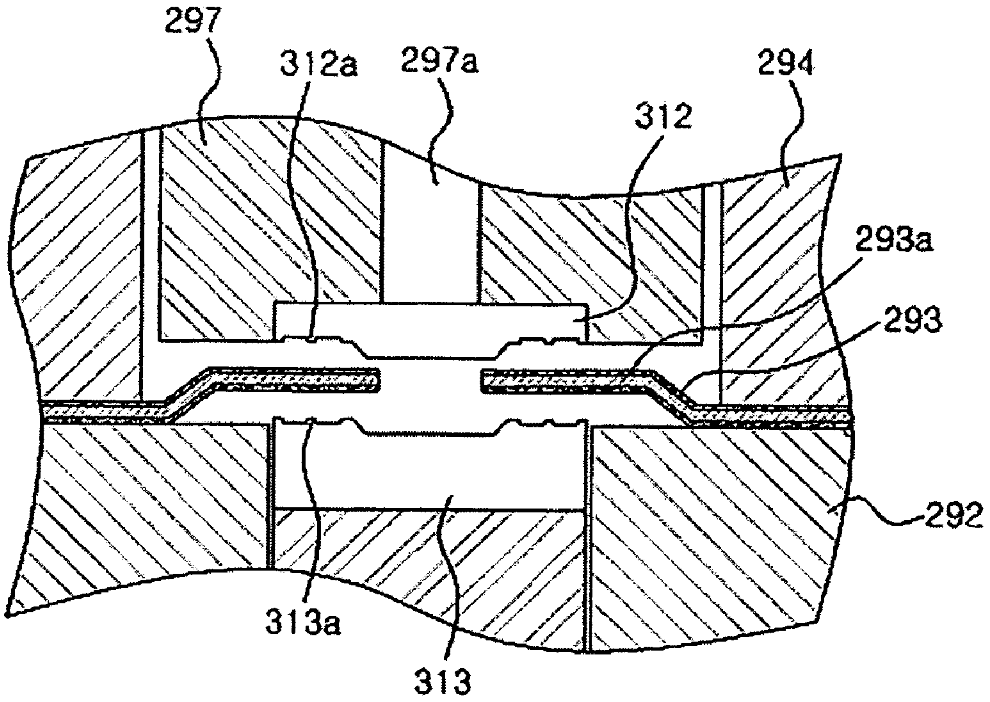
【Fig. 38】
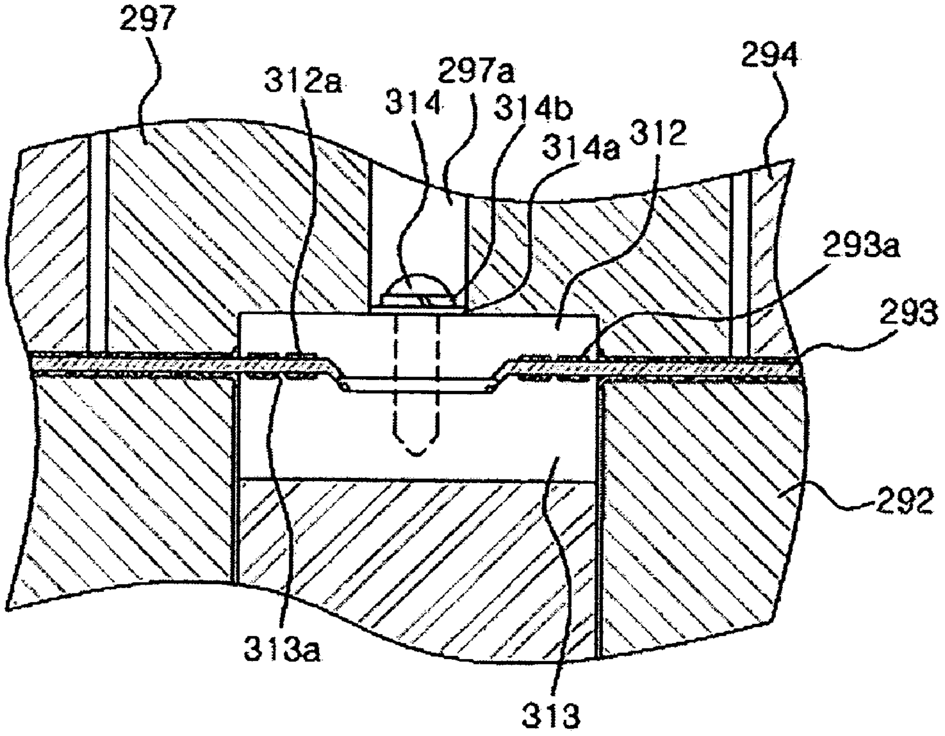

【Fig. 39】
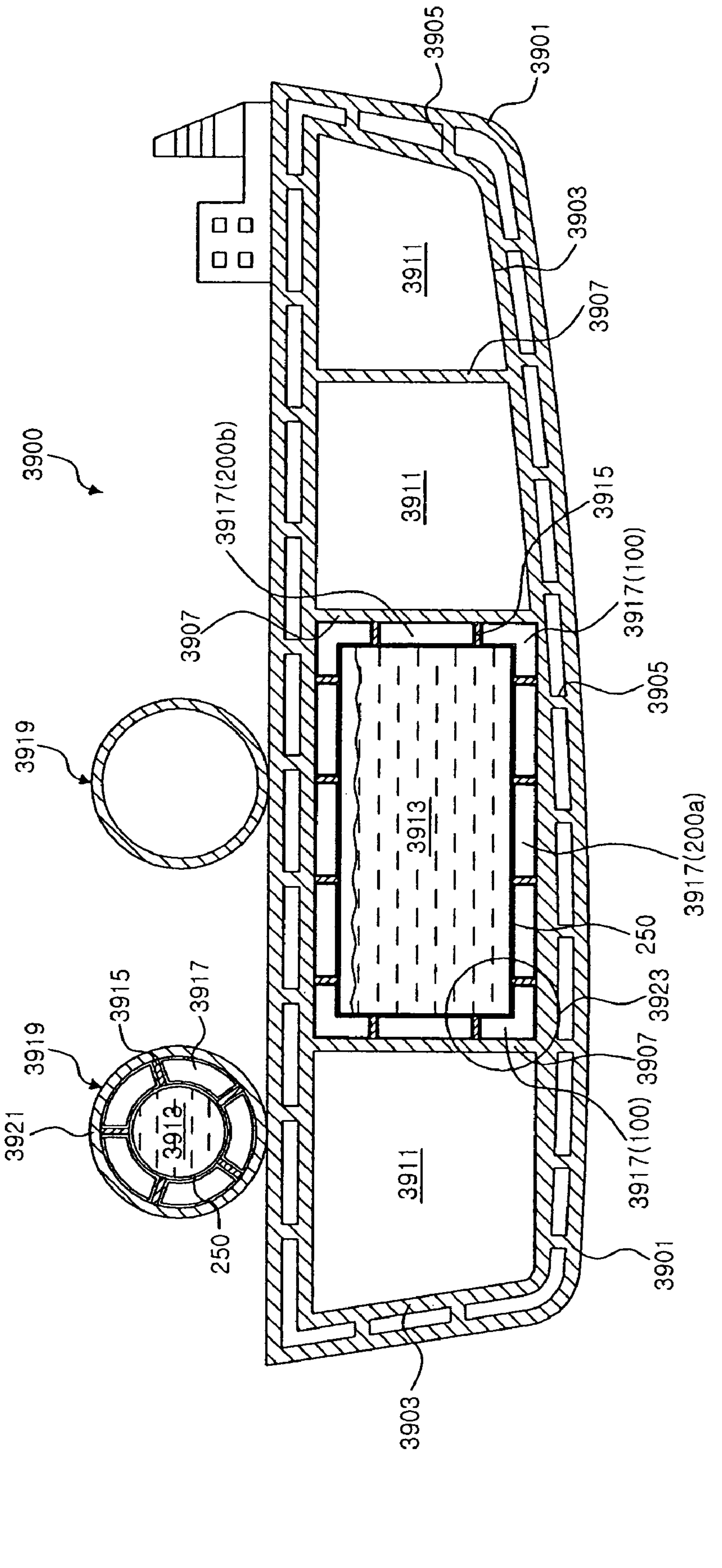

【Fig. 40】
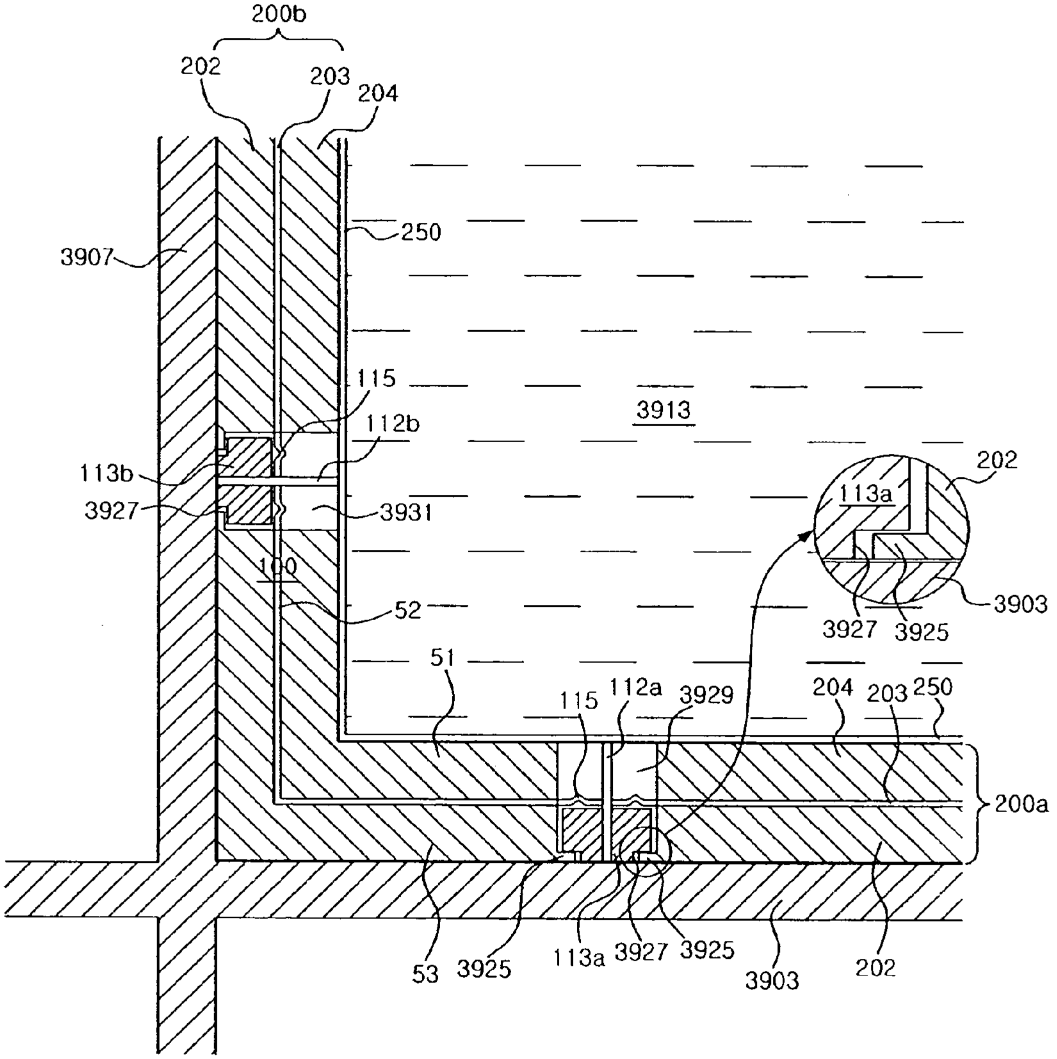

【Fig. 41】
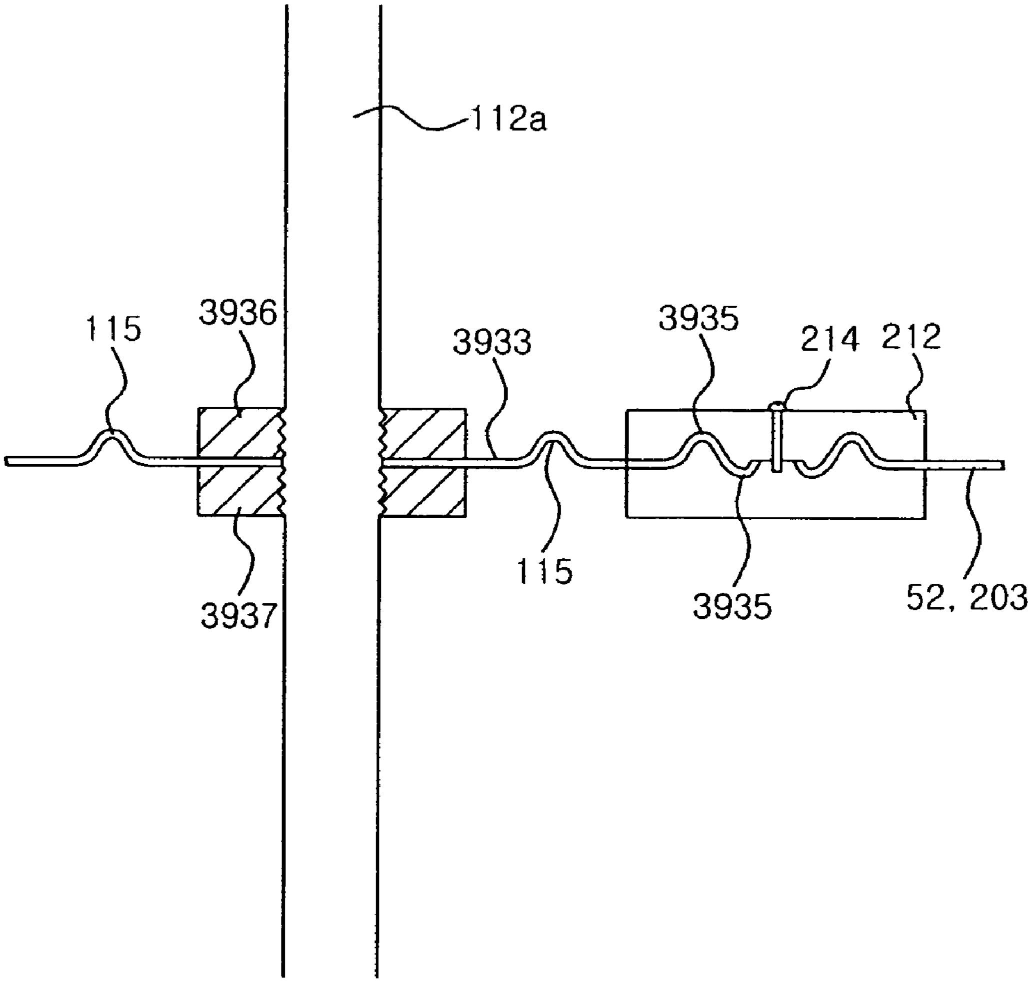

METHOD FOR MANUFACTURING LIQUID TANK AND SHIP WITH LIQUID TANK

RELATED APPLICATIONS

This application is a continuation-in-part under 35 U.S.C. §365 (c) of International Application No. PCT/KR2005/000327 filed Feb. 3, 2005, designating the United States and claiming for the benefit of the earlier filing dates under 35 U.S.C. §365 (b) of Korean Patent Application Nos. 10-2004-0103254 filed Dec. 8, 2004, 10-2004-0103255 filed Dec. 8, 2004, 10-2004-0103256 filed Dec. 8, 2004, 10-2004-0103257 filed Dec. 8, 2004 and 10-2005-0009313 filed Feb. 1, 2005. International Application No. PCT/KR2005/000327 has not been published as of the filing date.

TECHNICAL FIELD

The invention relates to a liquid container and method of making the liquid container.

BACKGROUND

In general, liquefied natural gas ("LNG") is obtained by causing natural gas, one of fossil fuels, to be liquefied. An LNG storage tank is classified into a ground storage tank, which is installed on the ground or buried in the ground according to installation positions, and a mobile storage tank, which is mounted on transportation means such as automobiles and ships.

The aforementioned LNG is stored in a cryogenic state and is explosive when it is exposed to shock. Thus, the LNG storage tank should be constructed such that shock resistance and liquid-tight characteristics thereof can be firmly maintained. The LNG storage tank installed on a mobile automobile or ship is slightly different from the ground storage tank with little motion in view of their configurations in that it should provide a means for overcoming mechanical stress due to the motion thereof. However, the LNG storage tank, which is installed on a ship and provided with a means for overcoming the mechanical stress, can also be used as a ground storage tank. Therefore, the structure of an LNG storage tank installed on a ship will be described herein by way of example.

First, an LNG storage tank installed within an LNG carrier may be classified into an independent tank type and a membrane type. This corresponds to classification according to whether cargo load is applied directly to an insulating material, and detailed description thereof will be discussed as follows.

As shown in Table 1, GT type made in Gaz Transport and TGZ type made in Technigaz are renamed and used as GTT NO 96-2 and GTT Mark III, respectively, as Gaz Transport (GT) and Technigaz (TGZ) are merged into and renamed as Gaztransport & Technigaz (GTT) in 1995.

The structures of the aforementioned GT type and TGZ type tanks are described in U.S. Pat. No. 6,035,795, U.S. Pat. No. 6,378,722, U.S. Pat. No. 5,586,513, U.S. Patent Laid-Open Publication No. 2003-0000949, Korean Patent Laid-Open Publication No. 2000-0011346, and the like.

TABLE 1

Classification of LNG storage tanks

| | Membrane Type | | Independent Type | |
|---|---|---|---|---|
| Item | GTT Mark III | GTT NO 96-2 | MOSS | IHI - SPB |
| Tank Material-thickness | SUS 304L-1.2 mm | Invar Steel-0.7 mm | Al Alloy Steel-50 mm | Al Alloy Steel-Max. 30 mm |
| Insulating Material-thickness | Reinforced Polyurethane Foam-250 mm | Plywood Box + Perlite-530 mm | Polyurethane Foam-250 mm | Polyurethane Foam-200 mm |

The membrane type LNG carrier of GTT is configured in such a manner that cargo load is directly applied to an insulating material or ship's hull and a cofferdam is installed between adjacent cargo tanks to avoid danger due to mechanical/thermal characteristics. Further, an air temperature in the cofferdam should be kept at a temperature of +5° C. or more in order to prevent low-temperature brittleness in an inner plate at a side of the cofferdam. To this end, a heating means such as a heating coil is generally installed to utilize a heat source such as steam or hot water. In order to construct the insulating material, a scaffold is first installed at a ship's hull, and scaffold materials, insulation boxes and membranes manufactured on land, and other materials are then carried and installed. A working hour before launch is longer in case of an old tank, whereas a working hour after launch is longer in a membrane type.

As shown in FIGS. 1 and 2, a GTT NO 96-2 type carrier among the GTT membrane type carriers is made of Invar steel (36% Ni) with a thickness of 0.5~0.7 mm, and first and second sealing barriers 10 and 15 have the almost same liquid-tight characteristics and strength as each other. Therefore, cargo can be safely carried using only the second sealing barrier 15 in a substantial period of time even when the first sealing barrier 10 leaks. Further, since a membrane of the sealing barriers 10 and 15 of the GTT NO 96-2 is straight, it can be more conveniently welded than a Mark III type corrugated membrane. Accordingly, the automation ratio of GTT NO 96-2 type is higher than that of GTT Mark III type, whereas the overall length of GTT NO 96-2 type to be welded is longer than that of GTT Mark III type.

Furthermore, the currently employed GTT NO 96-2 type is most different from the conventional GT type in that instead of U-shaped bars, a plurality of double couples 17 are used to support the insulation box 11 and 16 (insulation barrier). The functions of main parts of heat-insulating sections of the GTT NO 96-2 type storage tank of the LNG carrier are as shown in Table 2.

TABLE 2

| Main parts of heat-insulating sections of GTT NO 96-2 type storage tank | |
|---|---|
| Item | Function |
| Tongue | It is installed at an insulation box and welded in three-ply way between membrane sheets to connect them, and it allows the membrane and insulation box to be connected to each other. |
| Joist | It is installed between the insulation boxes to reduce horizontal displacement and prevent high stress from being created. |
| First and second insulation barriers (Perlite) | It prevents heat from being transferred into the storage tank. |
| First sealing barrier (Invar) | It provides a primary countermeasure and is a portion that comes into direct contact with the cargo having a temperature of −163° C. and primarily defines the storage tank. |
| Second sealing barrier (Invar) | It provides a secondary countermeasure and performs a function of preventing cargo from leaking out during a predetermined period of time when the first sealing barrier is broken down. |

On the other hand, as shown in FIGS. 3 and 4, a GTT Mark III type is made of a stainless steel membrane with waveforms having a thickness of 1.2 mm, as a first sealing barrier 20, attached thereto. In such a case, since contraction due to low temperature is absorbed in folds of the corrugations, large stress is hardly created in the membrane. Further, insulation barriers 21 and 26 are made of polyurethane foam, glass wool, Triplex or the like. The Mark III type is constructed in such a manner that the first and second insulation barriers 21 and 26 are manufactured on land and then integrated thereto. Therefore, the construction of the Mark III type is relatively easy as compared with the GTT NO 96-2 type in which the first and second insulation boxes 21 and 26 are respectively installed.

The functions of main parts of heat-insulating sections of the GTT Mark III type storage tank of the LNG carrier are as shown in Table 3.

TABLE 3

| Main parts of heat-insulating sections of GTT Mark III type storage tank | |
|---|---|
| Item | Function |
| Mastic | It transfers cargo load to the ship's hull. |
| Plywood | It is installed between the first and second sealing barriers and the first and second insulation barriers, allows constant load to be applied to the sealing barriers due to the uniform arrangement of the insulation barriers, and reduces the displacement created due to vertical load. |
| Glass wool | It is installed between the insulation boxes, reduces the horizontal displacement and prevents the occurrence of high stress. |
| First and second insulation barriers (Polyurethane foam) | It prevents heat from being transferred into the storage tank. |
| Second sealing barrier (Triplex) | It has a function of preventing the cargo from leaking out during a predetermined period of time when the first membrane, i.e. the first sealing barrier, and is configured such that the glass cloth is bonded to both surfaces of Al foils. |

TABLE 3-continued

| Main parts of heat-insulating sections of GTT Mark III type storage tank | |
|---|---|
| Item | Function |
| First sealing barrier (SUS 304L) | It is a first membrane with which cargo with a temperature of about −163° C. is brought into contact, primarily defines a cargo tank, and is constructed to have such a corrugated structure that it can withstand thermal stress. |

An important part of the GTT NO 96-2 type and GTT Mark III type storage tanks so configured is a corner part.

Here, the corner part (edge part) of the LNG storage tank is a region to which load created due to thermal stress of the respective sealing barriers (membranes) of the storage tank is asymmetrically applied. This corner part should be constructed such that the stress created from the storage tank can be eliminated by distributing the asymmetrical load.

A recent technology for the corner part (edge part) of the LNG storage tank includes "a water-tight and thermally insulating tank with an improved corner structure, built into the bearing structure of a ship" described in Korean Patent Laid-Open Publication No. 2000-0011347.

As shown in FIG. 5, the corner structure disclosed in the above Korean publication No. 2000-0011347 causes a prefabricated composite girder 30 to be fixed at a right angled region where a cross bulkhead 2 and an inner face 1 of the ship's hull join together. The composite bulkhead 30 comprises a heat-insulating material 40 including reinforced webs 39 (shown in a dotted line) that are formed at a regular interval on a hard W-shaped metal body 31.

This type of prefabricated composite girder 30 is configured in such a manner that portions brought into surface contact with the cross bulkhead 2 and inner face 1 of the ship's hull are fixed thereto via polymeric resin 34 and opposite branched surfaces are mechanically fastened to the bearing structure of the ship's hull by means of fixing means 32 and 33 that are supported on the cross bulkhead 2 and inner face 1 of the hull, respectively.

In addition, a bottom surface of the prefabricated composite girder 30 has an inclined surface 42 such that a drainage space 41 is formed at the right-angled portion where the inner face 1 and cross bulkhead 2 join together.

The technology for fabricating the corner part of the LNG storage tank using the aforementioned prefabricated composite girder 30 has advantages in that the installation costs become inexpensive thanks to its simple structure and resistance of the sealing barriers against the mechanical impact can be improved without impairing the painted portion of the double bulkhead. However, the fabricating process for the corner part is not easy because the prefabricated composite girder 30, i.e. a basic unit of the corner part of the storage tank, includes the hard metal body 31 which in turn is manually fixed to the cross bulkhead 2 and inner face 1 of the hull by means of mechanical fixing means 32 and 33 (e.g., bolts and nuts) fixedly formed on the bulkhead and inner face.

The corner structure of the aforementioned membrane type LNG storage tank is a structure where the prefabricated composite girder 30, i.e. the basic unit of the corner part of the aforementioned storage tank, is firmly fixed to the cross bulkhead 2 and inner face 1 of the ship's hull. Therefore, any stress may be partially produced due to a wave or when the hull is moved, and thus, may be concentrated on the corner part. Accordingly, some efforts to reduce the stress concentration are made for several decades and continuous efforts to reduce the stress concentration are further needed.

Furthermore, continuous efforts to reduce boiled off gas (BOG), i.e. loss due to vaporization of cryogenic LNG, and to simplify the structure and manufacturing process of the LNG storage tank are further made.

SUMMARY

One aspect of the invention provides a liquid container. The liquid container comprises: an sealing wall configured to directly contact liquid contained in the container; a structural wall comprising an exterior wall of the liquid container or an inner structure integrated with the exterior wall; a plurality of connectors mechanically connecting the sealing wall and the structural wall; and an intermediate wall structure positioned between the structural wall and the sealing wall, wherein the intermediate wall structure may be configured to move relative to at least one of the sealing wall and the structural wall. The intermediate wall structure may comprise a first surface facing the sealing wall, wherein the interior surface may comprise a first surface facing the intermediate wall structure, and wherein the first surface of the intermediate wall structure may contact the first surface of the sealing wall. The first surface of the intermediate wall structure may be substantially parallel to the first surface of the sealing wall, and wherein the first surface of the intermediate wall structure may be slidable with reference to the first surface of the sealing wall.

In the above-described container, the intermediate wall structure may comprise a second surface facing the structural wall, wherein the structural wall may comprise a second surface facing the intermediate wall structure, and wherein the second surface of the intermediate wall structure may contact the second surface of the structural wall. The second surface of the intermediate wall structure may be substantially parallel to the second surface of the structural wall, and wherein the second surface of the intermediate wall structure may be slidable with reference to the second surface of the structural wall. The intermediate wall structure may be configured to slide with reference to the sealing wall and the structural wall. The plurality of connectors may be arranged to be elongated in a direction substantially perpendicular to at least one of the sealing wall and the structural wall. The intermediate wall structure may be mechanically connected to the plurality of connectors, and wherein the mechanical connection between the intermediate wall structure and the plurality of connectors may allow the intermediate wall structure to move relative to the plurality of connectors. The intermediate wall structure may have a plurality of through holes, and wherein each connector passes through each through hole. The intermediate wall structure may be configured to slide relative to at least one of the sealing wall and the structural wall in a direction substantially parallel to at least one of the sealing wall and the structural wall.

In the above-described container, the intermediate wall structure may comprise: a first layer facing the sealing wall; a second layer facing the structural wall; and a sealing layer positioned between the first and second layers. The intermediate wall structure may have a plurality of through holes, wherein each through hole may be configured to permit each connector to pass therethrough. The sealing layer of the intermediate wall structure may be configured to form a substantially liquid-tight connection with at least part of the plurality of connectors. The sealing layer of the intermediate wall structure may comprise a portion extending into each through hole, and wherein the portion may be configured to substantially liquid-tightly connect with the connector passing through each through hole. The portion may be further configured to stretch and shrink in a direction of the movement of the intermediate wall structure relative to the at least one of the sealing wall and the structural wall. The connector may comprise a sealing layer configured to form a substantially liquid-tight connection with the sealing layer of the intermediate wall structure. The sealing layer of the connector may comprise a portion extending into each through hole, and wherein the portion may be configured to substantially liquid-tightly engage with the sealing layer of the intermediate wall structure. The portion may be further configured to stretch and shrink in a direction of the relative movement of the intermediate wall structure. There may be a gap between each connector passing through each through hole, and wherein the gap may be substantially filled with an insulating material.

In the above-described container, the first layer may comprise an insulating layer. The intermediate wall structure may further comprise an insulating layer located between the first layer and the sealing layer. The first layer may comprise an outer shell of the insulating material. The intermediate wall structure may comprise a plurality of modules connected to one another to form the intermediate wall structure, each module comprising: a first layer configured to face the sealing wall; a second layer configured to face the structural wall; and a sealing layer positioned between the first and second layers. The plurality of modules may be arranged such that the sealing layer of each module may be positioned at substantially the same distance from the structural wall and may be aligned with the sealing layer of a neighboring module, and the sealing layers of the neighboring modules may be liquid-tightly connected together. The liquid container may comprise a vehicle for transporting liquid. The vehicle may comprise a ship, train or truck. The vehicle may comprise a ship, and wherein the structural wall may comprise an exterior wall of the ship or an inner structure of the ship integrated with the exterior wall of the ship.

Another aspect of the invention provides a liquid container. The liquid container comprises: an sealing wall comprising an interior surface configured to directly contact liquid contained in the container; a structural wall comprising an exterior wall of the liquid container or an inner structure integrated with the exterior wall; an intermediate wall structure positioned between the structural wall and the sealing wall, the intermediate wall structure comprising a first surface facing the sealing wall and a second surface facing the structural wall; and wherein the sealing wall contacts the first surface of the intermediate wall structure while the sealing wall and the first surface may be configured to slide relative to each other. The sealing wall and the first surface may make no direct connection or bonding therebetween that inhibits sliding thereof relative to each other. The liquid container may further comprise a reinforcing layer located between the sealing wall and the intermediate wall structure, wherein the first surface of the intermediate wall structure may contact the reinforcing layer without direct connection with the reinforcing layer. The reinforcing layer may be integrated with the sealing wall. The second surface contacts the structural wall while the second surface and the structural wall make no direct connection or bonding therebetween that inhibits sliding thereof relative to each other.

In the above-described liquid container, the sealing wall may comprise a first sealing wall portion and a second sealing wall portion, wherein the first sealing wall portion and the second sealing wall portion may be connected to each other via an angular relationship, wherein the structural wall may comprise a first structural wall portion and a second structural portion, wherein the first structural wall portion may be substantially parallel to the first sealing wall portion, wherein the second structural wall portion may be substantially parallel to the second sealing wall portion, wherein the intermediate wall structure may comprise a first intermediate wall structure portion and a second intermediate wall structure portion, and wherein the first intermediate wall structure portion may contact the first sealing wall portion while not directly connected or bound to the first sealing wall portion. The first sealing wall portion and the second sealing wall portion may be substantially perpendicular to each other. The liquid container may further comprise a first reinforcing layer between the first sealing wall portion and the first intermediate wall structure portion, wherein the first reinforcing layer may be configured to slide with reference to the first intermediate wall structure portion. The first sealing wall portion and the second sealing wall portion may be connected liquid-tightly therebetween. The intermediate wall structure may comprise a first insulating layer, a second insulating layer and a sealing layer.

Another aspect of the invention provides a ship comprising a tank for containing liquid. The tank comprises: a sealing wall; a structural wall of the ship; a plurality of anchors positioned between the sealing wall and the structural wall, each anchor comprising a first end connected to the sealing wall and a second end connected to the structural wall; and an intermediate wall positioned between the structural wall and the sealing wall, wherein intermediate wall is configured to slide relative to at least one of the sealing wall and the structural wall. The structural wall may comprise a partitioning wall within the ship. The plurality of anchors may be elongated in a direction substantially perpendicular to at least one of the sealing wall and the structural wall. The intermediate wall may comprise a first surface in contact with the sealing wall, and wherein the first surface of the intermediate wall may be not bonded or attached directly to the sealing wall. The intermediate wall may comprise a second surface in contact with the structural wall, and wherein the second surface of the intermediate wall may be not bonded or attached directly to the sealing wall.

In the foregoing ship, the intermediate wall may comprise a plurality of through holes in a direction substantially perpendicular to at least one of the sealing wall and the structural wall. Each anchor may be placed in one of the plurality of through holes while the first and second ends may be connected to the sealing wall and the structural wall, respectively. The intermediate wall may comprise a first insulating layer, a second insulating layer and a sealing layer located between the first and second insulating layers, and wherein each anchor may comprise a sealing plate configured to be liquid-tightly connected with the sealing layer. The sealing plate may be arranged substantially parallel to the sealing layer of the intermediate wall. The sealing plate may comprise at least one corrugated area configured to allow stretching and shrinkage when a force is applied thereto in a direction on a plane where the sealing plate may be placed. The intermediate wall may comprise a first insulating layer and a sealing layer, which may be substantially parallel to the sealing wall, and wherein the first insulating layer may be located between the sealing wall and the sealing layer.

Still another aspect of the invention provides a ship with a liquid tank. The liquid tank comprises: a sealing wall configured to directly contact liquid contained in the tank; a structural wall; an intermediate wall positioned between the structural wall and the sealing wall; and wherein the sealing wall is configured to move relative to at least one of the intermediate wall and the structural wall. The intermediate wall may have a first surface facing and contacting the sealing wall, and wherein the first surface may be not directly attached to the sealing wall. The ship may further comprise a reinforcing layer positioned between the sealing wall and the intermediate wall, wherein the reinforcing layer may be integrated with the sealing wall, and wherein the reinforcing layer contacts the intermediate wall. The intermediate wall may comprise a first insulating layer, a second insulating layer and a sealing layer located between the first and second insulating layers. The intermediate wall may have a second surface facing and contacting the structural wall, and wherein the second surface may be configured to move relative to the structural wall. The intermediate wall may have a second surface facing and contacting the structural wall, and wherein the second surface may be not directly attached to the structural wall. The structural wall may comprise an exterior wall of the ship or inner wall integrated with the exterior wall. The sealing wall may comprise a first sealing wall portion and a second sealing wall portion, wherein the first and second sealing wall portions may be connected to each other via an angular relationship wherein the intermediate wall may comprise a first intermediate wall portion and a second intermediate wall portion, wherein the first and second intermediate wall portions may be connected to each other by substantially the same angle as the first and second sealing wall portions, and wherein the first intermediate wall portion may contact the first sealing wall portion and does not directly attach to the first sealing wall portion.

Still another aspect of the invention provides a ship comprising a liquid tank. The ship comprising: a first sealing wall; a second sealing wall surrounding the first sealing wall; a first insulating layer between the first sealing wall and the second sealing wall; a structural wall comprising an exterior wall of the ship or an interior wall integrated with the exterior wall of the ship; a second insulating layer located between the second sealing wall and the structural wall; a plurality of anchors connecting the first sealing wall and the structural wall, each anchor having a first end and a second end, the first end being attached to the first sealing wall, and the second end being attached to the structural wall; and wherein the second sealing wall is configured to move relative to at least one of the first sealing wall and the structural wall. Each anchor may be elongated in a direction substantially perpendicular to at least one of the first and second sealing walls. The second sealing wall may be integrated with at least one of the first insulating layer and the second insulating layer, and wherein the at least one of the first insulating layer and the second insulating layer may be configured to move relative to at least one of the first sealing wall and the structural wall. Each anchor passes through a hole formed in the second sealing wall. Each anchor may comprise a sealing plate configured to liquid-tightly connect with an edge of the hole of the second sealing wall. The sealing plate may be liquid-tightly integrated with a body of each anchor. At least one of the sealing plate and the second sealing wall may comprise a corrugated portion configured to shrink and expand upon application of force thereto, and wherein the second sealing wall may be configured to move relative to at least one of the plurality of anchors. When the second sealing wall moves relative to one of the plurality of anchors, the corrugated portion shrinks or expands.

A further aspect of the invention provides a wall module configured to be connected with another wall module for use in manufacturing a liquid container. The wall module comprising: a first outer layer; a first insulating layer formed over the first outer layer, the first insulating layer comprising a first edge and a first side surface extending from the first edge; a sealing layer formed over the first insulating layer; a second insulating layer formed over the sealing layer; and a flange extending from the first outer layer outwardly beyond the first side surface in a direction substantially perpendicular to the first side surface. The wall module may further comprise a second outer layer formed over the second insulating layer. The flange extending from the first outer layer may be configured to align with a corresponding flange of another wall module. The sealing layer may extend outwardly beyond the first side surface in a direction substantially perpendicular to the first side surface. The sealing layer may be configured to liquid-tightly connect with a corresponding sealing layer of another wall module. The second insulating layer may comprise a second edge and a second side surface extending from the second edge, wherein the second side surface may be substantially parallel to the first side surface, and wherein the second side surface may be located at an inward position relative to the first side surface. The sealing layer may extend beyond the second side surface.

A further aspect of the invention provides a wall module configured to be connected with another wall module for use in manufacturing a liquid container. The wall module comprising: a first insulating layer comprising a first edge and a first side surface extending from the first edge; a second insulating layer comprising a second edge and a second side surface extending from the second edge thereof, the second edge being substantially parallel to the first edge; and a sealing layer located between the first and second insulating layers, the sealing layer comprising an extended portion extending outwardly beyond both the first and second side surfaces. The extended portion of the sealing layer may be configured to liquid-tightly connect with a corresponding portion of another wall module. The extended portion of the sealing layer may comprise a connecting area, and wherein a cross-section of the connecting area in a plane substantially perpendicular to the first edge may comprise at least one turn along the extended portion extending away from the first side surface. The wall module may further comprise an outer layer formed on the first insulating layer, the outer layer comprising a flange extending outwardly beyond the first side surface in a direction substantially perpendicular to the first side surface, wherein the flange may be configured to align a corresponding flange of another wall module. The first side surface may be configured to face a corresponding side surface of another wall module, and wherein the second side surface may be configured to face a corresponding side surface of another wall module.

A further aspect of the invention provides a wall module assembly, which comprises: a first wall module comprising a top surface, a bottom surface and a first side, the first wall module may further comprise two insulating layers and a sealing layer located between the two insulating layers, the first side comprising a upper side surface and a lower side surface, the first side may further comprise an extension of the sealing layer extending outwardly beyond both the upper and lower side surfaces, the extension of the sealing layer further extending substantially laterally so as to divide the first side into the upper and lower side surfaces; a second wall module comprising a top surface, a bottom surface and a second side, the second wall module may further comprise two insulating layers and a sealing layer located between the two insulating layers, the second side comprising an upper side surface and a lower side surface, the second side may further comprise an extension of the sealing layer extending outwardly beyond at least one of the upper and lower side surfaces, the extension of the sealing layer further extending substantially laterally so as to divide the second side into the upper and lower side surfaces; wherein the first wall module and the second wall module are arranged such that the first side opposes the second side and that the extension of the sealing layer of the first wall module aligns along with the second wall module extension; and wherein the first wall module extension and the second wall module extension are liquid-tightly connected.

The foregoing wall module assembly may further comprise an insulating material between the lower side surfaces of the first and second wall modules and under where the extensions of the first and second wall modules may be connected. The wall module assembly may further comprise an insulating material between the upper side surfaces of the first and second wall modules and over where the extension of the first and second wall modules may be connected. The wall module assembly may further comprise a first connecting piece with a first engaging surface and a second connecting piece with a second engaging surface, wherein at least a portion of the extension may be located between the first engaging surface and the second engaging surface, and wherein the portion of the extension may be in contact with both the first engaging surface and the second engaging surface. The portion of the extension located between the first engaging surface and the second engaging surface may be squeezed by the first connecting piece and the second connecting piece. The first connecting piece may comprise at least one protrusion on the first engaging surface, and wherein the at least one protrusion may be configured to contact the portion of the extension. The second connecting piece may comprise at least one protrusion on the second engaging surface, and wherein the at least one protrusion of the second connecting piece may correspond to the at least one protrusion of the first connecting piece. The extension of the first wall module may comprise a connecting portion having a cross-section in a plane substantially perpendicular to a boundary between the lower surface and the extension, and wherein the cross-section changes directions at least one time as the extension extends away from the first side of the first wall module. The connecting portion may comprise at least one hill and at least one valley. The wall module assembly may further comprise a connector configured to liquid-tightly engage with the connecting portion of the extension.

A still further aspect of the invention provides a method of building a liquid container. The method comprises: providing a structural wall, an intermediate wall structure and a plurality of elongated anchors, each elongated anchor having a first end portion, a middle portion and a second end portion along a longitudinal direction thereof, the middle portion located between the first and second end portion; placing the intermediate wall structure on the structural wall; connecting the first end portion of the anchor with the structural wall; placing the sealing wall such that the intermediate wall structure and the anchor may be interposed between the structural wall and the sealing wall; connecting the second end portion of the anchor with the sealing wall; and wherein the intermediate wall structure and the sealing wall makes no direct connection that inhibits relative movement thereof with each other. The liquid container may comprise a ship, and wherein the structural wall may comprise an exterior wall or an interior wall of the ship. The intermediate wall structure may be not attached onto the sealing wall. The intermediate wall structure may be movable relative to at least one of the sealing wall and the structural wall.

In the foregoing method, connecting the first end portion may comprise attaching the first end portion to the structural wall such that the anchor is substantially non-movable relative to the structural wall. Connecting the second end portion may comprise attaching the second end portion to the sealing wall such that the anchor is substantially non-movable relative to the sealing wall. Placing the intermediate wall structure may comprise: placing a first wall module on the structural wall; placing a second wall module on the structural wall and next to the first wall module; and connecting the first and second wall modules to form the intermediate wall structure. Connecting the first end portion of the anchor may comprise: placing the anchor next to the intermediate wall structure such that the first end portion thereof faces the structural wall; and attaching the first end portion of the anchor to the structural wall such that the longitudinal direction thereof may be substantially perpendicular to the structural wall.

The foregoing method may further comprise liquid-tightly connecting the anchor with the intermediate wall structure. The method may further comprise connecting the anchor to the intermediate wall structure such that the intermediate wall structure may be allowed to move relative to the anchor. The intermediate wall structure may comprise a first insulating layer, a second insulating layer and a sealing layer located between the first and second insulating layers. The method may further comprise liquid-tightly connecting the sealing layer of the intermediate wall structure with the anchor. The method may further comprise liquid-tightly connecting a sealing plate with the middle portion of the anchor, wherein the sealing plate extends from the middle portion generally in a plane substantially perpendicular to the longitudinal direction, and wherein the sealing plate may be liquid tightly connected with the sealing layer of the intermediate wall structure. The sealing plate may comprise at least one corrugation configured to allow extension and shrinkage thereof in a direction generally in the plane substantially perpendicular to the longitudinal direction of the anchor.

A still further aspect of the invention provides a liquid container produced by the foregoing method, wherein the anchor is located in a through hole formed in the intermediate wall structure. The liquid container may comprise a ship, wherein the structural wall may comprise an exterior wall or an interior wall of the ship.

A still further aspect of the invention provides a method of building a liquid container. The method comprise: providing a structural wall, a sealing wall, a plurality of modules configured to form an intermediate wall structure, and a plurality of elongated anchors, each elongated anchor having a first end portion a second end portion; arranging the plurality of modules to form the intermediate wall structure and to define a plurality of through holes in the intermediate wall structure, each through hole being defined by two or more neighboring modules; arranging the plurality of anchors such that each anchor passes through one of the through holes; mechanically connecting the first end portion of the anchor to the structural wall; mechanically connecting the second portion of the anchor to the sealing wall; wherein the intermediate wall structure may be located between the structural wall and the sealing wall. The intermediate wall structure may have no direct connection with the sealing wall that inhibits relative movement thereof relative to the sealing wall. The intermediate wall structure may have no direct connection with the structural wall that inhibits relative movement thereof relative to the structural wall. The liquid container may comprise a ship, and wherein the structural wall may comprise an exterior wall of the ship or an interior wall connected to the exterior wall.

The aforementioned membrane type LNG storage tank has been improved over several decades in view of the reduction of boiled off gas (BOG), i.e. loss due to vaporization of cryogenic liquefied natural gas (LNG), the simplification of structure of complicated insulation barriers and sealing barriers, the reduction of tank construction period due to a simple manufacturing process, the reduction of stress in the corner parts and sealing barriers of the tank, and the like. However, further improvements are still required.

A heat-insulating system installed on a floor surface of the storage tank includes a plurality of planar structures, each of which is fixed by means of an anchor structure. Further, the insulation barriers of the ship's hull are deformed due to waves or cargo sloshing when the ship is moved, and mechanical stress is produced accordingly. Consequently, continuous technical developments have been made to eliminate the mechanical stress.

An aspect of the present invention is to provide a novel LNG storage tank and construction method thereof, wherein thermal/mechanical stress created by the storage and/or discharge of liquefied natural gas into and/or from the storage tank can be efficiently eliminated and a tank construction period can also be reduced due to the simplification of fabricating structure and manufacturing process, by proposing a novel membrane type LNG storage tank that is different from the conventional membrane type LNG storage tank in view of their structures.

According to an aspect of the present invention for achieving the above object, there is provided a liquefied natural gas storage tank including two successive sealing barriers and two insulation barriers, among which a first sealing barrier of the sealing barriers is brought into contact with liquefied natural gas stored in the storage tank, and a first insulation barrier, a second sealing barrier and a second insulation barrier are sequentially disposed on a lower surface of the first sealing barrier, wherein the first sealing barrier is supported by an anchor structure mechanically fastened to a bottom floor of the tank, and the insulation barriers are slidably installed between the first sealing barrier and the bottom floor of the tank. However, although load of cargo in the tank is equally applied to the anchor structure and the insulation barriers, the insulation barriers can be slightly slid with respect to the first sealing barrier because the first sealing barrier is only welded to and supported by the anchor structure. In a case where a construction in which the tank is installed is a double-hull ship, it is obvious that the "bottom floor of the tank" or "inner surface" is meant to include inner barriers on lateral sides and floor of the hull, an upper barrier(ceiling) of the hull, and a cross bulkhead.

Here, an insulation system of the tank including the first and second insulation barriers is brought into contact with the inner barriers of the hull. Thus, if in case of a ship, waves or the like creates the distortion and thus the bending in the hull, the bending stress is also applied to the insulation system. Therefore, the sliding means that the insulation barrier units such as "a planar structure" described below can be slightly moved in a lateral direction while not destroying the insulation system in spite of the bending stress.

Preferably, the first and second insulation barriers are bonded with adhesive to upper and lower surfaces of the second sealing barrier, respectively. The insulation barriers and sealing barrier are manufactured into a prefabricated assembly to be an assembly unit when fabricating the tank. In the present invention, a corner structure installed at the corner of the tank and a planar structure installed on a planar floor of the tank may be manufactured in the form of a prefabricated assembly. The second insulation barrier may comprise insulation made of polyurethane foam and a plate made of plywood and bonded to a lower surface of the insulation. Moreover, the first insulation barrier may comprise insulation made of polyurethane foam and plates made of plywood and bonded to upper and/or lower surfaces of the insulation. Further, the second sealing barrier may be made of an aluminum sheet or flexible sheet (triplex, more preferably, rigid triplex).

Furthermore, the second sealing barrier is formed to protrude from a side of the first and second insulation barriers such that it is connected together with a second sealing barrier of the adjacent prefabricated assembly (planar structure) or a second sealing barrier of an adjacent anchor structure when the units of the prefabricated assemblies are fabricated. Here, the shape or material of the first insulation barrier is not specifically limited. As described in the patents referenced by the present applicant(s) or owned by TGZ, the first sealing barrier may be made of stainless steel or include a corrugated portion.

In addition, a side space defined between the second insulation barriers may be filled with insulation made of polyurethane foam. On the other hand, a side space defined between the first insulation barriers may be filled with insulation made of glass wool.

Further, the second sealing barrier extends into the space defined by the insulation barriers (i.e., between the sides of the insulation barriers), an end of the second sealing barrier is connected within the space by means of upper and lower fixing plates, and coupling surfaces of the upper and lower fixing plates include a recessed portion in which the end of second sealing barrier can be inserted. Here, the recessed portion may be curved, and the assembled lower and upper fixing plates may be curved slightly in a longitudinal direction to have an excess length, whereby stress created when the sealing barrier is contacted due to the cooling can be absorbed.

According to another embodiment of the present invention, the second sealing barrier is preferably coated with a resin material on top and bottom surfaces thereof and extends into a side space defined by the neighboring insulation barriers. Further, upper and lower connection members brought into contact with the end of the second sealing barrier are included in the space, coupling surfaces of the upper and lower connection members are formed with convex and concave portions such that the resin material coated on the top and bottom surfaces of the second sealing barrier is compressed. Such a coupling method can further improve the sealing characteristics of the second sealing barrier.

According to an embodiment of the present invention related to the connection of the second sealing barrier, corner structures fastened to edge portions in the tank, planar structures slidably positioned on flat surfaces in the tank, and anchor structures fastened to the tank to attach the planar structures onto inner surfaces of the tank are included.

Here, the planar structure is preferably fabricated in such a manner that a side thereof is fixed by corner boundary projections to which the corner structure is fixed and includes a second insulation barrier installed at the same height as the second insulation barrier of the corner structure, a second sealing barrier formed on an upper surface of the second insulation barrier and a first insulation barrier formed on an upper surface of the second insulation barrier.

The anchor structure may include an anchor support rod fixed onto an anchor lower plate mechanically fastened to a portion where the planar structures join together; a second insulation barrier penetrated by the anchor support rod at a central portion thereof and installed at the same height as a second insulation barrier of the planar structure; a second sealing barrier penetrated by the anchor support rod at a central portion thereof and fixed onto an upper surface of the second insulation barrier and fastened to an adjacent second sealing barrier of the planar structure; a first insulation barrier penetrated by the anchor support rod at a central portion thereof and fixed onto an upper surface of the second sealing barrier; and an upper cap fixed to an upper end of the anchor support rod.

In this configuration, the anchor lower plate causes a lower plate of the second insulation barrier of a unit structure of the adjacent prefabricated assembly to be fixed to the inner surface of a ship's hull. Further, the second sealing barrier of the anchor structure may include a corrugated portion formed at an outer peripheral portion thereof. Here, the second sealing barrier of the anchor structure protrudes from a side of the first insulation barrier of the anchor structure to be connected to the second sealing barrier of the adjacent prefabricated assembly. In addition, the first and second insulation barriers of the anchor structure are bonded with adhesive to upper and lower surfaces of the second sealing barrier of the anchor structure, respectively.

Furthermore, the second insulation barrier of the anchor structure may include insulation made of polyurethane foam and a plate made of plywood and bonded to an upper surface of the insulation. The first insulation barrier of the anchor structure may also include insulation made of polyurethane foam and plates made of plywood and bonded to upper and lower surfaces of the insulation. The plywood plate bonded to a lower end of the second insulation barrier of the prefabricated assembly protrudes from the side of the second insulation barrier and is thus fixed onto the bottom floor by means of the anchor lower plate of the anchor structure. Accordingly, the insulation barriers cannot be moved upward but can be slightly moved in a horizontal direction even though they are fixed in the same direction.

The corner structure is manufactured into a prefabricated assembly including an L-shaped second insulation barrier brought into contact with a corner where the inner surfaces of the tank join together, a second sealing barrier formed on an upper surface of the second insulation barrier, a first insulation barrier formed on an upper surface of the second sealing barrier, and an L-shaped corner support plate formed on an upper surface of the first insulation barrier for bearing load of cargo, whereby the prefabricated assembly is fixed by means of corner boundary projections formed on the inner surfaces of the tank.

The corner support plate may be slidably installed to the first insulation barrier of the corner structure such that the support plate can be contracted and expanded. Further, the first and second insulation barriers of the corner structure are bonded with adhesive to upper and lower surfaces of the second sealing barrier of the corner structure. Moreover, the first insulation barrier, the second sealing barrier, the second insulation barrier and the corner support plate are manufactured into a prefabricated assembly.

Furthermore, the prefabricated assembly (the corner structure) is fixed by means of the corner boundary projections formed on the inner surfaces of the tank. In addition, the second sealing barrier is formed to protrude from a side of the first and second insulation barriers. Moreover, plates are formed on lower surfaces of the first and second insulation barriers such that side ends thereof protrude further from sides of the insulation barriers, and thus, the plates are fixed onto the bottom floor of the hull by means of the fixing stand. Further, the lower surface of the second insulation barrier is preferably bonded with adhesive onto the bottom floor of the hull.

In addition, the first and second insulation barriers may be mechanically coupled to each other by means of a connection reinforcement bar for connecting and fixing an upper end of a lower support rod, which penetrates and protrudes from the second insulation barrier, and a lower end of an upper support rod which penetrates the first insulation barrier. The lower support rod may be fitted and fastened to a rod support cap fixed onto a lower surface of the second insulation barrier, penetrate the second insulation barrier and be then fixed to the connection reinforcement bar. Further, the upper support rod may be fitted and fastened to a rod support cap, which is fixed to a lower surface of the first insulation barrier and the connection reinforcement bar, penetrate the first insulation barrier and support the corner support plate. To this end, the upper support rod is preferably welded to the corner support plate. The first sealing barrier is placed onto the upper surface of the corner support plate, and they are welded to each other. With such configuration, the first sealing barrier of the corner structure is stably supported by the lower support rod coupled to the bottom floor of the hull, the upper support rod coupled to the lower support rod and the corner support plate coupled to the upper support rod. In addition, since the corner support plate is made of a slightly thick plate, the first sealing barrier of the corner structure from which asymmetrical stress is created can be more stably supported. Also, since the corner support plate is weakly connected directly to the first insulation barrier of the corner structure, it can be slightly slid with respect to the first insulation barrier. Accordingly, the mechanical stress created due to the difference in contraction owing to temperature change between the first insulation barrier and the corner support plate or first sealing barrier can also be reduced or eliminated.

The anchor lower plate serves to fix a lower plate of the second insulation barrier of an adjacent unit structure to the inner surface of a ship's hull. The second sealing barrier of the anchor structure preferably includes a corrugated portion formed at an outer peripheral portion thereof. In addition, the first and second insulation barriers of the anchor structure are bonded with adhesive to upper and lower surfaces of the second sealing barrier of the anchor structure, respectively.

According to a still further embodiment of the present invention, the anchor structure includes an anchor lower plate for fixing an anchor base plate with a rod support cap built therein, said anchor base plate being installed at a regular interval(spacing) on the internal surfaces of the tank and being formed with a fastening hole; an anchor support rod fixed vertically to the rod support cap; a second insulation barrier penetrated by the anchor support rod at a central portion thereof; a second sealing barrier penetrated by the anchor support rod at a central portion thereof and fixed onto an upper surface of the second insulation barrier of the anchor structure; a first insulation barrier penetrated by the anchor support rod at a central portion thereof and fixed onto an upper surface of the second sealing barrier of the anchor structure; an upper cap fixed to an upper end of the anchor support rod for fixing the first insulation barrier of the anchor structure; and a connection insulation barrier placed adjacent to a side of the first insulation barriers and to an upper surface of the second sealing barriers, spaced apart by a predetermined distance from the first insulation barrier of the anchor structure, and fixed to upper surfaces of the second sealing barriers of the adjacent planar structure and anchor structure. Preferably, the connection insulation barrier is placed adjacent to side surfaces of the respective first insulation barriers of the adjacent planar structures and to an upper surface of the second sealing barriers of the planar structure fixed onto the second insulation barriers of the planar structures, and the connection insulation barrier is also bonded with to the second sealing barriers of the planar and anchor structures. The insulation is filled into a gap between the connection insulation barrier and the first insulation barrier of the anchor structure.

According to another aspect of the present invention, there is provided a method of manufacturing a liquefied natural gas storage tank including two successive sealing barriers and two insulation barriers, among which a first sealing barrier of the sealing barriers is brought into contact with liquefied natural gas stored in the storage tank, and a first insulation barrier, a second sealing barrier and a second insulation barrier are sequentially disposed on a lower surface of the first sealing barrier, comprising the steps of forming boundary projections near inner corners of the tank and fixedly installing anchor base plates onto inner surfaces of the tank at a regular interval; fixedly attaching prefabricated corner structures, each of which includes a second insulation barrier, a second sealing barrier, a first insulation barrier and a corner support plate, between the formed boundary projections; fixing the fixed corner structures to the boundary projections with fixing stands and simultaneously fixing anchor lower plates onto upper surfaces of the anchor base plates and then vertically fixing anchor support rods onto center portions of the anchor lower plates; fitting and fixing sides of prefabricated planar structures, each of which includes a second insulation barrier, a second sealing barrier and a first insulation barrier, to sides of the fixing stands by which the corner structures are fixed, and fitting and fixing other sides of the planar structures to gaps defined by anchor base plates and the anchor lower plates; filling insulations into spaces defined between the second insulation barriers of the corner and planar structures and simultaneously fitting second insulation and sealing barriers of anchor structures around the anchor support rods; fastening the second sealing barriers of the corner structures and the second sealing barriers of the adjacent planar structures to each other, fastening the second sealing barriers of the planar structures to each other, and also fastening the second sealing barriers of the planar structures and the second sealing barriers of the anchor structures to each other; fitting first insulation barriers of the anchor structures around the anchor support rods, and fixing anchor upper plates and anchor insulation plates onto the first insulation barriers and fixing anchor upper caps to the anchor support rods to complete fabricating the anchor structures; filling insulations into spaces defined between the first insulation barriers of the corner structures, planar structures and anchor structures; and fixing first sealing barriers with corrugated portions onto upper surfaces of the corner structures, planar structures and anchor structures.

The step of fixing the anchor lower plates onto the upper surfaces of the anchor base plates and then vertically fixing the anchor support rods onto the center portions of the anchor lower plates may comprise the steps of bolting the anchor lower plates to the anchor base plates, fixing rod support caps to the centers of the anchor lower plates and bolting the anchor support rods to the rod support caps. The step of filling the insulation into the spaces defined between the second insulation barriers of the corner structures and planar structures may comprise the step of filling the spaces with insulations made of polyurethane foam.

Further, the step of fastening the second sealing barriers of the corner structures and the second sealing barriers of the adjacent planar structures to each other, fastening the second sealing barriers of the planar structures to each other, and also fastening the second sealing barriers of the planar structures and the second sealing barriers of the anchor structures to each other may comprise the step of bolting lower fixing plates placed below the second sealing barriers and upper fixing plates placed above the second sealing barriers to face the lower fixing plates. Here, the step of fastening the second sealing barriers of the corner structures and the second sealing barriers of the adjacent planar structures to each other, fastening the second sealing barriers of the planar structures to each other, and also fastening the second sealing barriers of the planar structures and the second sealing barriers of the anchor structures to each other may comprise the step of fixing the lower fixing plate bolted to the second sealing barrier and the upper fixing plate placed to face the top surface of the lower fixing plate in a curved shape by means of their curved portions formed thereon.

The LNG storage tank of the present invention described above can be installed to all kinds of ships, ground tanks and vehicles irrespective of whether there is any cargo motion therein.

According to the present invention, a fabricating process can be shortened by simplifying the configuration of the corner structure for connecting the planar structures of the storage tank that are installed within a ship for transporting liquefied nature gas corresponding to cryogenic liquid and the liquid-tight characteristics of the anchor structure can be firmly maintained by tightly connecting the neighboring planar structures. Further, in a case where distortion is created in a ship's hull due to waves or the like when the ship is sailing, since the first sealing barrier of the insulation system of the present invention is fastened directly to the anchor structure and weakly connected to the insulation barriers (planar structures), the insulation barriers can be slightly slid with respect to the first sealing barrier and thus they conform to the distortion of the hull. Therefore, the insulation system can be hardly destroyed.

Further, by simplifying the corner structure installed within the hull of a ship for storing liquefied nature gas corresponding to cryogenic liquid to shorten the assembling process and simultaneously installing thick plates capable of supporting the corner structure while firmly maintaining the liquid-tight characteristics of the corner structure, the stress created by mechanical/thermal contraction and expansion of the storage tank can be easily reduced or eliminated. Therefore, more reliable ship can be provided.

Furthermore, since the connection insulation barrier is bonded with adhesive to the underlying second sealing barriers which in turn are coupled to each other by means of the upper and lower connection members, the fixing characteristics of the second sealing barriers near the anchor structure are further improved, whereby liquid-tight characteristics and safety are further increased.

BRIEF DESCRIPTION OF DRAWINGS

FIGS. 1 and 2 are sectional and perspective views showing a GTT NO 96-2 type LNG storage tank, i.e. a conventional membrane type LNG storage tank.

FIGS. 3 and 4 are sectional and perspective views showing a GTT Mark III type LNG storage tank, i.e. a conventional membrane type LNG storage tank.

FIG. 5 is a sectional view showing the structure of a corner part of the conventional LNG storage tank.

FIGS. 6(*a*) and (*b*) show the inner configuration of the corner structure of the LNG storage tank according to an embodiment of the present invention.

FIG. 7 is a whole perspective view illustrating the connection relationship between the corner structures of the LNG storage tank installed within a ship according to the present invention.

FIG. 8 is a partially enlarged sectional perspective view showing the corner structure of the LNG storage tank installed within the ship according to an embodiment of the present invention.

FIGS. 9 to 23 are perspective views sequentially illustrating processes of fabricating the LNG storage tank into an inner space of a ship's hull according to an embodiment of the present invention.

FIG. 24 is an enlarged sectional view showing a means for interlocking second sealing barriers of the LNG storage tank according to an embodiment of the present invention.

FIG. 25 is an enlarged perspective view showing a means for interlocking second sealing barriers of the LNG storage tank according to an embodiment of the present invention.

FIGS. 26(*a*) and (*b*) are partially enlarged sectional views illustrating the connection relationship between anchor structures of the LNG storage tank according to an embodiment of the present invention.

FIG. 27 is a partially cut-away perspective view of an LNG storage tank according to another embodiment of the present invention.

FIGS. 28 to 36 are perspective views sequentially illustrating processes of fabricating the LNG storage tank into an inner space of a ship's hull according to another embodiment of the present invention.

FIGS. 37 and 38 are enlarged sectional views showing a state where second sealing barriers are interlocked in the LNG storage tank according to another embodiment of the present invention.

FIG. 39 is a cross-sectional view of a ship comprising liquid containers.

FIG. 40 is an enlarged cross-sectional view of walls of a liquid container of FIG. 39.

FIG. 41 is a schematic view illustrating connections of a sealing plate with an anchor rod and a second sealing layer or barrier of FIG. 40.

| <Explanation of reference numerals for designating main components in the drawings> | |
|---|---|
| 50: Corner support plate | 51: First insulation barrier of corner part |
| 52: Second sealing barrier of corner part | |
| 53: Second insulation barrier of corner part | |
| 54, 56: Plates | 57, 58: Insulations |
| 60: Lower support rod | 61: Rod support cap |
| 70: Upper support rod | 80, 81: Boundary projection of corner part |
| 90: Connection support | 100: Corner structure |
| 101: Fixing stand | 109: Stud pin |
| 110: Anchor base plate | 111: Anchor lower plate |
| 113: Second insulation barrier of anchor structure | |
| 114: Second sealing barrier of anchor structure | |
| 115: Corrugated portion | 119: Upper cap of anchor structure |
| 150: Anchor structure | 200: Planar structure |
| 201: Lower plate material | |
| 202: Second insulation barrier of planar structure | |
| 203: Second sealing barrier of planar structure | |
| 204: First insulation barrier of planar structure | |
| 205: Upper plate | 211: Insulation |
| 212: Upper fixing plate | 213: Lower fixing plate |
| 214: Fixing bolt | 250: First sealing barrier |
| 251: Corrugated portion | |

DETAILED DESCRIPTION OF EMBODIMENTS

Hereinafter, the configuration of the present invention will be described in detail with reference to the accompanying drawings.

The present invention is directed to a liquefied natural gas storage tank in which liquefied natural gas (LNG) is stored in a high pressure and extremely low temperature state. To this end, the LNG storage tank is constructed such that impact resistance and liquid-tight characteristics are firmly maintained.

The LNG storage tank mounted to an automobile or ship, in which cargo is moved, is different from the ground storage tank with little motion in that suitable countermeasures should be prepared against mechanical stress due to the cargo motion in the storage tank. However, the LNG storage tank mounted to a ship to which the countermeasures against the mechanical stress are provided can also be applied to the ground storage tank. Thus, the configuration of an LNG storage tank mounted to a ship will be explained herein by way of example.

FIG. 39 illustrates a cross-sectional view of an exemplary ship 3900 according to one embodiment. In the illustrated embodiment, the ship 3900 is comprised of an exterior wall 3901 that forms the shape of the ship and an inner wall 3903. The inner wall 3903 is integrated with the exterior wall 3901 via connecting walls or structures 3905, and reinforces the exterior wall 3901. Also, the inner wall 3903 may inhibit water from flowing into the interior of the ship 3900 in case the exterior wall 3901 is damaged. In some embodiment, a ship 3900 may not have an inner wall 3903. In other embodiments, the inner wall 3903 may be replaced with structures (not shown) interconnected with the exterior wall. In the illustrated embodiment, the interior of the inner wall 3903 is partitioned with partitioning walls 3907 into four interior spaces 3911. The interior of the inner wall 3903 may be partitioned in various ways or may not be partitioned at all. The partitioning walls 3907 are integrated with the inner wall 3903 and the exterior wall 3901. The partitioning walls 3907 may be replaced with certain structures (not shown) that are interconnecting portions of the inner wall 3903 across the interior of the inner wall 3903.

Each of the interior spaces 3911 can comprise a liquid tank for containing cold liquid such as liquefied natural gas. As an example, construction of the second interior space from the left of the drawing is illustrated. An inner most wall 250 contacts the liquid 3913 that is contained in the tank and referred to as a first sealing barrier or first sealing wall. A plurality of anchors or connectors 3915 are directly attached to both the first sealing wall 250 and the inner wall 3903 (or the partitioning wall 3907). Thus, the first sealing wall 250 is integrated with the inner wall 3903 (and the partitioning wall 3907) and generally is not intended to move relative to the inner wall 3903 (and the partitioning wall 3907). In an embodiment where the inner wall 3903 does not exist, the first sealing wall 250 is integrated with the exterior wall 3901. To the extent that the first sealing wall 250 is integrated with and supported by the exterior wall 3901, the inner wall 3903 and/or the partitioning wall 3907, these walls may be collectively referred to as a structural wall. In the illustrated embodiment, the structural wall comprises the inner wall 3903 and partitioning walls 3907.

Between the first sealing wall 250 and the structural wall, intermediate wall structures 3917 are interposed. Some intermediate wall structures 3917 (200*a*, 200*b*) are located between planar portions of the first sealing wall 250 and the structural wall 3903, 3907, and are referred to as planar structures 200. Other intermediate wall structures 3917 (100) are located between a corner portion of the first sealing wall 250 and a corner portion made by the inner wall 3903 and one of the partitioning walls 3907. The corner intermediate wall structures 3917 (100) are referred to as corner structures 100. The intermediate wall structures 3917 are configured to float in the space between the first sealing wall 250 and the structural wall. Each intermediate wall structure 3917 has a first surface (not shown) that faces the first sealing wall 250 and a second surface (not shown) that faces the structural wall. In one embodiment, the first surface of the intermediate wall structure 3917 is not directly attached to the first sealing wall 250 while contacting the first sealing wall 250 or any members integrated with the first sealing wall. The second surface of the intermediate wall structure 3917 may not be directly attached to the structural wall while contacting the structural wall. In one embodiment, the intermediate wall structures 3917 are interconnected with each other and form a single integrated body. Each of the intermediate wall structures 3917 may comprise a plurality of modules interconnected one another. Alternatively, each intermediate wall structure 3917 may be a single module.

Further illustrated are globular liquid tanks 3919 located outside the body of the ship 3900. The globular tanks 3919 is comprised of an exterior wall 3921 and a first sealing wall or barrier 250. Liquid is contained in the interior space of the first sealing wall 250. A plurality of anchors 3915 are directly attached to the first sealing wall 250 and the exterior wall 3921. Thus, the first sealing wall 250 is integrated with the exterior wall 3921 and generally is not intended to move relative to the exterior wall 3921. Intermediate wall structures 3917 are interposed between the exterior wall 3921 and the first sealing wall 250, and are configured to float in the space between the exterior wall 3921 and the first sealing wall 250. The intermediate wall structures 3917 are generally the same as described above except for their shapes. In other embodiments, the liquid tanks 3919 may be formed in various shapes other than spherical, such as generally cubical, rectangular, oval, cylindrical etc. In other embodiments, the liquid tanks 3919 may be formed on trucks, trains or other vehicles. Also, in other embodiments, the liquid tanks 3919 may be formed on the ground or under the ground.

FIG. 40 illustrates an enlarged view of the circled portion 3923 of FIG. 39. In the illustrated embodiment, the intermediate wall structures (planar structure 200*a*, 200*b* and the corner structure 100) include a first insulation barrier or layer 204, 51, a second insulation barrier or layer 202, 53 and a second sealing barrier or layer 52, 203. Each intermediate wall structure may further include one or more additional functional layers.

In the illustrated embodiment, each anchor comprises anchor rod 112*a*, 112*b* and a sealing plate (not shown). One end of the anchor rod 112*a*, 112*b* is attached to the first sealing wall 250, while the other end of the anchor rod 112*a*, 112*b* is attached to the structural wall 3903, 3907. The attachment of the anchor rod 112*a*, 112*b* to the first wall 250 and the structural wall 3903, 3907 will be described in more detail with reference additional embodiments. The anchors 3915 connecting the first sealing wall 250 and the structural wall 3903, 3907 are arranged in a space formed and defined by two or more neighboring structures 100, 200*a*, 200*b*. In other embodiments, the anchors 3915 may be arranged in a through hole formed in a single intermediate wall structure 100, 200*a*, 200*b*.

A fitting 113*a*, 113*b* is placed in the space surrounding the anchor rod 112 and between or among the neighboring intermediate wall structures 100, 200*a*, 200*b* that define the space. The fitting 113*a* is placed in the space between the second insulation layers 202 and 53. The fitting 113*b* is placed in the space between the second insulation layers 202 and 53. The spaces 3929, 3931 where a fitting is not shown may be filled with an insulating material. Alternatively, another fitting may be placed in the spaces 3929, 3931. The fitting 113*a*, 113*b* has a groove 3927 extending toward the front and back of the drawing sheet. The intermediate wall structure 100, 200*a*, 200*b* has a tongue or flange 3925. As illustrated, the groove 3927 formed in the fitting 113*a*, 113*b* receives the flange 3925 such that the planar structure 200*a*, may not substantially move in a longitudinal direction of the anchor rod 112*a*, and the planar structure 200*b*, may not substantially move in a longitudinal direction of the anchor rod 112*b*. However, the groove 3927 is deeper than the flange, which allows movement of the planar structure 200*a* in a direction toward and away from the anchor rod 112*a*, i.e. in a direction generally perpendicular to the longitudinal direction of the anchor rod 112*a*. Likewise the planar structure 200*b* may be movable in a direction toward and away from the anchor rod 112*b*. The corner structure 100 may not move at all since its movement in the longitudinal direction of the anchor rod 112*a* is prevented by the fitting 113*a* and its movement in the longitudinal direction of the anchor rod 112*b* is prevented by the fitting 113*b*. Although it is described such that the intermediate wall structure's movement in the longitudinal direction of the neighboring anchor wall.

Still referring to FIG. 40, the second sealing layers 52, 203 of the intermediate wall structures 100, 200 are liquid-tightly connected with the sealing plate of the anchor, which will be discussed with reference to FIG. 41. Near the connection between the anchor and the second sealing layers 52, 203, one or more corrugations 115 are formed in the second sealing layers 52, 203 and/or sealing plate of the anchor. Each corrugation is configured to allow shrinkage and expansion of the sealing plate or the second sealing layers 52, 203 in a direction, particularly toward and away from the anchor.

As discussed, in one embodiment, the first surface of the intermediate wall structure 100, 200*a*, 200*b* faces the first sealing wall 250 and is neither bonded nor attached directly to the first sealing wall 250. Also, the second surface of the intermediate wall structure 100, 200*a*, 200*b* faces the structural wall 3903, 3907 and is neither bonded nor attached directly to the structural wall 3903, 3907. With the foregoing configuration and construction, the planar structure 200*a* may float in a direction perpendicular to the longitudinal direction of the anchor rod 112*a* while maintained between the first sealing wall 250 and the structural wall 3903. Likewise, the planar structure 200*b* may float in a direction perpendicular to the longitudinal direction of the anchor rod 112*b*. As discussed above, however, the planar structure 200*a* and 200*b* may not substantially move in the longitudinal direction of the anchor 112*a* and 112*b* respectively as the flange 3925 is engaged with the groove 3927.

FIG. 41 schematically illustrates configurations of the anchor rod 112*a*, a sealing plate 3933, corrugation 115, etc. The sealing plate 3933 is arranged in a plane substantially perpendicular to the longitudinal direction of the anchor rod 112*a* and liquid tightly connected with the anchor rod 112*a*. In the illustrated configuration, for example, the sealing plate 3933 is sandwiched between two nuts 3935, 3937 engaged with threads formed on the side of the anchor rod 112*a*. One of ordinary skill in the art will appreciate that the sealing plates 3933 may be liquid tightly connected with the anchor rod 112*a* in a variety of different ways. The sealing plate 3933 has a rippled portion 3936 near its edge, which is liquid tightly connected with the second sealing layer 203 of the neighboring intermediate wall structure. The connection of the rippled portion 3935 will be further discussed with reference to FIG. 24. As will be well appreciated by a skilled artisan, the rippled portion 3935 can be replaced any other configuration that can form liquid tight connection with the second sealing layer 203.

The sealing plate 3933 has at least one corrugation or wrinkle 115 surrounding the anchor rod 112*a*. The corrugation or wrinkle 115 is to allow shrinkage and expansion of the sealing plate 3933 in the plane substantially perpendicular to the longitudinal direction of the anchor rod 112*a*. Although not illustrated, the corrugation or wrinkle 115 may also be formed in the second sealing layer 203 of the neighboring intermediate wall structure. Alternatively, the corrugation or wrinkle 115 may be formed in the second sealing layer 203 instead of in the sealing plate 3933.

The LNG storage tank of the present invention comprises a second insulation barrier installed to be brought into surface contact with an inner surface of a hull of the ship, a second sealing barrier formed on an upper surface of the second insulation barrier, and a first insulation barrier formed on an upper surface of the second sealing barrier. In the present invention, it is preferable to beforehand manufacture corner structures and planar structures into prefabricated assemblies outside of a ship and to fabricate the structures into an inner space of the storage tank.

That is, the prefabricated corner structures are first fixed in the interior of a ship's hull and the planar structures are then fabricated to the corner structures. In such a case, the planar structures are securely fastened to the hull by fabricating anchor structures on a tank fabrication site.

FIG. 6 is a sectional view illustrating the inner configuration of the corner structure of the LNG storage tank according to an embodiment of the present invention, and FIG. 7 is a whole perspective view illustrating the connection relationship between the corner structures of the LNG storage tank installed within the ship according to an embodiment of the present invention. Further, FIG. 8 is a partially enlarged sectional perspective view showing the corner structure of the LNG storage tank installed within the ship according to an embodiment of the present invention.

As shown in FIGS. 6 to 8, the corner structure 100 according to an embodiment of the present invention is prefabricated to have such a configuration that its second insulation barrier 53 is L-shaped to come into surface contact with a corner position where surfaces of the ship's hull join together, its second sealing barrier 52 is attached and fixed to an upper surface of the second insulation barrier in the same manner as above, and its first insulation barrier 51 is also formed on an upper surface of the second sealing barrier. Here, it is preferred that the first and second insulation barriers 51 and 53 of the corner structure be firmly and securely bonded with adhesive to the upper and lower surfaces of the second sealing barrier 52.

The aforementioned connection relationship between a corner support plate 50, the first and second insulation barriers 51 and 53, the second sealing barrier 52, and upper and lower support rods 70 and 60 will be explained more in detail, as follows.

The interior of a ship for storing LNG is composed of a bottom floor 1 and a bulkhead 2 integrally formed therewith and includes an inner space in which the corner structure of the present invention can be installed. More specifically, the present invention is directed to a corner structure installed at a position where the aforementioned bottom floor 1 and cross or lateral bulkhead 2 join together at a predetermined angle. Therefore, the shape of the second insulation barrier may be different from the L shape because the angle that the tank surfaces join together varies according to the tank shapes or corner positions.

As described above, the L-shaped second insulation barrier 53 that is brought into surface contact with the bottom floor 1 and bulkhead 2 is formed at a position where the bottom floor 1 and the bulkhead 2 join together at a predetermined angle. In the present invention, the terms 'first' and 'second' are used to distinguish whether the liquefied natural gas stored in the storage tank is primarily or secondarily sealed and insulated by means of a certain barrier.

The second insulation barrier 53 is composed of a second insulation 58 that is made of polyurethane foam, and a second insulating plate 56 that is made of plywood and bonded to a lower surface of the second insulation. The second insulating plate 56 is brought into surface contact with the bottom floor 1 and bulkhead 2 that are defined as inner surfaces of the ship's hull. The manufacturing methods, shapes, materials, etc. of the insulation barrier are described in U.S. Pat. Nos. 4,747,513, 5,501,359, 5,586,513 and 6,035,795, International Publication No. WO 1989/09909, Japanese Patent Laid-Open Publication Nos. 2000-038190 and 2001-122386, and the like, all of which are incorporated herein by reference. The insulation barrier and timber bonded thereto, which are described in the above documents, may be used herein.

After the second insulation barrier 53 has been formed, the second sealing barrier 52 is placed onto the upper surface thereof. The second sealing barrier 52 serves to secondarily prevent the LNG stored in the storage tank from leaking out from the storage tank. An upper surface of the second insulation 58 of the second insulation barrier 53 is bonded to a lower surface of the second sealing barrier 52 by means of an adhesive. It is preferred that the second sealing barrier 52 be made of aluminum sheet or flexible sheet (alias, "Triplex"). The above referenced U.S. Pat. No. 6,035,795 discloses a flexible triplex, but a harder rigid triplex is preferably used in the present invention.

As described above, after the second insulation barrier 53 and the second sealing barrier 52 have been bonded to each other, lower support rods 60 that will be fixed to the first insulation barrier 51 formed on the upper surface of the second sealing barrier 52 penetrate the second insulation barrier 53 and the second sealing barrier 52.

That is, a plurality of holes through which the lower support rods 60 can pass are formed in the second insulation barrier 53 at a regular interval. Each of rod support caps 61 to which a lower end of the lower support rod 60 can be firmly fixed is inserted into and supported by a lower end of the hole formed in the second insulating plate 56.

The lower support rod 60 is inserted into the rod support cap 61 to pass through the second sealing barrier 53, and the lower end of the lower support rod 60 is firmly fastened by means of a fixing nut 62 within the support cap 61.

Further, an upper end of the lower support rod 60 that has penetrated the second insulation barrier 53 also penetrates the second sealing barrier 52 that is fixed onto the upper surface of the second insulation barrier 53. The second sealing barrier 52 is fixed to the lower support rod 60 by means of a support nut 63 and sealing barrier fixing nut 64 fastened to the upper portion of the lower support rod 60.

The upper end of the lower support rod 60 that penetrates the second insulation barrier 53 and second sealing barrier 52 to cause them to be fixed to the first insulation barrier 51 is penetrated through and fixed to a lower portion of the first insulation barrier 51.

That is, the first insulation barrier 51 is brought into surface contact with and fixedly bonded to the second sealing barrier 52 fixed to the upper surface of the second insulation barrier 53. The first insulation barrier 51 is composed of a lower plate 55 that is brought into surface contact with and fixedly bonded to the second sealing barrier 52 by means of an adhesive, a first insulation 57 that is formed on an upper surface of the lower plate 55, and an upper plate 54 that is fixedly bonded to an upper surface of the first insulation 57. The upper and lower plates 54 and 55 of the first insulation barrier are made of plywood, whereas the first insulation 57 is made of polyurethane foam.

At this time, a connection reinforcement bar 90 is placed onto the lower plate 55 of the first insulation barrier 51, through which the lower support rod 60 has passed, so as to connect the lower support rod and an upper support rod to be described later. That is, the upper end of the lower support rod 60 that has passed through the second insulation barrier 53 and sealing barrier 52 penetrates the connection reinforcement bar 90 placed onto the lower plate 55 of the first insulation barrier 51 such that they can be fastened to each other in a bolt-nut fastening manner.

A plurality (pair in the figures of the present invention) of lower ends of the upper rods 70 are fixed to the connection reinforcement bar 90 in such a manner that the upper support rod 70 is inserted into a rod support cap 71, which is fixed, e.g. welded, to a bottom surface of the connection reinforcement bar 90, and then fastened to the connection reinforcement bar 90 by means of the fixing nut 72.

Therefore, the upper end of the lower support rod 60, which penetrates the second insulation barrier 53 and sealing barrier 52, and the lower end of the upper support rod 70, which penetrates the first insulation barrier 51, are securely fixed to the connection reinforcement bar 90.

As shown in FIG. 6(*a*), the upper support rod 70 is fixed to and supported by the first insulation barrier 51 and the upper plate 54 of the insulation barrier 51, and the L-shaped corner support plate 50 is placed and supported on the upper surface of the upper plate 54 of the first insulation barrier 51 such that asymmetrical load created from the aforementioned storage tank may be applied thereto. Here, the corner support plate 50 is not bonded with adhesive but mechanically coupled to the first insulation barrier 51 such that it can be slid onto the first insulation barrier 51 even though there is the contraction and expansion of the corner support plate occur due to heat. A first sealing barrier 250 to be explained later is placed onto and coupled to the corner support plate 50 in such a manner as the welding.

FIG. 6 (*b*) shows another example for a method of coupling the upper support rod 70 to the corner support plate 50. That is, the upper rod 70 penetrates the first insulation barrier 51 and the upper plate 54 disposed thereon and is directly coupled to the corner support plate 50 so as to support the corner support plate 50. At this time, there is a small space between the upper support rod 70 and the first insulation barrier 51 of the corner part, and there is no direct coupling, via adhesive, between the corner support plate 50 and the first insulation barrier 51. Therefore, the corner support plate 50 can be slid slightly with respect to the first insulation barrier 51. This sliding of the corner support plate can overcome the contraction and expansion difference between the first insulation barrier 51 and the corner support plate 50, in temperature change resulting from the material difference. Further, thanks to the above configuration, the first sealing barrier of the corner part can be stably supported by the lower support rod 60 coupled to the tank inner surfaces, the upper support rod 70 coupled to the lower support rod 60 and the corner support plate 50 coupled to the upper support rod 70. Furthermore, since the corner support plate 50 is manufactured of a slightly thick plate, it can stably and sufficiently support the first sealing barrier of the corner part from which asymmetrical stress is created.

In addition, the second sealing barrier 52 of the corner structure 100 according to the present invention is made of aluminum sheet or flexible sheet (Triplex). The second sealing barrier 52 is formed to further protrude from the side of the first and second insulation barriers 51 and 53, and thus fastened to a second sealing barrier 203 of a prefabricated adjacent planar structure during the next process.

FIG. 9 shows a planar structure constructing the LNG storage tank according to the present invention. Referring to FIG. 9, the planar structure 200 of the present invention is introduced into the ship's hull after it has been prefabricated outside of the hull. The planar structure 200 has the configuration similar to the corner structure 100. In such a case, an upper plate 205 made of plywood is installed to a top portion of a first insulation barrier 204 of the planar structure.

That is, the planar structure is configured in such a manner that a lower plate 201 brought into surface contact with the inner surface 1 of the ship's hull is provided on a second insulation barrier 202 of the planar structure which is made of polyurethane foam, the second sealing barrier 203 made of aluminum sheet or flexible sheet (triplex, preferably rigid triplex) is again bonded to an upper surface of the second insulation barrier, and the first insulation barrier 204 made of polyurethane foam and the upper plate 205 made of plywood are then bonded to an upper surface of the second sealing barrier 203.

Further, the lower plate 201 and second sealing barrier 203 of the second insulation barrier of the planar structure protrude slightly from the side of the first and second insulation barrier 204 and 202 such that they are interlocked with and fixed to adjacent planar structure 200 or corner structure 100 during the next process. The opposite edge side of the planar structure brought into contact with the corner structure 100 is configured to take the shape of a partially cut-away step such it can be fabricated and fixed by means of an anchor structure 150 of the present invention. The planar structure 200 of the present invention is configured to have the same height as that of the adjacent corner structure 100.

FIG. 10 is a perspective view showing a state where boundary projections and stud pins 109 are installed at an inner surface of a ship's hull; FIG. 11 is a perspective view showing a state where a corner structure is fitted to the boundary projections of FIG. 10; FIG. 12 is a perspective view showing a state where the corner structure of FIG. 11 is fastened to the hull; FIG. 13 is a perspective view showing a state where a planar structure is placed adjacent to the corner structure of FIG. 12; FIG. 14 is a perspective view showing a state where the planar structure of FIG. 13 is fastened to the hull and anchor support rods are coupled thereto; FIG. 15 is a perspective view showing a state where second sealing barriers and insulation barriers of the anchor structure are installed to the anchor support rods; FIG. 16 is a perspective view showing a state where a plurality of planar structures are fixed to the ship's hull; FIG. 17 is a perspective view showing a state where the second sealing barriers of the anchor structure are fastened to those of the planar structures of FIG. 16; FIG. 18 is a perspective view showing a state where the first insulation barriers of the anchor structure are inserted onto the second sealing barriers of FIG. 17; FIG. 19 is a perspective view showing a state where anchor upper plate is fixed on the first insulation barriers of FIG. 18 are fixed; FIG. 20 is a perspective view showing a state where an anchor insulation plate is installed onto the first insulation barriers of the anchor structure of FIG. 19; FIG. 21 is a perspective view showing a state where the anchor insulation plate of FIG. 20 is fixed; FIG. 22 is a perspective view showing a state where first insulations are filled; and FIG. 23 is a perspective view showing a state where a first sealing barrier is installed onto the fabricated structure of FIG. 22.

Hereinafter, an LNG storage tank and a process of fabricating the storage tank according to an embodiment of the present invention will be described in detail with reference to FIGS. 10 to 23.

The LNG storage tank of the present invention is installed onto a bottom floor 1 of the ship's hull and a cross or lateral bulkhead 2 extending from the bottom floor in a cross or lateral direction at a right or predetermined angle.

First, the boundary projections 80 and 81 of the corner structure for use in fixing the corner structure 100 are fixed to the bottom floor 1 and the cross bulkhead 2. At this time, it is preferred that the boundary projections 80 and 81 be fixed through the welding and their spacing from the corner be determined such that the prefabricated corner structure can be inserted into the spacing. After the corner structure 100 has been inserted between the boundary projections 80 and 81, some gaps are formed between the corner structure and the boundary projections.

As shown in FIGS. 10 to 12, if the corner structure 100 is installed between the boundary projections 80 and 81, a fixing stand 101 is fixed to the boundary projections 80 and 81. At this time, the fixing stand 101 is preferably bolted to the boundary projections 80 and 81. The fixing stand 101 is preferably formed with a protrusion corresponding to the gap defined between the corner structure 100 and the boundary projections 80 or 81 such that it is tightly fitted into the gap between the corner structure 100 and the boundary projections 80 or 81 to prevent the corner structure from moving between the boundary projections. The corner structure 100 is primarily bonded onto the bottom floor 1 or cross bulkhead 2 of the ship's hull at its bottom surface and secondarily attached to the inner boundary projections 80 and 81 by means of the fixing stand 101.

As shown in FIG. 13, an anchor base plate 110 of an anchor structure 150 for fixing the planar structure 200 installed in series from the corner structure 100 is also fixed onto surfaces of the bottom floor 1 and cross head 2 at a regular interval. To this end, a group of stud pins 109 are formed on the inner surface of the hull at the regular interval. At this time, a portion of the stud pin 109, which is brought into contact with the bottom floor 1 or cross bulkhead 2, is sharpened and pressed such that the stud pin 109 is welded onto the inner surface of the hull.

Next, the anchor base plate 110 is formed with through-holes corresponding to the stud pins 109 such that the stud pins 109 are fitted into the anchor base plate 110 by means of the holes. At this time, the anchor base plate 110 is coupled, i.e. welded or bonded, to the inner surface of the hull. Further, the thickness of anchor base plate 110 is the same as that of the lower plate 201 of the second insulation barrier of the planar structure.

Then, as shown in FIG. 14, an anchor lower plate 111 is coupled to an upper surface of the anchor base plate 110 such that it can cover the lower plate 201 of the second insulation barrier of the planar structure. To this end, a plurality of through-holes are formed on the anchor lower plate 111 at positions corresponding to the stud pins 109. Then, the anchor base plate 110 is completely fixed by fastening a nut to the stud pin 109 that has penetrated the anchor lower plate 111.

As such, the planar structure 200 is limited in its upward motion because the lower plate 201 is fixed by means of the fixing stand 101 or anchor lower plate 111, but can be slightly slid in a horizontal direction.

Next, as shown in FIGS. 14 and 15, an anchor support rod 112 is vertically fixed at the center of the anchor lower plate 111.

To this end, a predetermined recessed space is formed at the center of the anchor lower plate 111. Further, the anchor base plate 110 is positioned below the anchor lower plate 111. At this time, the anchor base plate 110 with a plurality of through-holes formed at positions corresponding to the stud pins 109 is installed in a state where the stud pins 109 pass through the holes. Next, the anchor base plate 110 is fixed by fastening a nut to the stud pin 109.

A rod support cap 120 is installed in the recessed space of the anchor lower plate 111 through a central hole of the anchor base plate 110. The rod support cap 120 is configured in such a manner that a nut is included therein or integrally formed thereon. In the present invention, the rod support cap 120 is processed to have a nut-shaped portion at the center thereof and the aforementioned anchor support rod 112 is vertically coupled to the rod support cap 120. Here, the rod support cap 120 and the nut are used in the same manner as the rod support cap 61 and the fixing nut 62 as shown in FIG. 8.

Furthermore, heat may be transferred upward or downward through the anchor support rod 112, but it is preferred that the diameter and heat transfer rate of the anchor support rod 112 be taken into consideration, when it is designed, such that the heat transfer from the liquefied natural gas in the storage tank to the ship's hull can be minimized.

This anchor support rod 112 serves to primarily support load created from the first sealing barrier, which will be attached during the next process. The prefabricated assembly of the insulation barriers is bonded with adhesive directly but weakly to the first sealing barrier. Therefore, the prefabricated assembly can be slightly slid with respect to the first sealing barrier unlike the conventional insulation barrier assembly, and thus, the stability of the tank structure against the hull deformation can also be improved.

The respective planar structures 200 are positioned in place and fixed with respect to the anchor lower plate 111 and anchor support rod 112 of the present invention in the same fixing manner as described above. At this time, each of the planar structures 200 is positioned and fixed on a specific space on the inner surface 1 of the ship's hull defined by the anchor lower plate 111.

The aforementioned planar structure 200 is introduced into the ship's hull in a state where it has been already fabricated at a site outside of the hull. An upper plate 205 is bonded to an upper surface of the first insulation barrier 204 of the planar structure 200.

That is, the planar structure 200 of the present invention is configured in such a manner that the lower plate 201 of the second insulation barrier, which is brought into surface contact with the inner surface 1 of the ship's hull, is provided; the second insulation barrier 202 made polyurethane foam is bonded to the upper surface of the lower plate; the second sealing barrier 203 made of aluminum sheet or flexible sheet (triplex) is again bonded to the upper surface of the second insulation barrier; the first insulation barrier 204 made of polyurethane foam is then bonded to the upper surface of the second sealing barrier; and the upper plate 205 made of plywood is again bonded to the upper surface of the first insulation barrier.

Further, the lower plate 201 and second sealing barrier 203 of the second insulation barrier of the planar structure protrude slightly from the side of the first and second insulation barrier 202 and 204 such that they are interlocked with and fixed to the second sealing barrier of the adjacent planar structure 200 or corner structure 100 during the next process. The opposite edge side of the planar structure brought into contact with the corner structure 100 is configured to take the shape of a partially cut-away step such it can be fabricated and fixed by means of an anchor structure 150 of the present invention. The planar structure 200 of the present invention is configured to have the same height as that of the adjacent corner structure 100.

The prefabricated planar structure 200 of the present invention is fixed to the inner surface of the ship's hull is such a manner that one side of the lower plate 201 of the planar structure, which protrudes from the side of the second insulation barrier 202 of the planar structure facing the corner structure (not shown), is inserted into a gap between the inner surface of the hull and a side of the fixing stand used to fix the corner structure to the boundary projections, and the other side of the lower plate 201 of the planar structure, which protrudes from the other side of the second insulation barrier 202 of the planar structure, is simultaneously inserted into a gap that is formed by the anchor base plate 110 made of metal and fixed onto the inner surface 1 of the hull and the anchor lower plate 111 made of plywood and fixed onto the upper surface of the anchor base plate.

As described above, if the planar structure 200 is inserted and fixed with reference to the anchor base plate 111 and anchor support rod 112 of the anchor structure of the present invention, a second insulation barrier 113 of the anchor structure is placed onto the anchor lower plate 111 as shown in FIG. 15. Further, a second sealing barrier 114 with a circular corrugated portion 115 formed thereon is placed onto an upper surface of the second insulation barrier 113 of the anchor structure. Furthermore, the second sealing barrier 114 is fitted into and supported by a catching step 121 formed on the anchor support rod 112 and is then firmly fixed by means of a fixing nut 123 bolted to the support rod 112.

If the planar structure 200 is placed and fixed, a space defined by the second insulation barriers 53 and 202 of the corner structure 100 and planar structure 200 is filled with an insulating material made of polyurethane foam and the second insulation barrier 113 and second sealing barrier 114 of the anchor structure are fitted around the anchor support rod 112, as shown in FIGS. 15 to 22.

The second insulation barrier 113 of the anchor structure is shaped as a hexahedron and is composed of insulations made of polyurethane foam and plates made of plywood. The second sealing barrier 114 of the anchor structure, which is attached and fixed to the upper surface of the second insulation barrier, is made of aluminum sheet or flexible sheet (triplex).

In a ship with the aforementioned LNG storage tank mounted thereto, a ship's hull is bent due to waves and the like and is partially subjected to mechanical stress when a ship is moving. Further, if the hull is deformed accordingly, the mechanical stress applied to the insulation barrier and second sealing barrier is increased. To reduce the mechanical stress applied to the sealing barriers, therefore, the circular corrugated portion 115 is preferably formed at the second sealing barrier 114 as shown in FIG. 23. That is, since the corrugated portion 115 is stretched or contracted in its sliding direction when the planar structure 200 is slid on the inner surface of the hull, mechanical or thermal deformation is hardly applied to the insulation or sealing barrier.

Further, the gap between the respective planar structures 200 tends to increase due to the mechanical stress applied to layers of the insulation barriers. Since the planar structure 200 of the storage tank according to the present invention is caught in the anchor lower plate 111 of the anchor structure 150, however, it can be slightly slid on the inner surface of the hull without being taken off from the anchor lower plate.

For the above reasons, the insulation barriers themselves can absorb the deformation of the hull, because the corner structure 100 is fixed to the hull but the respective planar structures 200 can be partially slid in a lateral direction even though the stress is created at the hull.

As described above, after the corner structure 100 and respective planar structures 200 of the present invention have been mounted to the inner surfaces of the hull, the gaps defined by their respective second insulation barriers are filled with insulations 211 made of polyurethane foam. Then, the respective adjacent second insulation barriers will be connected and fixed to one another by means of the fixing means.

That is, the second sealing barrier 52 of the corner structure 100 are fastened to the sealing barrier 203 of the adjacent planar structure 200, the second sealing barriers 203 of the two adjacent planar structures 200 are fastened to each other, and the second sealing barrier 203 of the planar structure 200 is fastened to the sealing barrier 114 of the anchor structure.

Further, gaps defined by the respective first insulation barriers are filled with insulations 210 made of polyurethane foam.

Then, the first sealing barrier 250 is coupled onto the assembled structures. The first sealing barrier is welded (preferably, fillet welded) to the anchor structure, preferably to an upper cap 119 of the anchor structure. The first sealing barrier will be explained later in detail.

FIG. 24 is an enlarged sectional view showing a means for interlocking the second sealing barriers of the LNG storage tank according to the present invention, and FIG. 25 is an enlarged perspective view showing the means for interlocking the second sealing barriers of the LNG storage tank according to the present invention. Further, FIG. 26 is a partially enlarged sectional view illustrating the connection relationship between the anchor structures of the LNG storage tank according to the present invention.

The second sealing barriers of the present invention are connected and fixed using the fixing means shown in FIGS. 24 and 25. Such a fixing method can be applied to all the second sealing barriers of the present invention.

That is, by way of example, lower and upper fixing plates 213 and 212 are placed near a position where the second sealing barriers 52 and 203, which protrude respectively into the space defined by the first and second insulation barriers 51 and 53 of the corner structure and the first and second insulation barriers 204 and 202 of the planar structure (i.e., space between the insulation barriers), are adjacent to each other, such that the second sealing barriers are interposed between the upper and lower plates, as shown FIG. 24. At this time, the second sealing barriers 52 and 203 are firmly fixed by fastening the lower and upper plates 213 and 212 to each other with a fixing bolt 214, although it is not specifically limited thereto. Here, the lower and upper plates 213 and 212 are made of metal.

Further, the lower and upper plates 213 and 212 cause the second sealing barriers 52 and 203 to be connected and fixed to each other in such a state where the barriers are curved. This can be made by making mutually facing portions of the lower and upper plates 213 and 212 into curved concave portions corresponding to each other. Since a distal end of the second sealing barrier is curved as described above, the sealing characteristics of the second sealing barrier can be improved against any possible LNG leakage through the first sealing barrier.

In addition, an assembly of the lower and upper plates 213 and 212 is preferably curved slightly in a longitudinal direction to have an excess length. Thus, even though the assembly is contracted due to temperature decrease when the storage tank is filled with liquefied natural gas, the assembly can afford to easily absorb the stress created due to its contraction and further overcome the load created due to the thermal/mechanical contraction and expansion.

Furthermore, since the second sealing barriers are coupled to one another irrespective of the insulation barriers and the ship's hull, a certain degree of freedom can be provided to the insulation barriers, and thus, damage of the insulation barriers due to the deformation of inner surfaces of the hull can also be prevented.

As described above, the lower spaces defined by the corner structure 100 and planar structure 200 is filled with insulations and the second sealing barriers are then fixed to each other using the aforementioned fixing means. Next, a nut with a washer integrally formed on a lower end thereof is furred around and fastened to the anchor support rod 112. At this time, the nut washer is maintained at a state where it pushes down an upper surface of the insulations with a predetermined pressure. Here, after the LNG is stored in the storage tank of a ship, the volume, i.e. thickness, of the insulations may be decreased by means of the increasing pressure of the LNG cargo. Therefore, the nut should be designed in consideration of the foregoing thickness reduction of the insulations.

Then, a first anchor insulation barrier 116 is placed above the upper surface of the second anchor insulation barrier 113. An anchor upper plate 117 is inserted into a recessed space formed on the upper surface of the first insulation barrier 116 such that it can be fixed to the upper end of the anchor support rod 112. An anchor insulation plate 118 is also fixed onto the first anchor insulation barrier 116, and the circular anchor upper cap 119 is further inserted into and fixed to the end of the anchor. To this end, a predetermined recessed space is formed at the center of the upper surface of the first anchor insulation plate 118 and the anchor upper cap 119 is placed into the recessed space. Since the anchor upper cap 119 includes a nut or is integrally formed with a nut structure, it can be easily fastened to the upper end of the anchor support rod 112. Accordingly, the assembly of the anchor structure 150 is completed.

FIG. 26 is a partially enlarged sectional view illustrating the coupling relationship between anchor structures of the LNG storage tank according to the present invention. The anchor structure 150 of the present invention fabricated through a series of processes has the same coupling structure as shown in FIG. 26.

If the corner structures 100 and the planar structures 200 of the present invention are installed onto the inner surfaces of the ship's hull and the anchor structures 150 are also assembled, upper spaces between the first insulation barriers 204 of the corner structures 100, planar structures 200 and anchor structures 150 (i.e., spaces positioned above the spaces defined by the second insulation barriers) are filled with insulations. Glass wool is used as the insulations with which the upper spaces are filled, so as to more flexibly cope with the thermal contraction of the first insulation barrier and to more easily solve the problem resulting from the thermal stress. Further, there is also an advantage in that even though the ship's hull is distorted, the prefabricated units can slightly move in conformity to the hull distortion.

As described above, after the spaces between the first insulation barriers defined by the respective fabricated structures have been filled with the insulations such as glass wool, the first membrane-type sealing barrier 250 with a corrugated portion 251 is fixed onto the assembled structures. The first sealing barrier 250 is generally made of stainless steel with excellent corrosion resistance and thermal stability.

Furthermore, the first insulation barrier 250 may be made of materials that have been known from the conventional Mark III type tank or proposed in the patents (Korean Patent Application No. 2001-0010438 or 2001-0010152) referenced by the present inventor(s). The materials and shapes of the first insulation barriers may be modified. Further, the first insulation barrier described in U.S. Pat. Nos. 3,299,598, 3,302,359 and 3,510,278 may also be employed herein.

In addition, the corrugated portion 251 is formed in a longitudinal direction along the spaces defined by the respective assembled structures 100, 150 and 200, and the other additional corrugated portions are also formed near the corrugated portion 251. Since the thermal contraction and expansion of the first sealing barrier 250 brought into direct contact with the LNG stored in the tank is produced most excessively at this corrugated portion 251, the corrugated portion should be formed in this way such that the thermal deformation can be flexibly coped with and easily reduced. Further, the reason that the corrugated portions 251 are formed in the longitudinal direction above the spaces defined between the respective first insulation barriers is that the thermal stress applied to the storage tank can be easily reduced by mutually coping with the thermal contraction and expansion of the second sealing barrier attached to the first insulation barrier.

FIG. 27 is a partially cut-away perspective view of the LNG storage tank according to another embodiment of the present invention.

As shown in FIG. 27, the LNG storage tank according to another embodiment of the present invention is configured in such a manner that a second insulation barrier 292 is installed to a space defined in the construction such as a ship for storing liquefied natural gas therein, and a second sealing barrier 292 and a first insulation barrier 294 are sequentially installed onto an upper surface of the second insulation barrier.

Here, a predetermined space is formed between adjacent ends of the first insulation barriers 294 above ends of the second insulation barriers 292, and a connection insulation barrier 297 that is coupled to the first insulation barrier.

Further, a first insulation barrier 276 of an anchor structure is installed at the center of the connection insulation barrier 297, and insulations 325 made of glass wool is filled between the connection insulation barrier 297 and the first insulation barrier 276 of the anchor structure.

The process of fabricating the LNG storage tank according to another embodiment of the present invention described above will be explained as follows.

FIGS. 28 to 36 are perspective views sequentially illustrating the processes of fabricating the LNG storage tank into the inner space of a ship's hull according to another embodiment of the present invention.

When reference numerals are added to the respective components in the respective figures for the explanation of the present invention, it should be understood that same reference numerals are used to designate same components although the same components are shown in the different figures.

Moreover, the process of fixing the planar or corner structure according to another embodiment of the present invention is the same as that of the previous embodiment of the present invention. Therefore, the description for the same process will be omitted herein.

As shown in FIGS. 28 and 29, after the planar structure 200 is inserted and fixed with respect to the anchor lower plate 111 and anchor support rod 112 of the anchor structure 150, the second insulation barrier 113 of the anchor structure is inserted.

The second sealing barrier 114 with a circular corrugated portion 115 formed thereon is placed onto an upper surface of the second insulation barrier 113 of the anchor structure. The second sealing barrier 114 is fitted into and supported by a catching step 121 formed on the anchor support rod 112 and is then firmly fixed by means of the fixing nut 123 bolted to the support rod 112.

Further, referring to FIG. 30, the connection insulation barrier 297 installed to be connected to side surfaces of the respective adjacent first insulation barriers 294 of the planar structure and to an upper surface of the second sealing barrier 293 bonded onto an upper surface of the second insulation barrier 292 of the planar structure. In this embodiment of the present invention, the connection insulation barrier 297 may be bonded, using an adhesive P, to an upper surface of the second sealing barrier 293 of the planar structure and the first insulation barrier 114 of the anchor structure.

Accordingly, the connection insulation barrier 297 is more firmly coupled to the second sealing barrier 114 and 293 by means of the adhesive.

At this time, the connection insulation barrier 297 may be spaced apart by a predetermined gap (1~4 mm) from the adjacent side surfaces of the first insulation barrier 294 of the planar structure. This gap corresponds to a space in which the planar structure 200 can be moved when a ship's hull is deformed, and it can also serve to absorb the deformation.

Further, the connection insulation barrier 297 is placed onto the upper surface of the adjacent second sealing barrier 293 and causes ends of the second sealing barriers 114 and 293 to be sealed.

Since the connection insulation barrier 297 is strongly coupled to the second sealing barrier 114 or 293 by means of the adhesive P as described above, the LNG cannot reach up to the second sealing barrier 293 of the planar structure or the second sealing barrier 114 of the anchor structure. Therefore, the leakage of the LNG can be certainly prevented.

As described above, the respective second sealing barriers 114 and 293 are fixed to each other by means of the fixing means. Then, in the order shown in FIGS. 31 to 36, the first insulation barrier 116 of the anchor structure is fitted around the anchor support rod 112 and an anchor upper plate 337 is inserted into a circular recessed space formed on the upper surface of the first insulation barrier 116 such that it can be fixed to the upper end of the anchor support rod 112.

Thereafter, an anchor insulation plate 338 is attached to and fixed onto the upper surface of the anchor upper plate 337, and an anchor upper cap 339 is again inserted into and fixed to the center of the anchor insulation plate. To this end, a predetermined recessed space is formed at the center of the upper surface of the first anchor insulation plate 338 and the anchor upper cap 339 is placed into the recessed space. Since the anchor upper cap 339 includes a nut or is integrally formed with a nut structure, it can be easily fastened to the upper end of the anchor support rod 112. Accordingly, the assembly of the anchor structure 150 is completed.

After the above process has been completed, a space between the first insulation barriers 276 and 297 of the anchor structure according to the present invention (i.e., a space positioned above a space defined by the second insulation barriers) can be filled with insulations. Glass wool 325 is used as the insulations with which the upper space is filled, so as to more flexibly cope with the thermal contraction of the first insulation barriers 276 and 297 and to more easily solve the problem resulting from the thermal stress.

After the spaces defined by the first insulation barriers 276 and 297 have been filled with the insulations such as glass wool 325, the first membrane-type sealing barrier 250 with a corrugated portion 251 is fixed onto the assembled structures. The first sealing barrier 250 is generally made of stainless steel with excellent corrosion resistance and thermal stability. Furthermore, the first insulation barrier 250 may be made of materials that have been known from the conventional Mark III type tank or proposed in the patents (Korean Patent Application No. 2001-0010438 or 2001-0010152) referenced by the present inventor(s). The shapes of the first insulation barriers may be modified.

FIGS. 37 and 38 are enlarged sectional views showing a state where second sealing barriers are interlocked in the LNG storage tank according to the present invention.

Here, the second sealing barriers 293 of the present invention are connected and fixed using the fixing means shown in FIGS. 37 and 38. Such a fixing method can be applied to all the second sealing barriers of the present invention.

That is, by way of example, upper and lower connection members 312 and 313 are installed near a position where the second sealing barriers 293, which protrude respectively into the space defined by the first and second insulation barriers 292 and 294 of the corner structure and the first and second insulation barriers 204 and 202 of the planar structure (i.e., space between the insulation barriers), are adjacent to each other, such that they are brought into contact with ends of the second sealing barriers 293, as shown FIG. 37.

Further, the second sealing barrier 293 is coated with resin materials 293*a* on the top and bottom surfaces and extends into the space defined by the adjacent insulation barriers.

At this time, the second sealing barriers 293 are firmly fixed by fastening the upper and lower members 312 and 313 to each other with a self drilling screw 314, although it is not specifically limited thereto. To this end, a perforated portion 297*a* through which the self drilling screw 314 is inserted is formed on the connection insulation barrier 297.

Here, the fixing bolt or screw 314 is a structure for fixing the upper and lower connection members 312 and 313 to each other while directly penetrating the members. If this fixing bolt or screw is used, the fixing operation can be made without forming additional bolt-fastening holes on the members. For example, the self drilling screw may be employed in the present invention.

Further, a plain washer 314*a* or spring washer 314*b* is included in the fixing screw 314 such that the washer is maintained at a state where it pushes down an upper surface of the insulations with a predetermined pressure. Here, it is preferred that the fixing screw 314 be fastened in consideration of the reduction in volume, i.e. thickness, of the insulation due to the increasing pressure of the LNG cargo.

Furthermore, a recessed portion in which the second sealing barriers 293 are accommodated is formed on coupling surfaces of the upper and lower members 312 and 313. In addition, convex portions 312*a* and 313*a* that face each other or alternate with each other are formed on both ends of the recessed portion. The aforementioned upper and lower members 312 and 313 allow the convex portions 312*a* and 313*a* to press the resin materials 293*a* coated onto the second sealing barriers 293 when the members are fixed by means of the fixing bolt 314.

At this time, the resin materials 293*a* are accommodated in concave portions formed between the convex portions 312*a* and 313*a* and allows gaps between the upper or lower member 312 or 313 and the second sealing barrier 293 to be sealed up. Here, the resin materials 293*a* are made of curable resins, and they are compression molded and then cured.

Therefore, the sealing characteristics of the second sealing barriers can be improved against any possible LNG leakage through the first sealing barrier 250.

Although the present invention has been described in connection with the embodiments of the present invention illustrated in the accompanying drawings, the present invention is not limited thereto and those skilled in the art can make various modifications and changes thereto without departing from the spirit and scope of the invention.

Moreover, it is apparent that the present invention can be applied to an LNG storage tank installed on the ground as well as an LNG storage tank installed within a ship's hull.

As described above, the LNG storage tank of the present invention has advantages in that a fabricating process can be shortened by simplifying an installation structure of a tank which is installed within a ship for transporting liquefied nature gas corresponding to cryogenic liquid and the stress created due to mechanical deformation upon the loading or unloading of the liquefied natural gas can also be easily reduced while the liquid-tight characteristics are firmly maintained.

What is claimed is:

1. A method of building a liquid container, comprising:

providing a structural wall, an intermediate wall structure, a sealing wall and a plurality of elongated anchors, each elongated anchor having a first end portion, a middle portion and a second end portion along a longitudinal direction thereof, the middle portion located between the first and second end portion, the intermediate wall comprising a first surface and a second surface;

placing the intermediate wall structure on the structural wall such that the second surface contacts the structural wall, wherein the intermediate wall structure comprises a first insulating layer, a second insulating layer and a sealing layer located between the first and second insulating layers;

connecting the first end portion of the anchor with the structural wall;

placing the sealing wall such that the intermediate wall structure and the anchor are interposed between the structural wall and the sealing wall and such that the first surface contacts the sealing wall;

connecting the second end portion of the anchor with the sealing wall;

liquid-tightly connecting a sealing plate with the middle portion of the anchor, wherein the sealing plate extends from the middle portion generally in a plane substantially perpendicular to the longitudinal direction; and liquid tightly coupling the sealing plate and the sealing layer of the intermediate wall structure using a coupler, whereby the sealing layer of the intermediate wall is liquid-tightly connected with the anchor;

wherein the coupler comprises a first piece and a second piece, and wherein a portion of the sealing plate is interposed between the first piece and the second piece.

2. The method of claim 1, wherein the liquid container comprises a ship, and wherein the structural wall comprises an exterior wall or an interior wall of the ship.

3. The method of claim 1, wherein the first surface of the intermediate wall structure is not attached onto the sealing wall while the first surface of the intermediate wall structure contacts the sealing wall.

4. The method of claim 1, wherein the intermediate wall structure is movable relative to the structural wall.

5. The method of claim 1, wherein connecting the first end portion comprises attaching the first end portion to the structural wall such that the anchor is substantially non-movable relative to the structural wall.

6. The method of claim 1, wherein connecting the second end portion comprises attaching the second end portion to the sealing wall such that the anchor is substantially non-movable relative to the sealing wall.

7. The method of claim 1, wherein connecting the first end portion of the anchor comprises:

placing the anchor next to the intermediate wall structure such that the first end portion thereof faces the structural wall; and attaching the first end portion of the anchor to the structural wall such that the longitudinal direction thereof is substantially perpendicular to the structural wall.

8. The method of claim 7, further comprising liquid-tightly connecting the anchor with the intermediate wall structure.

9. The method of claim 7, further comprising connecting the anchor to the intermediate wall structure such that the intermediate wall structure is allowed to move relative to the anchor.

10. The method of claim 1, wherein the sealing plate comprises at least one corrugation configured to allow extension and shrinkage thereof in a direction generally in the plane substantially perpendicular to the longitudinal direction of the anchor.

11. A liquid container produced by the method of claim 1, wherein the anchor is located in a through hole formed in the intermediate wall structure.

12. The method of claim 1, wherein the portion of the sealing plate comprises a wrinkle which comprises a first surface and a second surface opposing the first surface, and wherein the first piece contacts the first surface of the sealing plate and the second piece contacts the second surface of the sealing plate.

13. The method of claim 1, wherein a portion of the sealing layer is interposed between the first and second pieces.

14. The method of claim 13, wherein the portion of the sealing layer comprises a wrinkle which comprises a first surface and a second surface opposing the first surface, and wherein the first piece contacts the first surface of the sealing layer and the second piece contacts the second surface of the sealing layer.

15. The method of claim 1, wherein the first surface of the intermediate wall structure is movable relative to the sealing wall.

16. The method of claim 1, wherein the second surface of the intermediate wall structure is movable relative to the structural wall.

17. A method of building a liquid container, comprising:

providing a structural wall, an intermediate wall structure, a sealing wall and a plurality of elongated anchors, each elongated anchor having a first end portion, a middle portion and a second end portion along a longitudinal direction thereof, the middle portion located between the first and second end portion, the intermediate wall comprising a first surface and a second surface;

placing the intermediate wall structure on the structural wall such that the second surface contacts the structural wall, wherein the intermediate wall structure comprises a first insulating layer, a second insulating layer and a sealing layer located between the first and second insulating layers;

connecting the first end portion of the anchor with the structural wall;

placing the sealing wall such that the intermediate wall structure and the anchor are interposed between the structural wall and the sealing wall and such that the first surface contacts the sealing wall;

connecting the second end portion of the anchor with the sealing wall; and liqiuid-tightly connecting a sealing plate with the middle portion of the anchor, wherein the sealing plate extends from the middle portion generally in a plane substantially perpendicular to the longitudinal direction, wherein the sealing plate is liquid tightly connected with the sealing layer of the intermediate wall structure, whereby the sealing layer of the intermediate wall is liqiuid-tightly connected with the anchor, wherein placing the intermediate wall structure comprises:

placing a first wall module on the structural wall;

placing a second wall module on the structural wall and next to the first wall module; and connecting the first and second wall modules to form the intermediate wall structure.

18. A liquid container produced by the method of claim 17, comprising a ship, wherein the structural wall comprises an exterior wall or an interior wall of the ship.

* * * * *